(12) United States Patent      (10) Patent No.:    US 8,995,338 B2
Viswanathan et al.                                      (45) Date of Patent:    Mar. 31, 2015

(54) MULTIPATH OVERLAY NETWORK AND ITS MULTIPATH MANAGEMENT PROTOCOL

(75) Inventors: Ramanathan Viswanathan, San Diego, CA (US); Xiaolong Huang, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 13/480,326

(22) Filed: May 24, 2012

(65) Prior Publication Data

US 2013/0136116 A1    May 30, 2013

Related U.S. Application Data

(63) Continuation-in-part of application No. 13/116,980, filed on May 26, 2011.

(51) Int. Cl.
| | |
|---|---|
| *H04W 4/00* | (2009.01) |
| *H04W 76/02* | (2009.01) |
| *H04L 12/715* | (2013.01) |
| *H04W 40/00* | (2009.01) |
| *H04L 29/06* | (2006.01) |

(Continued)

(52) U.S. Cl.
CPC ............. *H04W 76/02* (2013.01); *H04L 45/64* (2013.01); *H04W 40/00* (2013.01); *H04L 65/1069* (2013.01); *H04L 45/24* (2013.01); *H04L 45/50* (2013.01)
USPC .......................................................... 370/328

(58) Field of Classification Search
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| | | | |
|---|---|---|---|
| 6,580,909 | B1 | 6/2003 | Carro |
| 6,834,044 | B2 | 12/2004 | Sugirtharaj et al. |
| 6,954,435 | B2 | 10/2005 | Billhartz et al. |

(Continued)

FOREIGN PATENT DOCUMENTS

| | | |
|---|---|---|
| WO | 0079730 A2 | 12/2000 |
| WO | 0223934 A1 | 3/2002 |

(Continued)

OTHER PUBLICATIONS

Apostolopoulos, J.G., et al., "Path diversity for enhanced media streaming," IEEE Communications Magazine, vol. 42, No. 8, pp. 80-87, Aug. 2004.

(Continued)

*Primary Examiner* — Jung-Jen Liu
(74) *Attorney, Agent, or Firm* — Donald C. Kordich

(57) ABSTRACT

A method, a computer program product, and an apparatus are provided. The apparatus, which is a first node, sends a join request to a second node to route communication associated with a third node to the first node. The join request includes a first node identifier associated with the first node. The first node receives from the second node a join response comprising a second node identifier associated with the second node. The first node sends a setup request to the third node, the setup request comprising the second node identifier. The first node receives a communication with the first node identifier from the second node, the communication originating from the third node.

39 Claims, 36 Drawing Sheets

(51) Int. Cl.
  *H04L 12/707* (2013.01)
  *H04L 12/723* (2013.01)

(56) References Cited

U.S. PATENT DOCUMENTS

| | | | |
|---|---|---|---|
| 7,388,841 | B2 | 6/2008 | Shao et al. |
| 7,502,328 | B2 | 3/2009 | Lee et al. |
| 7,643,427 | B2 | 1/2010 | Kokku et al. |
| 7,733,769 | B1 | 6/2010 | Jennings et al. |
| 7,839,850 | B2 | 11/2010 | Kompella |
| 7,961,710 | B2 | 6/2011 | Lee et al. |
| 2002/0073232 | A1 | 6/2002 | Hong et al. |
| 2003/0007515 | A1 | 1/2003 | Apostolopoulos et al. |
| 2006/0039371 | A1 | 2/2006 | Castro et al. |
| 2006/0041698 | A1 | 2/2006 | Han et al. |
| 2006/0077942 | A1 | 4/2006 | Panwar et al. |
| 2007/0064684 | A1 | 3/2007 | Kottilingal |
| 2007/0066315 | A1 | 3/2007 | Kado |
| 2007/0110035 | A1 | 5/2007 | Bennett |
| 2008/0137653 | A1 | 6/2008 | Jonsson |
| 2008/0205394 | A1 | 8/2008 | Deshpande et al. |
| 2009/0073921 | A1 | 3/2009 | Ji et al. |
| 2009/0161592 | A1 | 6/2009 | So |
| 2009/0185492 | A1 | 7/2009 | Senarath et al. |
| 2009/0227258 | A1* | 9/2009 | Youn et al. ............ 455/445 |
| 2009/0290555 | A1* | 11/2009 | Alpert et al. ............ 370/331 |
| 2010/0054155 | A1* | 3/2010 | Cai et al. ............ 370/254 |
| 2010/0061244 | A1 | 3/2010 | Meier et al. |
| 2010/0064049 | A1 | 3/2010 | Magharei et al. |
| 2010/0085979 | A1 | 4/2010 | Liu et al. |
| 2010/0088390 | A1 | 4/2010 | Bai et al. |
| 2010/0121971 | A1 | 5/2010 | Shao et al. |
| 2010/0260190 | A1 | 10/2010 | Hiie et al. |
| 2010/0315958 | A1 | 12/2010 | Luo et al. |
| 2011/0051651 | A1* | 3/2011 | Wu et al. ............ 370/312 |
| 2011/0125921 | A1 | 5/2011 | Karenos et al. |
| 2012/0303822 | A1 | 11/2012 | Huang et al. |
| 2012/0311072 | A1 | 12/2012 | Huang et al. |
| 2013/0064105 | A1 | 3/2013 | Huang et al. |

FOREIGN PATENT DOCUMENTS

| | | |
|---|---|---|
| WO | 02065803 A1 | 8/2002 |
| WO | 2006015614 A1 | 2/2006 |
| WO | 2006101979 A2 | 9/2006 |
| WO | 2007020563 A1 | 2/2007 |
| WO | 2007021725 A2 | 2/2007 |
| WO | 2010143894 A2 | 12/2010 |

OTHER PUBLICATIONS

Gogate N. et al., "Supporting Image and Video Applications in a Multihop Radio Environment Using Path Diversity and Multiple Description Coding", IEEE Transactions on Circuits and Systems for Video Technology, vol. 12, No. 9, Sep. 2002. pp. 777-792.

Hefeeda M., et al., "Promise: PeertoPeer Media Streaming Using CollectCast" Proceedings of the 11th. ACM International Conference on Multimedia. MM'03. Berkeley, CA, Nov. 4-6, 2003; [ACM International Multimedia Conference], New York, NY : ACM, US, vol. Conf. II, (Nov. 2, 2003), pp. 1-10, XP002409310.

International Search Report and Written Opinion—PCT/US2012/039729—ISA/EPO—Sep. 19, 2012.

Jurca D, "Media Flow Rate Allocation in Multipath Networks", IEEE Transactions on Multimedia, vol. 9, No. 6, Oct. 2007, pp. 1227-1240.

Kang, S.S., et al., "A mobile peer-to-peer approach for multimedia content sharing using 3G/WLAN dual mode channels," Wireless Communications & Mobile Computing- Special Issue: WLAN/3G Integration for Next-Generation Heterogeneous Mobile Data Networks, vol. 5 Issue 6, Sep. 2005, pp. 633-645.

Leung M.F., "Broadcast-Based Peer-to-Peer Collaborative Video Streaming Among Mobiles," IEEE Transactions on Broadcasting, vol. 53, No. 1, Mar. 2007, pp. 350-361.

Vutukury, S., et al., "A simple MPLS-based flow aggregation scheme for providing scalable quality of service,"Proceedings of SPIE, Quality of Service over Next-Generation Data Network, vol. 4525, pp. 91-98, Aug. 2001, Fig. 1.

Ying H et al., "An adaptive algorithm for real-time data transmission in multi-hop overlay networks", Communications and Networking in China (CHINACOM), 2010 5th International ICST Conference on, Aug. 25-27, 2010, pp. 1-5, ISBN: 973-963-9799-97-4.

Papadopouli M., et al.,"Connection Sharing in an Ad Hoc Wireless Network among Collaborating Hosts", In Proc. International Workshop on Network and Operating System Support for Digital Audio and Video (NOSSDAV), 1999, pp. 169-185.

Mao S., et al., "MRTP: A Multiflow Real-Time Transport Protocol for Ad Hoc Networks," IEEE Transactions in Multimedia, Apr. 2006, vol. 8 (2), pp. 356-369.

Narayanan S., et al., "Motivation for a Multi-Flow Real-time Transport Protocol," Published by The Internet Society, Oct. 14, 2004, pp. 12, Retreived from the Internet <URL: http://tools.ietf.org/html/draft-narayanan-mrtp-motivation-00>.

Narayanan S., et al., "MRTP: a Multi-Flow Real-time Transport Protocol," Published by the Internet Society: Jul. 9, 2004, pp. 32, Retreived from the Internet <URL: http://tools.ietf.org/html/draft-narayanan-mrtp-00 >.

Taiwan Search Report—TW101118741—TIPO—Mar. 25, 2014.

\* cited by examiner

| Bit offset | 0 | 1 | 2 | 3 | 4 | 5 | 6 | 7 |
|---|---|---|---|---|---|---|---|---|
| 0 | Version | | | | Reserved | | | Ext |
| 8 | Message type | | | | | | | |
| 16 | TTL | | | | Packet length | | | |
| 24 | Packet length | | | | | | | |
| 32 | Packet length | | | | Label ID | | | |
| 40 | Label ID | | | | Payload type | | | |

*FIG. 14*

| Bit offset | 0 | 1 | 2 | 3 | 4 | 5 | 6 | 7 |
|---|---|---|---|---|---|---|---|---|
| 0 | Version | | | | Reserved | | | Ext |
| 8 | Message type | | | | | | | |

*FIG. 15*

MULTIPATH OVERLAY NETWORK AND ITS MULTIPATH MANAGEMENT PROTOCOL

CROSS-REFERENCE TO RELATED APPLICATION(S)

This application is a continuation in part and claims the benefit of U.S. patent application Ser. No. 13/116,980, entitled "Multipath Overlay Network and Its Multipath Management Protocol" and filed on May 26, 2011, which is expressly incorporated by reference herein in its entirety.

BACKGROUND

1. Field

The present disclosure relates generally to communication networks, and more particularly, communication access in Wireless Wide Area Networks (WWANs).

2. Background

Access links, such as a wireless air interface between an access terminal and a base station, are often times the bottlenecks of Wireless Wide Area Networks (WWANs). Nowadays, multimedia applications increasingly introduce a higher traffic load on access links of WWANs, causing unsatisfactory user experience.

SUMMARY

A method, a computer program product, and an apparatus are provided. The apparatus is a first node. The first node sends a join request to a second node to route communication associated with a third node to the first node. The join request includes a first node identifier associated with the first node. The first node receives from the second node a join response including a second node identifier associated with the second node. The first node sends a setup request to the third node. The setup request includes the second node identifier. The first node receives a communication with the first node identifier from the second node, the communication originating from the third node.

A method, a computer program product, and an apparatus are provided. The apparatus is a first node. The first node receives a setup request from a second node. The setup request includes an identifier associated with one of the second node or a third node.

The first node sends a join request to a fourth node to route communication for the second node from the first node to one of the second node or the third node. The join request includes the identifier associated with one of the second node or the third node. The first node receives from the fourth node a join response including a fourth node identifier associated with the fourth node. The first node sends a communication for the second node to the fourth node. The communication is sent with the fourth node identifier.

A method, a computer program product, and an apparatus are provided. The apparatus is a first node. The first node receives a join request from a second node. The join request includes a second node identifier associated with the second node. The first node sends a join response to the second node. The join response includes a remote-to-local-incoming identifier associated with the first node. The first node receives a communication with the remote-to-local-incoming identifier from one of a third node or a fourth node. The communication originates from the third node. The first node sends the communication with the second node identifier to the second node.

A method, a computer program product, and an apparatus are provided. The apparatus is a first node. The first node receives a join request from a second node. The join request includes an identifier associated with one of a third node or a fourth node. The first node sends a join response to the second node. The join response includes a local-to-remote-incoming identifier associated with the first node. The first node receives a communication with the local-to-remote-incoming identifier from the second node. The first node sends the communication with the identifier associated with one of the third node or the fourth node to one of the third node or the fourth node.

BRIEF DESCRIPTION OF THE DRAWINGS

FIG. 14 is an example of a packet header of multipath overlay network data packets.

FIG. 15 is an example of a packet header of multipath overlay network signaling messages.

DETAILED DESCRIPTION

Figure 1:
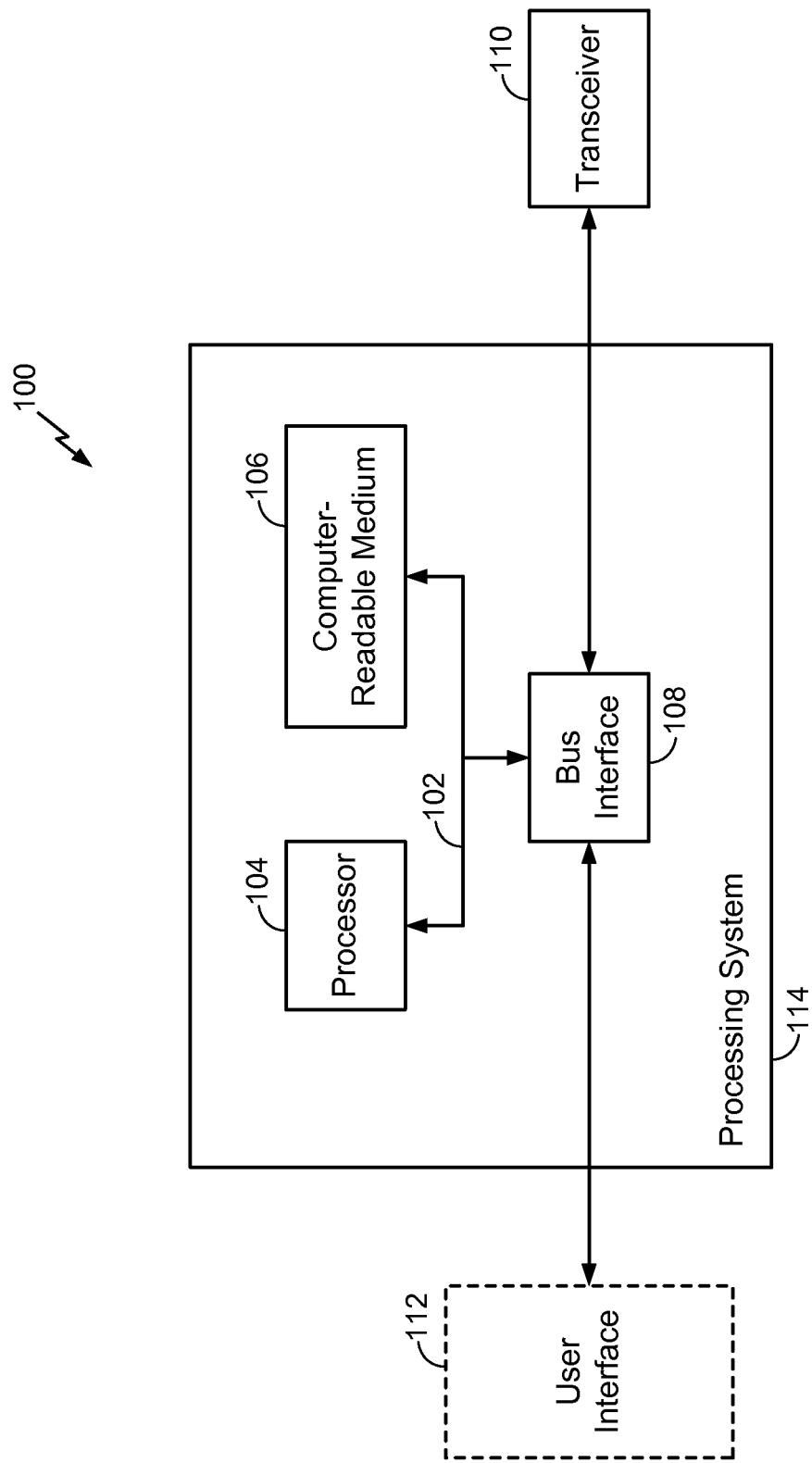
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a block diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

The various concepts presented throughout this disclosure may be implemented across a broad variety of telecommunication systems, network architectures, and communication standards. By way of example, various aspects may be implemented in UMTS systems such as W-CDMA, TD-CDMA, TD-SCDMA, High Speed Packet Access (HSPA), and HSPA+. Various aspects may also be implemented in systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or any other suitable system. The actual telecommunication standard and/or network architecture employed will depend on the specific implementation and the overall design constraints imposed on the system.

Figure 2:
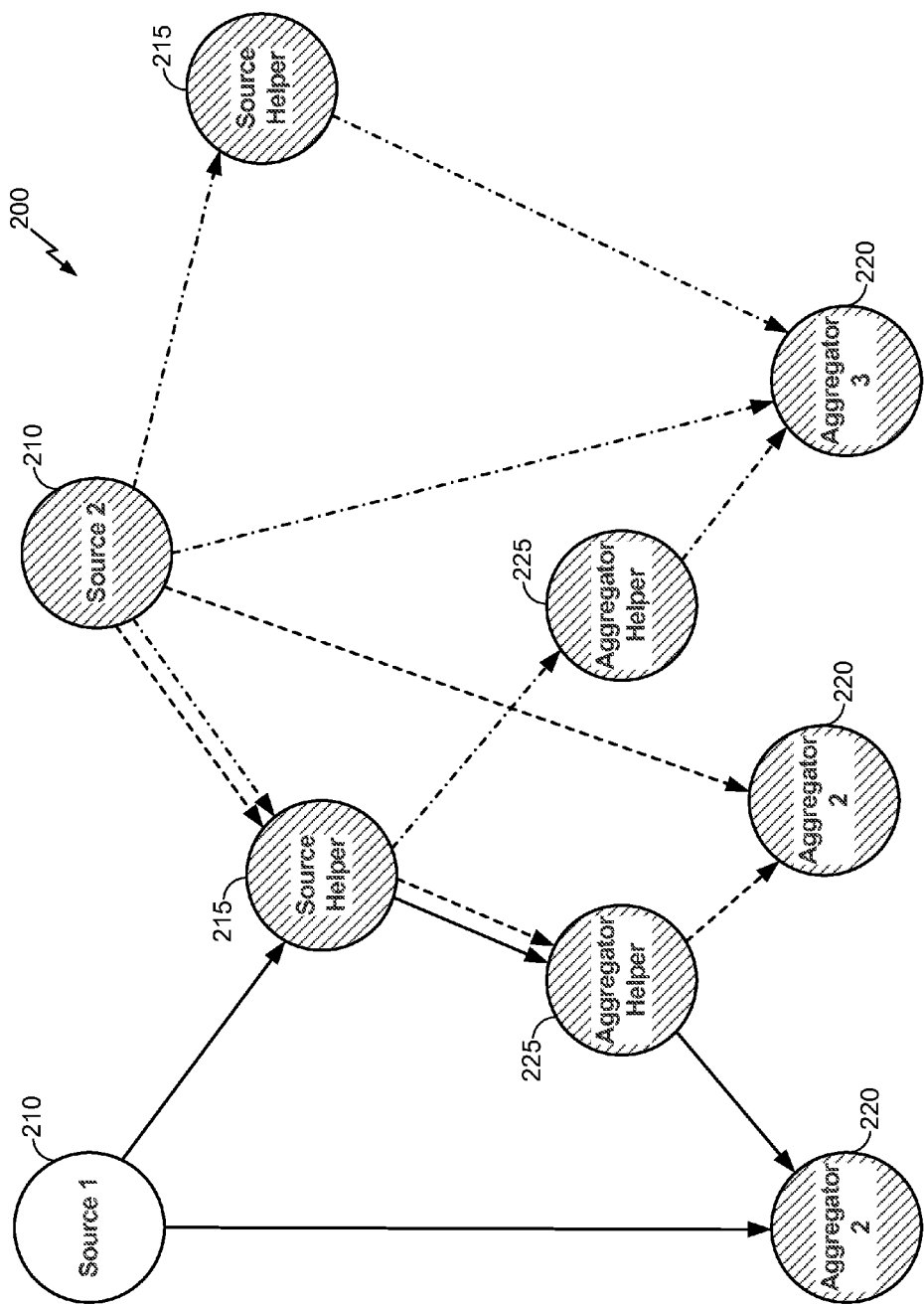
FIG. 2 is an illustration of a multipath overlay network.

FIG. 2 is an illustration of the architecture of a multipath overlay network 200 in accordance with some aspects of the present disclosure. Here, the multipath overlay network 200 includes various paths between different nodes such as one or more traffic sources ("source") 210, and one or more traffic destinations ("aggregator") 220. The source 210 and the aggregator 220 may each "discover" specific "helpers" to establish the paths, and to route substreams of a streaming session between the respective source 210 and aggregator 220. Each multimedia communication session ("streaming session") may include a source 210, one or more source helpers 215 (optional), one or more aggregator helpers 225 (optional), and an aggregator 210. For example, in one path, a traffic substream may flow from a source 210 to a source helper 215, then to an aggregator helper 225, and then to an aggregator 220. The selected source helper 215 and aggregator helper 225 thus serve to relay the substream of the streaming multimedia communication session from the source 210 to the aggregator 220. If data is transmitted from the source 210 directly to the aggregator 220, that data may be characterized as a first description of the streaming session. Substreams of data transmitted over other paths, e.g., utilizing one or more helpers, may be characterized as second and subsequent descriptions of the streaming session. Thus, multiple descriptions of the streaming session may be transmitted over separate paths and reassembled at the aggregator 220 for an enhanced quality of service by virtue of the additional bandwidth being utilized. The source helper 215 and the aggregator 210 may thus "cooperatively help" the source 110 and the aggregator 120 to achieve, for example, a streaming communication that has a quality greater than a threshold value of quality, in order to enhance a user experience.

In the above-described multipath overlay network 200, the sources 210 are the traffic sources of a streaming session, and the aggregators 220 are the traffic destinations of the streaming session. A source helper 215 is a cooperative node, which may be selected by the source 210 to receive and retransmit a description of the session in a substream. An aggregator helper 225 is a cooperative node, which may be selected by the aggregator 220 to receive and retransmit a description of the session in a substream.

In some aspects of the disclosure, a source helper 215 and an aggregator helper 225 can be a helper for one or more traffic sessions at the same time. That is, a node can take different roles for different traffic sessions, i.e., as a source 210, a source helper 215, an aggregator 220, and/or an aggregator helper 225.

Multipath Overlay Network Protocol Stack

Figure 3:
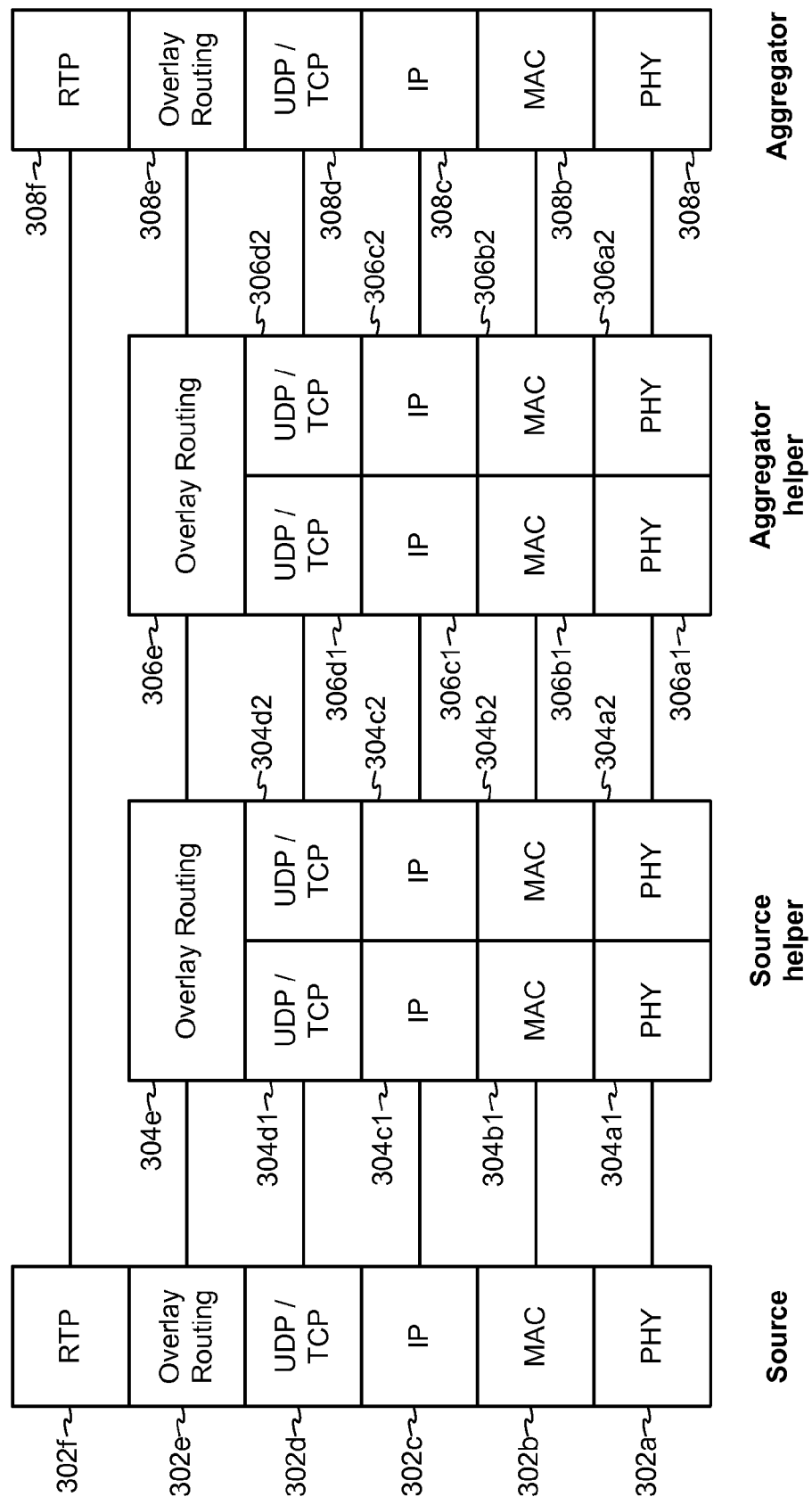
FIG. 3 illustrates a protocol stack of the overlay network data plane.

FIG. 3 illustrates protocol stacks of certain nodes in the overlay network data plane in accordance with some aspects of the disclosure. The data plane can be utilized to deliver the multimedia data across the multipath overlay network 200. In some aspects, the data packets may traverse multiple hops on the multipath overlay network 200.

In the illustrated example, various data plane protocol stacks are illustrated for certain nodes in a particular path including a source 302, a source helper 304, an aggregator helper 304, and an aggregator 306. In some aspects, the protocol stack for the source 302 includes a physical layer (PHY) 302a, a medium access control layer (MAC) 302b, an internet protocol layer (IP) 302c, a user datagram protocol/transmission control protocol layer (UDP/TCP) 302d, an overlay routing layer 302e, and a real-time transport protocol layer (RTP) 302f. The protocol stack for the source helper 304 includes, at an input side, a PHY layer 304a1, a MAC layer 304b1, an IP layer 304c1, and a UDP/TCP layer 304d1; and at an output side, a PHY layer 304a2, a MAC layer 304b2, an IP layer 304c2, and a UDP/TCP layer 304d2. The source helper 304 further includes an overlay routing layer 304e. The protocol stack for the aggregator helper 306 includes, at an input side, a PHY layer 306a1, a MAC layer 306b1, an IP layer 306c1, and a UDP/TCP layer 306d1; and at an output side, a PHY layer 306a2, a MAC layer 306b2, an IP layer 306c2, and a UDP/TCP layer 306d2. The aggregator helper 306 further includes an overlay routing layer 306e. The protocol stack for the aggregator 308 includes a PHY layer 308a, a MAC layer 308b, an IP layer 308c, a UDP/TCP layer 308d, an overlay routing layer 308e, and an RTP layer 308f.

In some aspects, the multipath overlay network 200, utilizing the protocol stack illustrated in FIG. 3, utilizes a UDP or a TCP port (e.g., a predetermined UDP or TCP port) for transporting overlay network data packets.

In some aspects of the disclosure, if a data path segment exists between a pair of nodes in the multipath overlay network 200, an end-to-end UDP/IP transport can be utilized between those nodes. For example, an end-to-end UDP/IP transport can be utilized between the source 302 and the source helper 304; between the source 302 and the aggregator helper 306; between the source helper 304 and the aggregator 308; and between the aggregator helper 306 and the aggregator 308.

Figure 4:
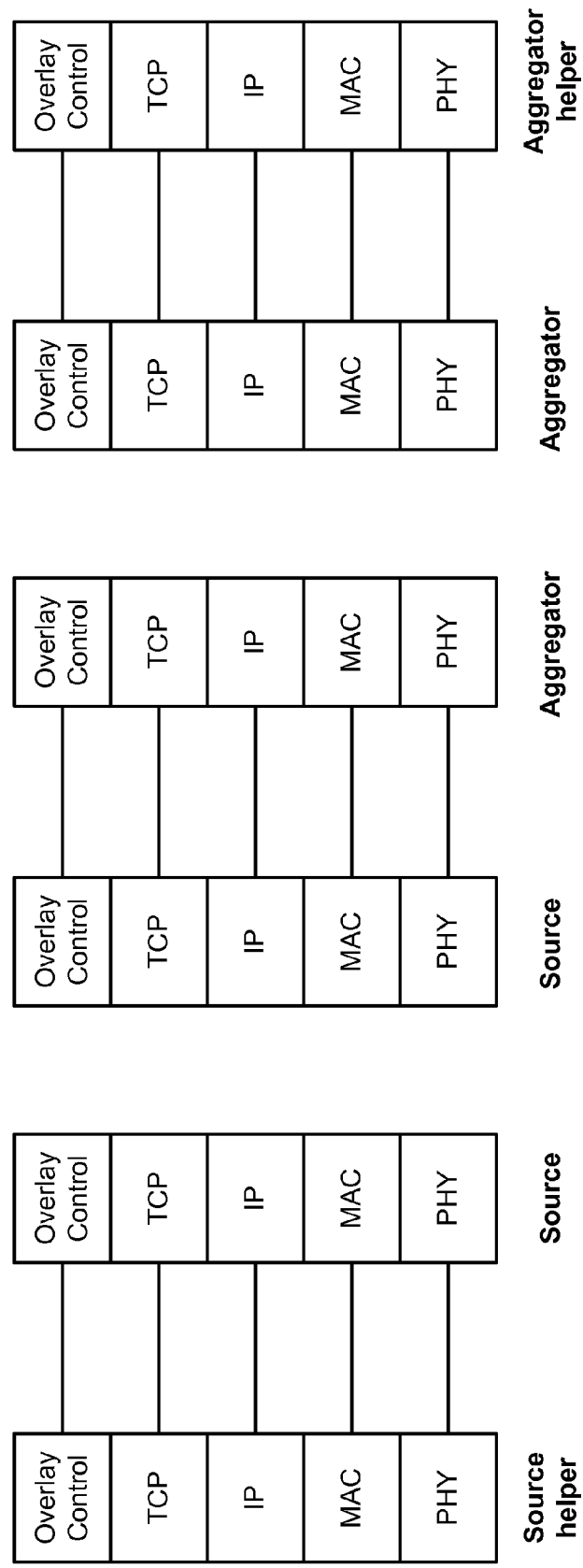
FIG. 4 illustrates a protocol stack of the control plane.

FIG. 4 illustrates a protocol stack of the overlay network control plane in accordance with some aspects of the disclosure. The control plane of the multipath overlay network may be used to setup, release, and switch a path in the data plane between a respective source 210 and aggregator 220. In the illustrated example of the overlay network control plane connections between pairs of nodes, each of the respective nodes includes a PHY layer, a MAC layer, an IP layer, and a TCP layer. In addition, each of the respective nodes includes an overlay control layer.

In an aspect of the disclosure, multipath overlay network signaling messages may traverse a single hop on the multipath overlay network. That is, if a data path segment is expected between a respective pair of nodes (e.g., between a source helper 402a and a source 402b; between a source 404a and an aggregator 404b; or between an aggregator 406a and an aggregator helper 406b), TCP/IP transport can be utilized between those nodes. In some implementations, the multipath overlay network uses a transmission control protocol (TCP) port (e.g., a predetermined TCP port) for transporting overlay network signaling messages.

Multipath Overlay Network Routing

The multipath overlay network routing function uses a label switching mechanism to route the data traffic. Here, an input label identifier (ID) can be used by the source helper 215, the aggregator helper 225, and the aggregator 210 to identify the data packets of a unique stream (e.g., a substream) received by the underlying node. Similarly, an output label ID can be used by the source 210, the source helper 215, and the aggregator helper 225 to identify the data packets of a unique stream (e.g., a substream) to be sent by the underlying node. The input label ID may be assigned by the recipient of the data packet during the signaling phase, and in one aspect, may be unique only from the perspective of the recipient. The output label ID may be assigned by the sender of the data packet.

When a node in the multipath overlay network receives a multipath overlay network data packet, the node examines the input label ID and then sends out this packet to a next hop overlay network address, which may be the destination of the packet in the underlying network. The packet may be tagged with the corresponding output label ID. An example of a switching table is shown in Table 1.

TABLE 1

Switching Table

| Node | Input Label ID | Output Label ID | Next Hop Overlay Network Address |
|---|---|---|---|
| Source | | X | X |
| Source Helper | X | X | X |
| Aggregator Helper | X | X | X |
| Aggregator | X | | |

Figure 5:
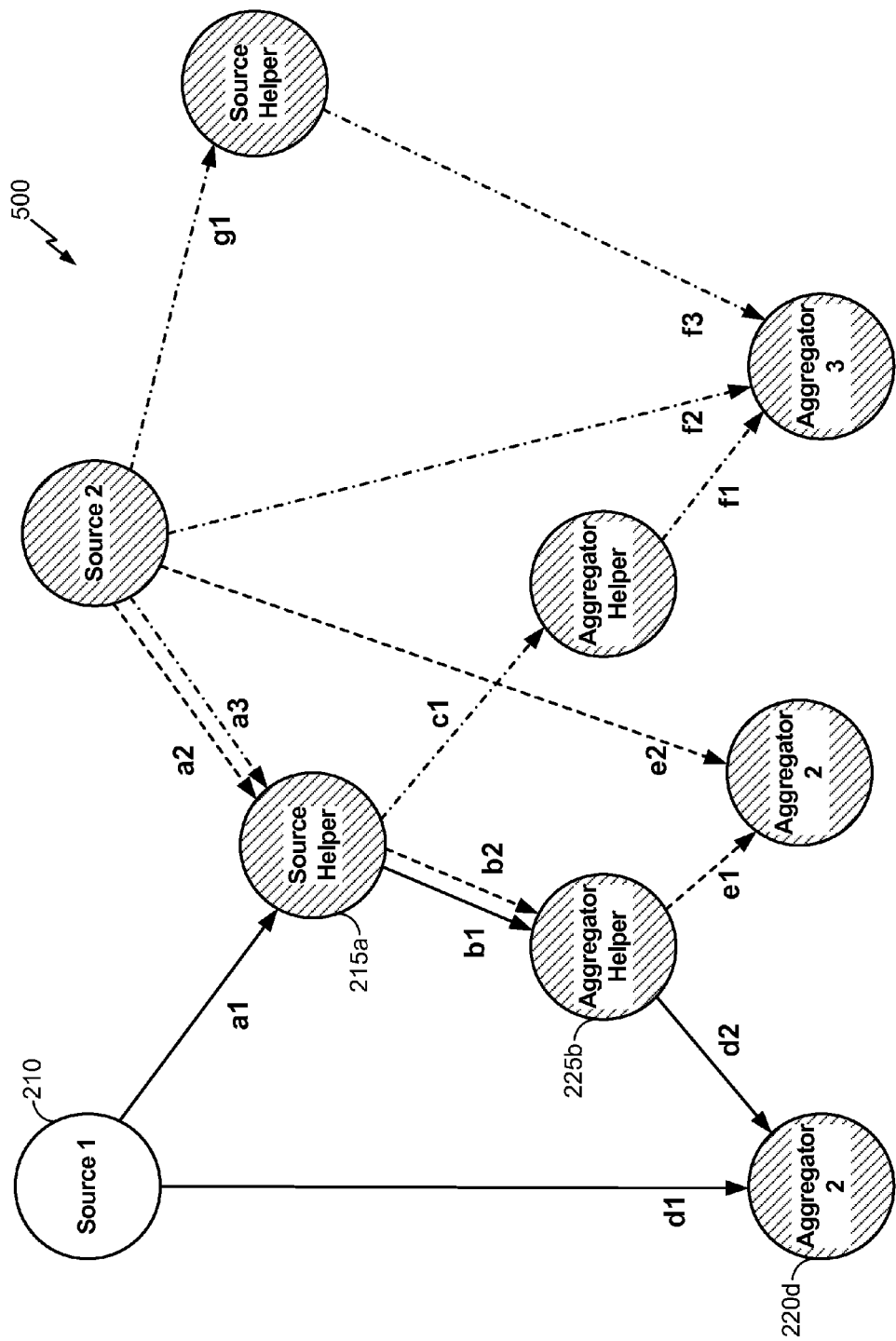
FIG. 5 illustrates an example of a label distribution.

FIG. 5 is an illustration of a multipath overlay network substantially similar to that illustrated in FIG. 2, further including details to illustrate distribution of label IDs. In the illustrated example, the label IDs that are assigned by a common node are tagged with the same alphabetic character.

For example, a first overlay network data packet may be sent from source 1 210 along a direct path to aggregator 2 220d. Here, the source 1 210 may assign an output label ID of d1, corresponding to the overlay network address of the aggregator 2 220d; and similarly, because this particular data packet is to follow a direct path, the next hop overlay network address also may correspond to that of aggregator 2 220d. When the data packet arrives at the aggregator 2 220d, the data packet then receives an input label ID corresponding to the overlay network address of the source.

Further, a second overlay network data packet may be sent from source 1 210 along an alternative path to aggregator 2 220d. Here, the alternative path includes source helper 215a and aggregator helper 225b. Thus, the source 1 210 may assign an output label ID of d1, corresponding to the overlay network address of aggregator 2 220d. However, because this particular data packet is following the alternative path, the next hop overlay network address corresponds to that of source helper 215a. At the next hop, the source helper 215a assigns an input label ID corresponding to the overlay network address of source 1 210, since that node was the source of the data packet; and retains the output label ID of aggregator 2 220d. The source helper 215a assigns a next hop overlay network address corresponding to that of the aggregator helper 225b. At the next hop, the aggregator helper 225b assigns an input label ID corresponding to the overlay network address of source helper 215a, and retains the output label ID of aggregator 2 220d. The aggregator helper 225b assigns a next hop overlay network address corresponding to that of aggregator 2 220d. At the next hop, which is the destination of the data packet, aggregator 2 220d assigns an input label ID corresponding to the overlay network address of the aggregator helper 225b.

Of course, those skilled in the art will recognize that this is only one particular implementation, and other forms of switching tables and addressing of data packets may be utilized within the spirit of the present disclosure and the scope of the claims.

State and SDL Diagrams of an Aggregator

Figure 6:
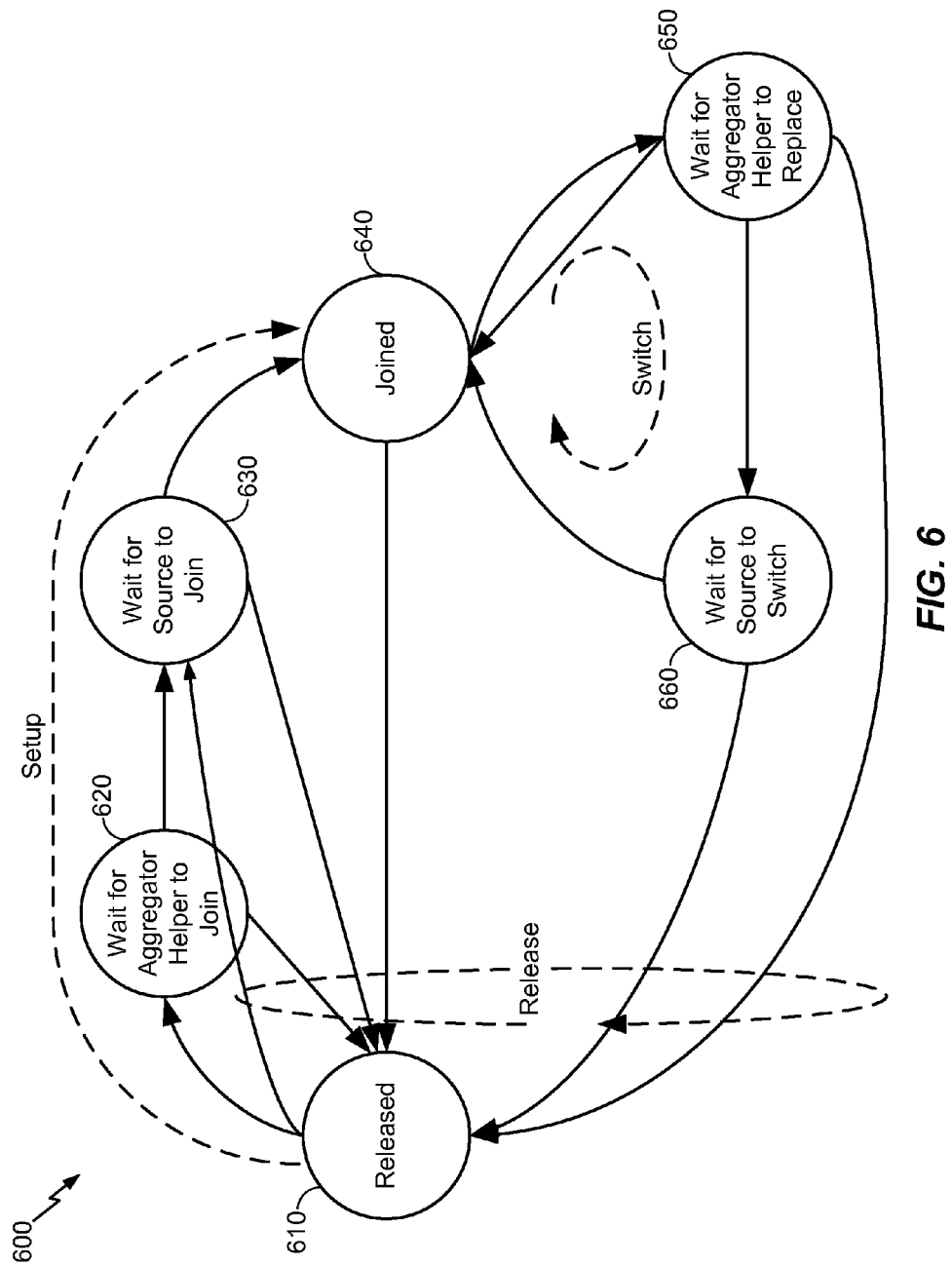
FIG. 6 illustrates a state transition diagram.

Referring once again to the multipath overlay network 200 illustrated in FIG. 2, it is seen that an aggregator 220 may be capable of receiving information over multiple paths from a corresponding source 210. In an aspect of the disclosure, as illustrated in FIG. 6, an aggregator 220 may include a master state machine that governs the path management of the multiple paths it has with the corresponding source 210. In a further aspect of the disclosure, a master state machine for an aggregator 220 can include multiple atomic state machines. Here, each atomic state machine governs the path management of a single path between the aggregator 220 and the corresponding source 210.

A state transition diagram 600 for an aggregator 220 in accordance with some aspects of the disclosure is shown in FIG. 6. For each atomic state machine of the aggregator 220, the aggregator 220 has states including a Released state 610; a Wait for Aggregator Helper to Join state 620; a Wait for Source to Join state 630; a Joined state 640; a Wait for Aggregator Helper to Replace state 650; and a Wait for Source to Switch state 660. At some of the states, as described below, the aggregator 220 may utilize timers including an Original Helper Join timer, a Replacement Helper Join timer, and a Source Join timer. Further, in some of the states, the aggregator 220 may utilize a binary state variable "helper_active" for state reduction, with, e.g., a default value set to false. Signaling messages that are not designed to be handled as inputs at a certain state may be queued for delayed processing.

Figure 7A:
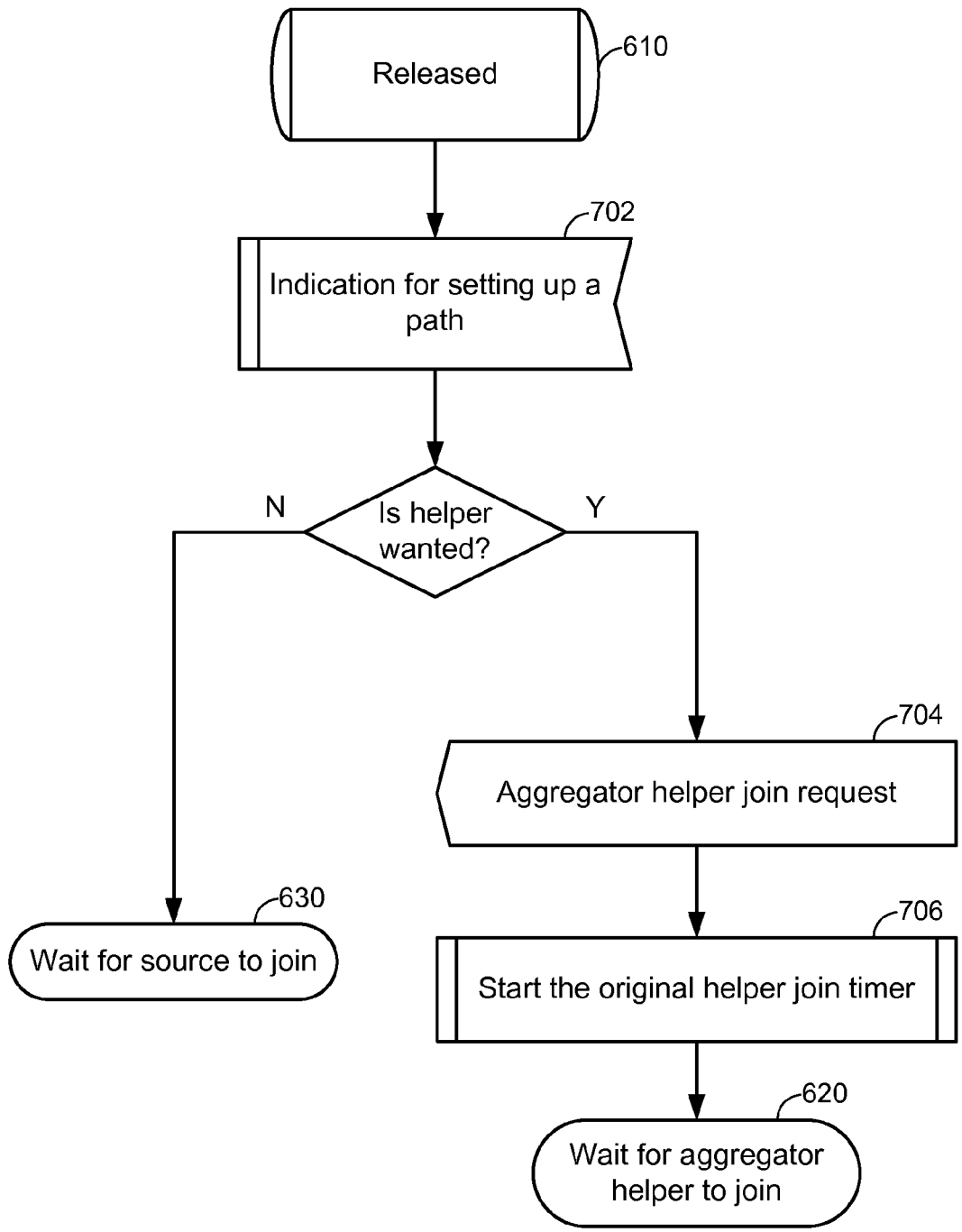
FIGS. 7A-7F illustrate Specification and Description Language (SDL) diagrams for an Aggregator.

FIGS. 7A-7F are specification and description language (SDL) flow charts illustrating state transitions in the state transition diagram 600 illustrated in FIG. 6. As illustrated in FIG. 7A, at the Released state 610, the path between the aggregator 220 and the node corresponding to this particular atomic state machine is released. Here, the aggregator 220 may transition to the Wait for Source to Join state 630 or the Wait for Aggregator Helper to Join state 620. The aggregator 220 may receive an indication 702, e.g., from a source 210, for setting up a path. If the aggregator 220 is not in need of a helper, then the aggregator 220 may move to the Wait for Source to Join state 630. If the aggregator 220 desires a helper, the aggregator 220 may send an Aggregator Helper Join Request message 704 to the corresponding aggregator helper 225, and start an Original Helper Join timer 706. The aggregator 220 may then enter the Wait for Aggregator Helper to Join state 620.

Figure 7B:
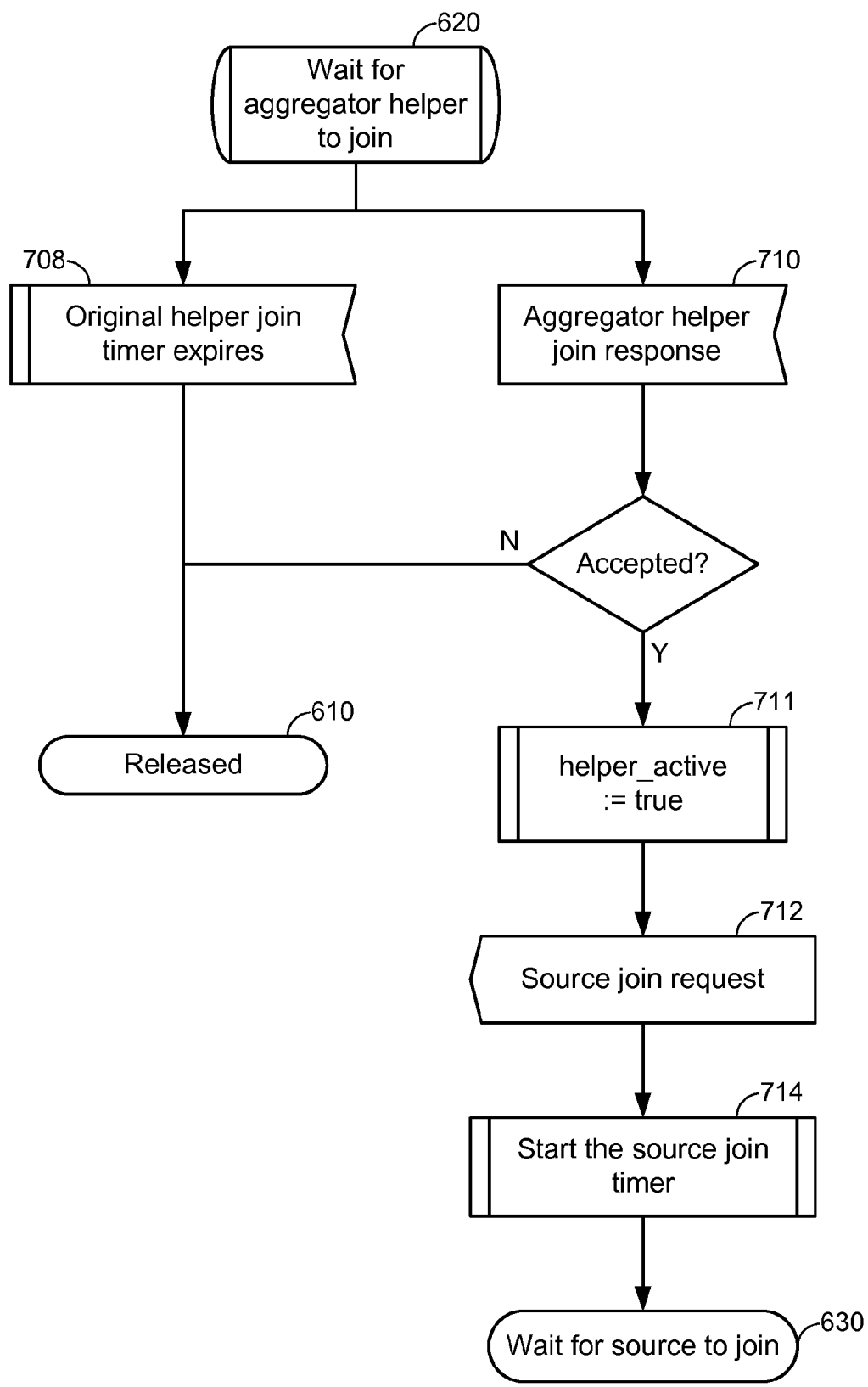

As illustrated in FIG. 7B, at the Wait for Aggregator Helper to Join state 620, the aggregator 220 has sent an Aggregator Helper Join Request message, and is awaiting, for the duration of the Original Helper Join timer, an Aggregator Helper Join Response message. Here, if the Original Helper Join timer expires 708, the aggregator 220 enters the Released state 610. However, prior to the expiration of the Original Helper Join timer, the aggregator 220 may receive an Aggregator Helper Join Response message 710. If the message is not accepted, the aggregator 220 may enter the Released state 610. If the message is accepted, the aggregator 220 may then set the helper_active variable to true 711, send a Source Join Request message 712, start a Source Join timer 714, and enter the Wait for Source to Join state 630.

Figure 7C:
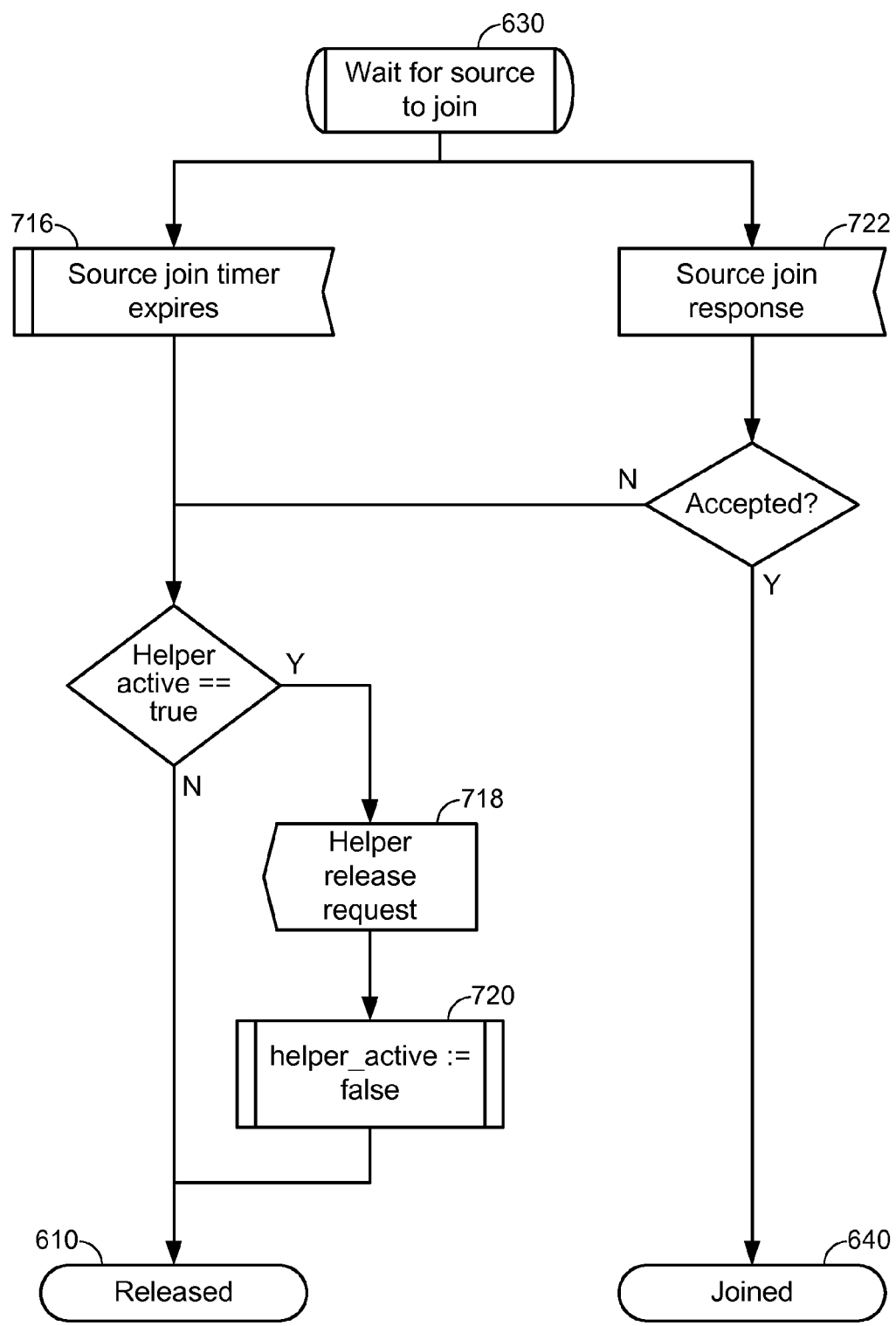

As illustrated in FIG. 7C, at the Wait for Source to Join state 630, the aggregator 220 has sent a Source Join Request message, and is awaiting, for the duration of the Source Join timer, a Source Join Response message. Here, if the Source Join timer expires 716, and if the helper_active variable is false, the aggregator 220 may enter the Released state 610. However, if the Source Join timer expires 716, and the helper_active variable is true, then the aggregator may wish to release the helper corresponding to the helper_active variable, so it may send a Helper Release Request message 718 to its helper, set the helper_active variable to false, and thereafter enter the Released state 610. However, prior to the expiration of the Source Join timer, the aggregator 220 may receive a Source Join Response message 722 from the source 210 in response to the Source Join Request message. If the aggregator 220 does not accept the Source Join Response message, then the aggregator 220 follows the process outlined just above to enter into the Released state 610. If the aggregator 220 accepts the Source Join Response message from the source 210, then the aggregator 220 enters the Joined state 640.

Figure 7D:
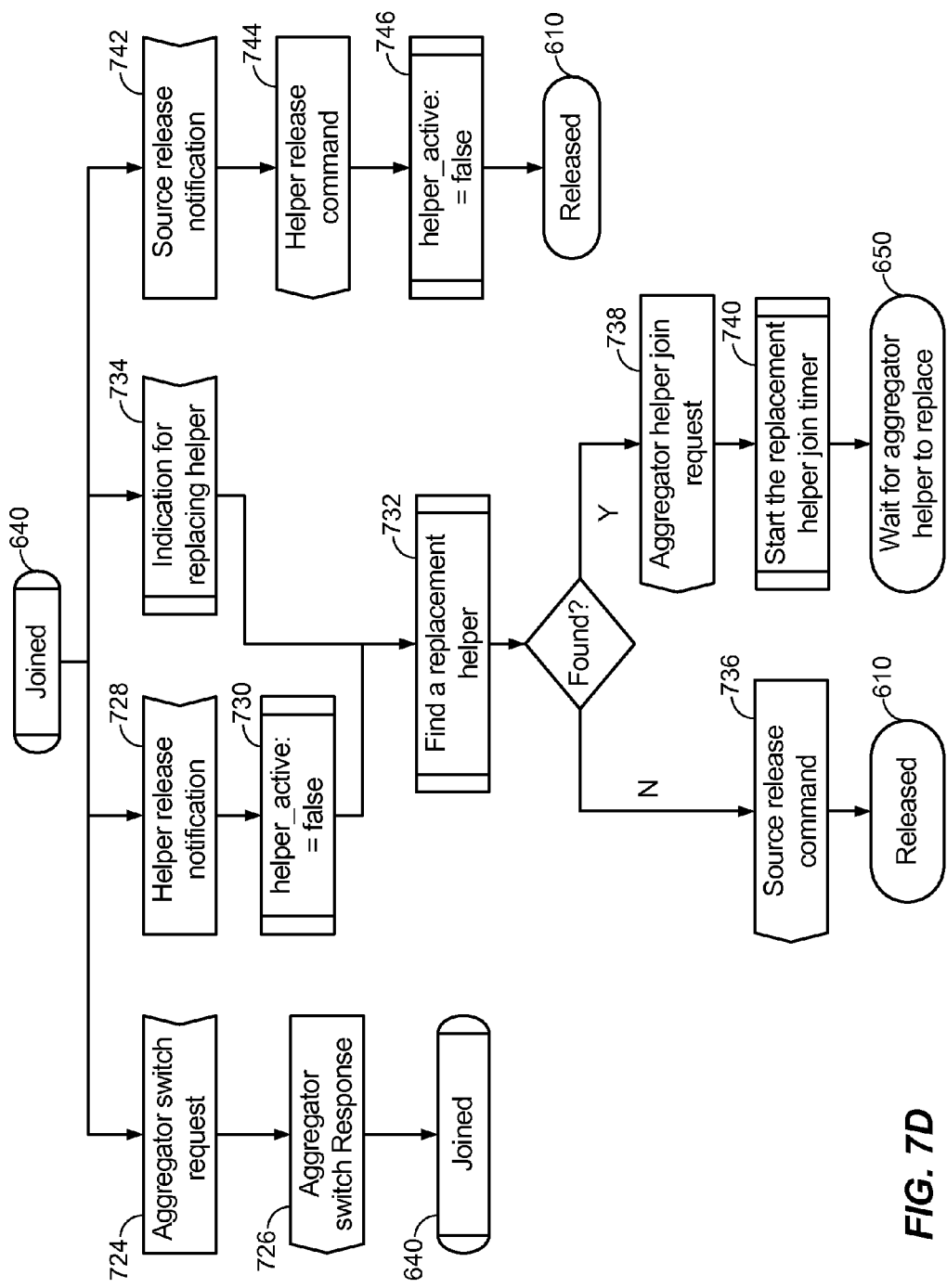

As illustrated in FIG. 7D, at the Joined state 640, a path from the aggregator 220 to a corresponding source 210 exists, that path including the node corresponding to this particular atomic state machine. Here, the aggregator 220 may receive an Aggregator Switch Request message 724 from the source 210, to request the aggregator 220 to switch a path between the source 210 and the aggregator 220. The aggregator 220 may then respond to the source 210 with an Aggregator Switch Response message 726 and return to the Joined state 640. Further, in the Joined state 640, the aggregator 220 may receive a Helper Release Notification message 728 from a helper node, indicating to release a particular path utilizing that node, between the source 210 and the aggregator 220. Here, to release the path, the aggregator 220 may set the helper_active variable to false 730, and seek to find a replacement helper 732. In the Joined state 640, the aggregator 220 may also receive an indication for replacing a joined helper 734, in response to which the aggregator 220 similarly may seek to find a replacement helper 732. Here, if a replacement helper is not found, the aggregator 220 may send a Source Release Command message 736 to the source 210 to release the path between the source 210 and the aggregator 220, and enter the Released state 610. If a replacement helper is found, the aggregator 220 may send an Aggregator Helper Join Request message 738 to the found aggregator helper 225, seeking to set up the path between the source 210 and the aggregator 220 utilizing the found aggregator helper 225. The aggregator 220 may then start the Replacement Helper Join timer 740, and enter the Wait for Aggregator Helper to Replace state 650. Further, in the Joined state 640, the aggregator 220 may receive a Source Release Notification message 742 from the source 210 indicating to release a path between the source 210 and the aggregator 220. Here, the aggregator 220 may send a Helper Release Command message 744 to a joined helper to release a path between the source 210 and the aggregator 220 utilizing the corresponding helper, and set the helper_active variable false 746, before entering the Released state 610.

Figure 7E:
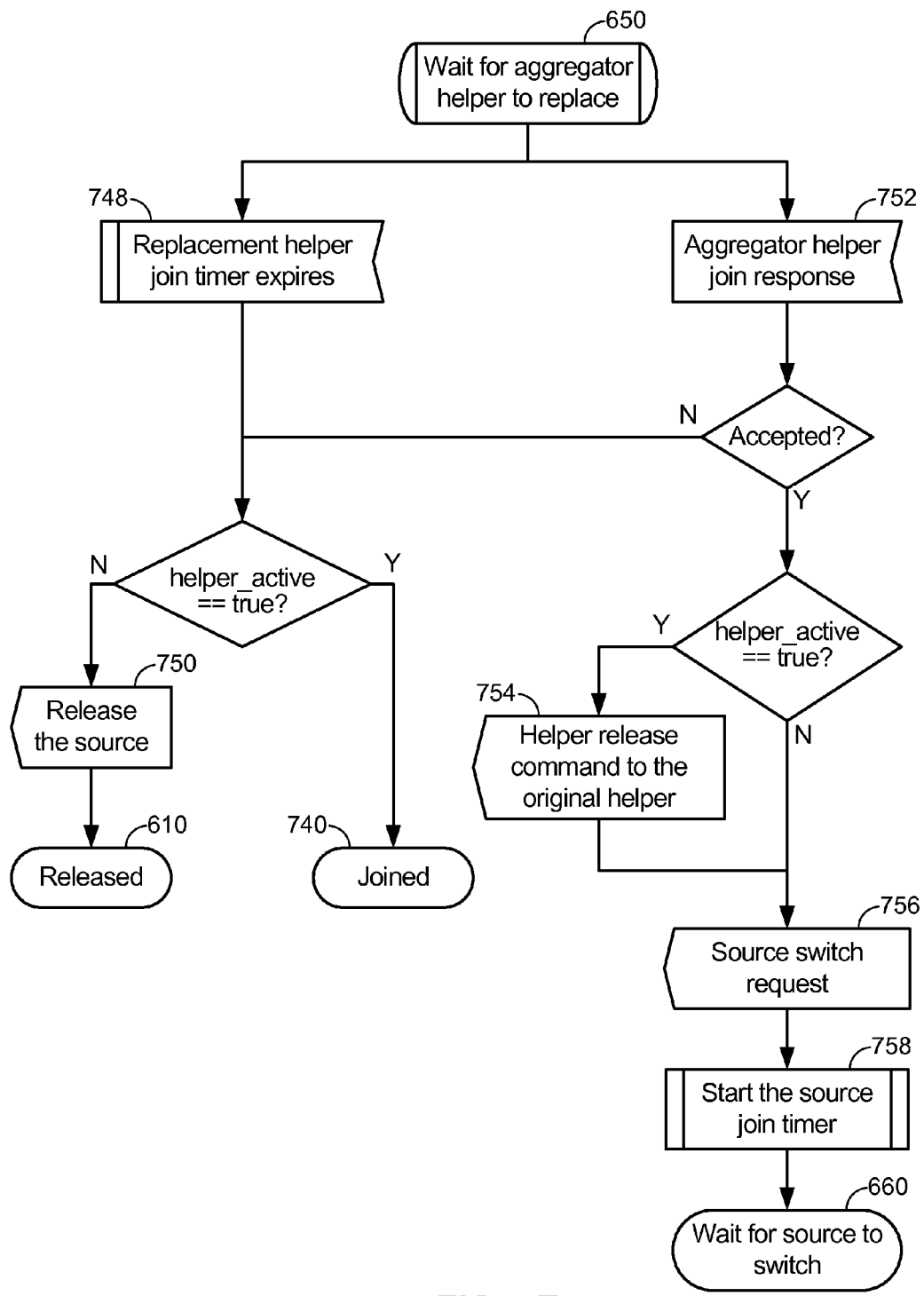

As illustrated in FIG. 7E, at the Wait for Aggregator Helper to Replace state 650, the aggregator 220 has sent an Aggregator Helper Join Request message to a found replacement aggregator helper 225, and is awaiting, for the duration of the Replacement Helper Join timer, an Aggregator Helper Join Response message from the found replacement aggregator helper 225. Here, if the Replacement Helper Join timer expires 748, but if the helper_active variable is false (indicating that the aggregator 220 is not joined to a helper node), the aggregator 220 sends a Source Release Command message 750 to the source 210 to release the path between the source 210 and the aggregator 220, and enters the Released state 610. However, if the Replacement Helper Join timer expires 748, and the helper_active variable is true, then the aggregator 220 enters the Joined state 640, retaining the path between the source 210 and the aggregator 220 that includes the helper corresponding to this particular atomic state machine. Further, prior to the expiration of the Replacement Helper Join timer, the aggregator 220 may receive an Aggregator Helper Join Response message 752 from a corresponding aggregator helper 225 in response to an Aggregator Helper Join Request message. If the aggregator 220 does not accept the Aggregator Helper Join Response message, then the aggregator 220 follows the process outlined above to enter into either the Released state 610 or the Joined state 640. If the aggregator 220 accepts the Aggregator Helper Join Response message from the aggregator helper 225, and if the helper_active variable is true, the aggregator 220 may send a Helper Release Command message 754 to the original helper to release the corresponding path between the source 210 and the aggregator 220 utilizing that helper node. If the helper_active variable is false, the aggregator 220 may skip the sending of the Helper Release Command message 754. Next, the aggregator 220 may send a Source Switch Request message 756 to the source 210 to request the source 210 to switch a path between the source 210 and the aggregator 220, start the Source Join timer 758, and enter the Wait for Source to Switch state 660.

Figure 7F:
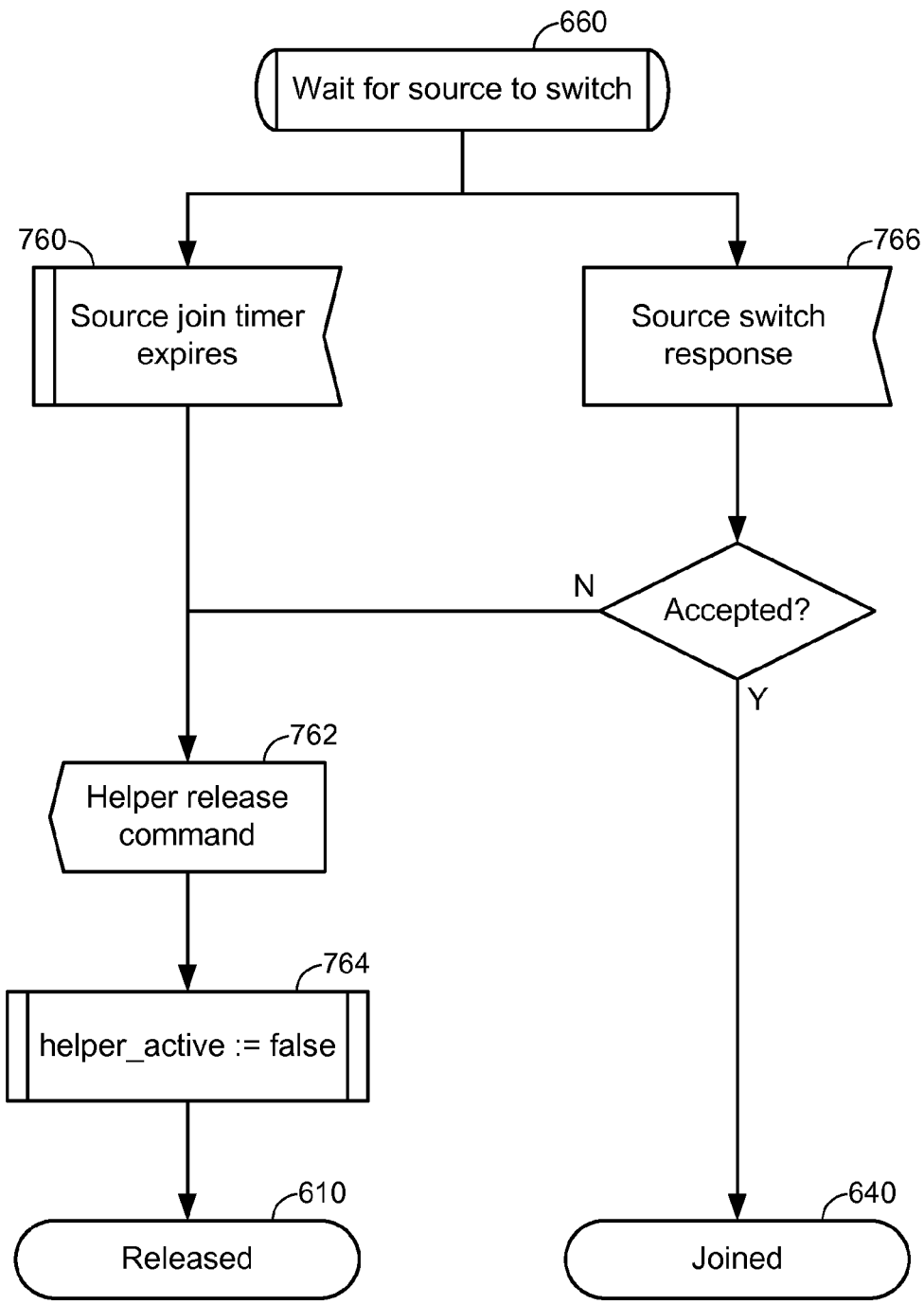

As illustrated in FIG. 7F, at the Wait for Source to Switch state 660, the aggregator 220 has sent a Source Switch Request message, and is awaiting, for the duration of the Source Join timer, a Source Switch Response message. Here, if the Source Join timer expires 760, the aggregator 220 may send a Helper Release command 762 to the respective helper, to release the corresponding path between the source 210 and the aggregator 220 utilizing that helper node. The aggregator 220 may then set the helper_active variable to false 764, and enter the Released state 610. However, prior to the expiration of the Source Join timer, the aggregator 220 may receive a Source Switch Response message 766 from the source 210 in response to the Source Switch Request message. If the aggregator 220 does not accept the Source Switch Response message, the aggregator 220 may follow the process outlined just above to enter into the Released state 610. If the aggregator 220 accepts the Source Switch Response message 766, then the aggregator 220 enters the Joined state 640.

State and SDL Diagrams of an Aggregator Helper

Figure 8:
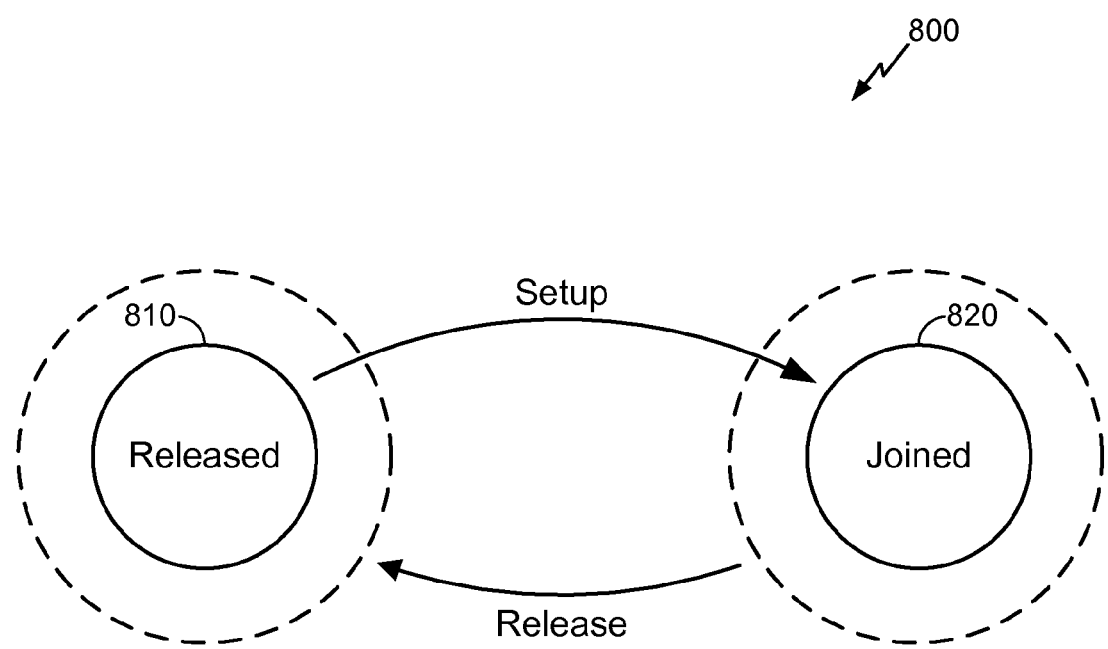
FIG. 8 illustrates a state transition diagram for an aggregator helper.

FIG. 8 is an illustration of a state machine 800 corresponding to an aggregator helper 225, illustrated in FIG. 2. An aggregator helper 225 may include a Released state 810 and a Joined state 820. That is, the aggregator helper 225 may be joined to take part in forming a path, or may be released as a cooperative node.

Figure 9A:
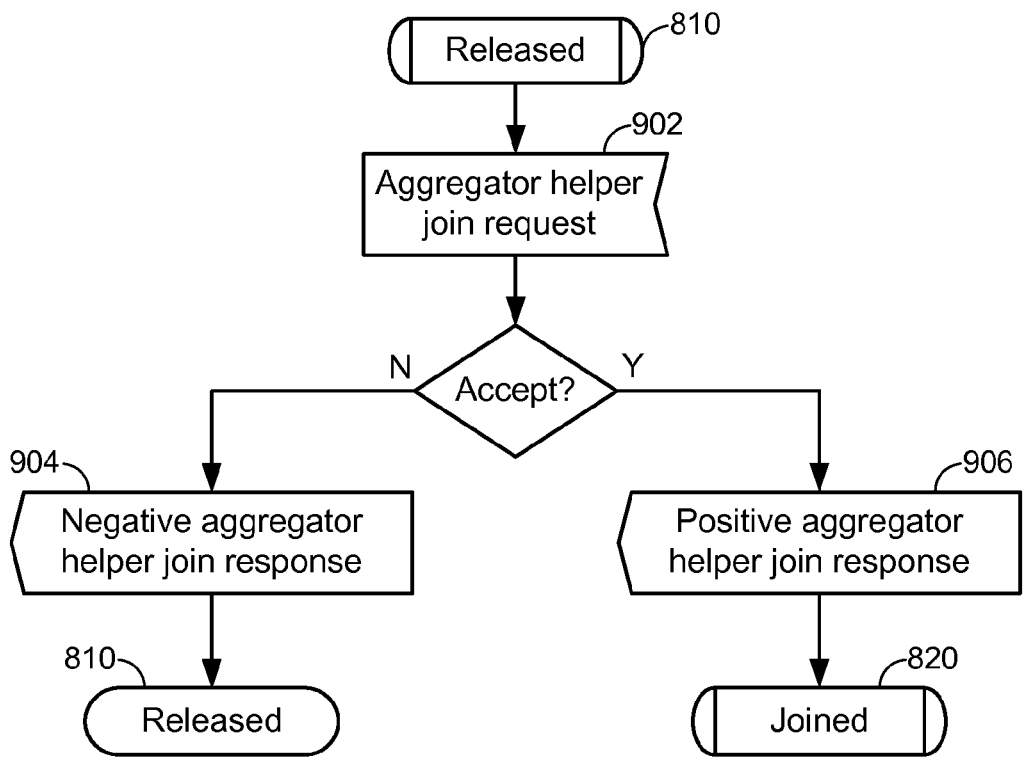
FIGS. 9A-9B illustrate an SDL diagram for an aggregator helper.
Figure 9B:
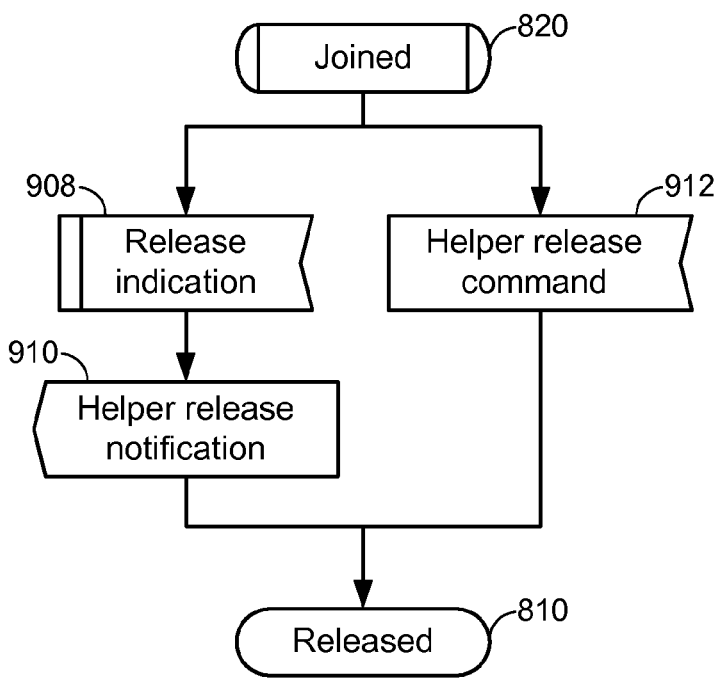

FIGS. 9A-9B are SDL flow charts illustrating state transitions in the state transition diagram 800 illustrated in FIG. 8. As illustrated in FIG. 9A, at the Released state 810, the aggregator helper 225 does not act as a cooperative node for a path between a source 210 and an aggregator 220. Here, the aggregator helper 225 may receive an Aggregator Helper Join Request message 902 from an aggregator 220 to request the aggregator helper 225 set up a path between a source 210 and the aggregator 220. If the aggregator helper 225 does not accept the Aggregator Helper Join Request message, the aggregator helper 225 may send a Negative Aggregator Helper Join Response message 904 to the aggregator 220, and return to the Released state 810. If the aggregator helper 225 accepts the Aggregator Helper Join Request message, the aggregator helper 225 may send a Positive Aggregator Helper Join Response message 906 to the aggregator 220, and enter the Joined state 820, in which the aggregator helper 225 acts as a cooperative node in a path between a source 210 and the aggregator 220.

As illustrated in FIG. 9B, at the Joined state 820, the aggregator helper 225 acts as a cooperative node in a path between a source 210 and an aggregator 220. Here, the aggregator helper 225 may receive a Release Indication message 908, indicating to release the path between the source 210 and the aggregator 220, including the aggregator helper 225. In response, the aggregator helper 225 may send a Helper Release Notification message 910 to the aggregator 220 to release the corresponding path. Further, the aggregator helper 225 may receive a Helper Release Command message 912 from an aggregator 220 to release a path between the aggregator 220 and a source 210. Here, the aggregator helper 225 may enter the Released state 810, wherein the aggregator helper 225 does not act as a cooperative node for a path between a source 210 and an aggregator 220.

State and SDL Diagrams of a Source

Figure 10:
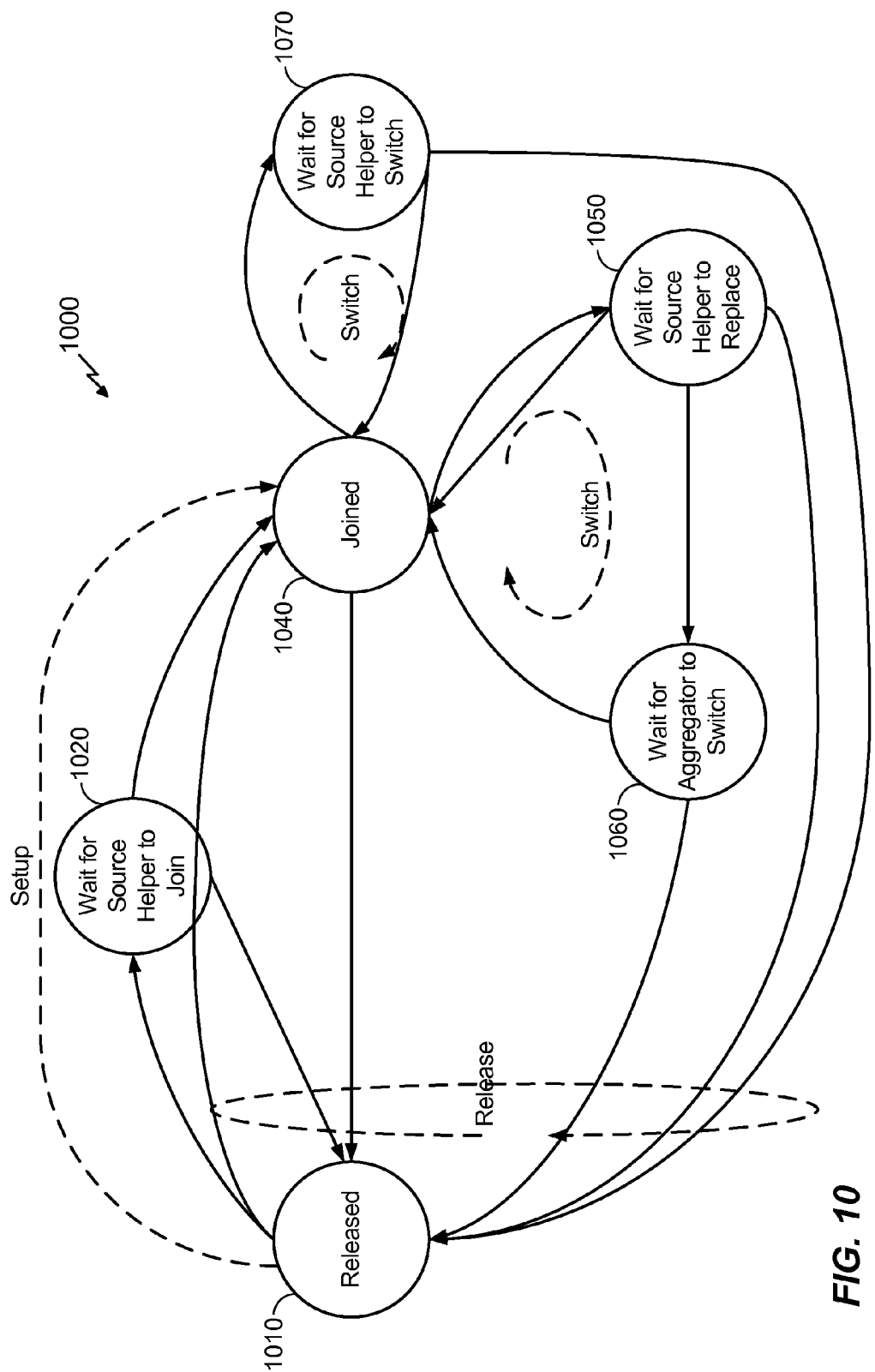
FIG. 10 illustrates a state transition diagram for a source.

Referring once again to the multipath overlay network 200 illustrated in FIG. 2, it is seen that a source 210 may be capable of sending information over multiple paths to a corresponding aggregator 220. In an aspect of the disclosure, as illustrated in FIG. 10, a source 210 may include a master state machine that governs the path management of the multiple paths established with the corresponding aggregator 220. In a further aspect of the disclosure, a master state machine for a source 210 can include multiple atomic state machines. Here, each atomic state machine governs the path management of a path between the source 210 and the corresponding aggregator 220.

A state transition diagram 1000 for a source 210 in accordance with some aspects of the disclosure is shown in FIG. 10. For each atomic state machine of the source 210, the source 210 has states including a Released state 1010; a Wait for Source Helper to Join state 1020; a Joined state 1040; a Wait for Source Helper to Replace state 1050; a Wait for Aggregator to Switch state 1060; and a Wait for Source Helper to Switch state 1070. At some of the states, as described below, the source 210 may utilize timers including an Original Helper Join timer, a Replacement Helper Join timer, and an Aggregator Join timer. Further, in some of the states, the source 210 may utilize a binary state variable "helper_active" for state reduction, with, e.g., a default value set to false. Signaling messages that are not designed to be handled as inputs at a certain state may be queued for a delayed processing.

Figure 11A:
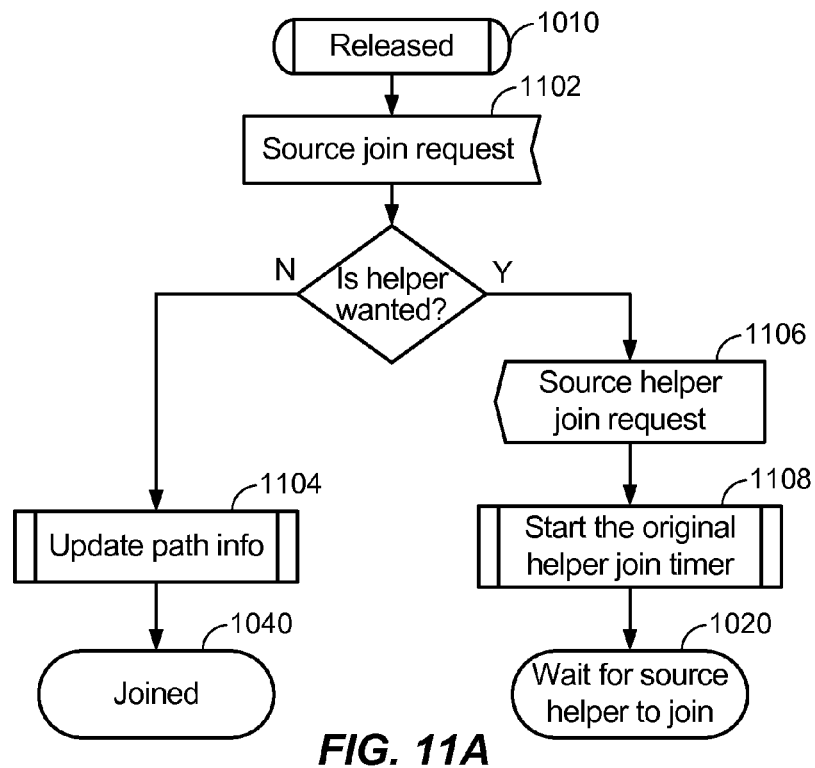
FIGS. 11A-11F illustrate an SDL diagram for a source.

FIGS. 11A-11F are SDF flow charts illustrating state transitions in the state transition diagram 1000 illustrated in FIG. 10. As illustrated in FIG. 11A, at the Released state 1010, the path between the source 210 and the node corresponding to this particular atomic state machine is released. Here, the source 210 may transition to the Joined state 1040 or the Wait for Source Helper to Join state 1020. The source 210 may receive a Source Join Request message 1102 from an aggregator 220 to request the source 210 to setup a path between the source 210 and the aggregator 220. If the source 210 is not in need of a helper, then the source 210 may update path information 1104 to establish a direct path from the source 210 to the aggregator 220, and may move to the Joined state 1040. If the source 210 desires a helper, the source 210 may send a Source Helper Join Request message 1106 to the corresponding source helper 215, and start an Original Helper Join timer 1108. The source 210 may then enter the Wait for Source Helper to Join state 1020.

Figure 11B:
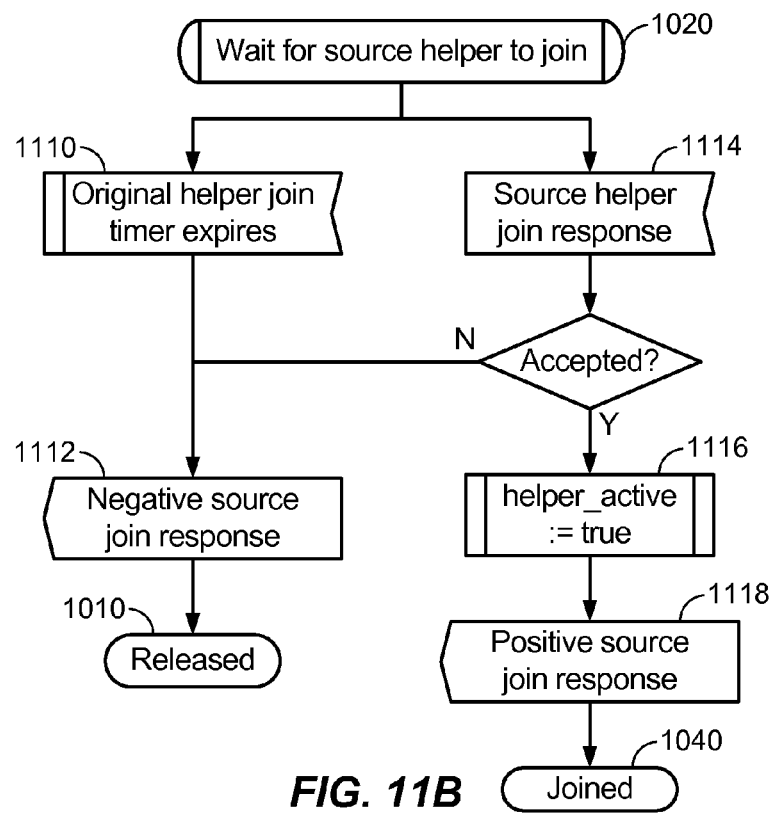

As illustrated in FIG. 11B, at the Wait for Source Helper to Join state 1020, the source 210 has sent a Source Helper Join Request message, and is awaiting, for the duration of the Original Helper Join timer, a Source Helper Join Response message. Here, if the Original Helper Join timer expires 1110, the source 210 may send a Negative Source Join Response message 1112 to the aggregator 220, and may enter the Released state 1010. However, prior to the expiration of the Original Helper Join timer, the source 210 may receive a Source Helper Join Response message 1114. If the message is not accepted, the source 210 may send a Negative Source Join Response message 1112 to the aggregator 220, and may enter the Released state 1010. If the message is accepted, the source 210 may then set the helper_active variable to true 1116, send a Positive Source Join Response message 1118, and enter the Joined state 1040.

Figure 11C:
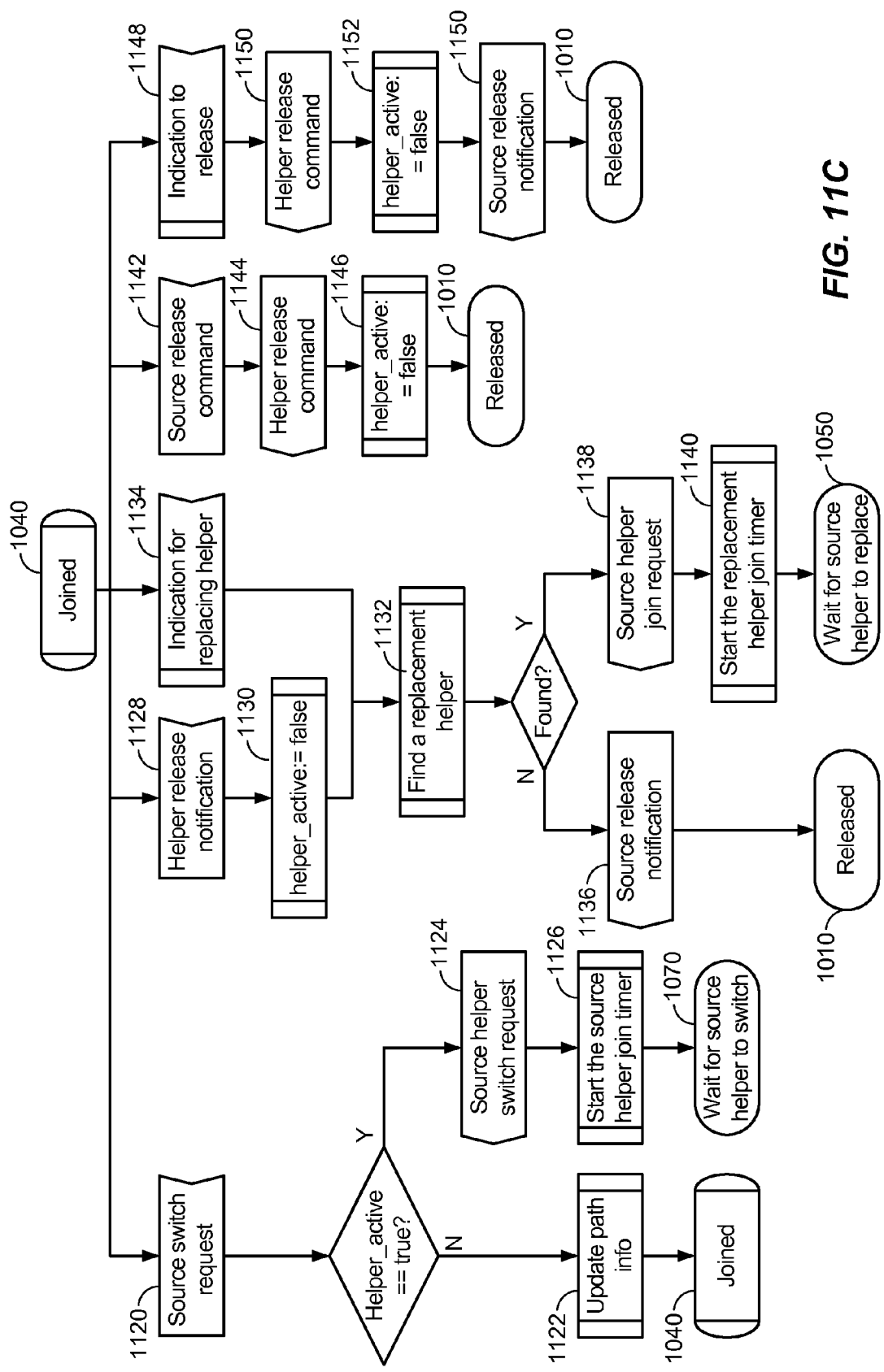

As illustrated in FIG. 11C, at the Joined state 1040, a path from the source 210 to a corresponding aggregator 220 exists, that path including the node corresponding to this particular atomic state machine. Here, the source 210 may receive a Source Switch Request message 1120 from the aggregator 220, to request the source 210 to switch a path between the source 210 and the aggregator 220. If the helper_active variable is false, then the source 210 may update path information 1122 to indicate the new path between the source 210 and the aggregator 220, and may enter the Joined state 1040. However, if the helper_active variable is true, then the source 210 may send a Source Helper Switch Request message 1124 to a source helper 215 to request the source helper 215 to switch a path between the source 210 and the aggregator 220, start the Source Helper Join timer 1126, and enter the Wait for Source Helper to Switch state 1070. Further, in the Joined state 1040, the source 210 may receive a Helper Release Notification message 1128 from a helper node, indicating to release a particular path utilizing that node, between the source 210 and the aggregator 220. Here, to release the path, the source 210 may set the helper_active variable to false 1130, and seek to find a replacement helper 1132. In the Joined state 1040, the source 210 may also receive an indication for replacing a joined helper 1134, in response to which the source 210 similarly may seek to find a replacement helper 1132. Here, if a replacement helper is not found, the source 210 may send a Source Release Notification message 1136 to the aggregator 220 to release the path between the source 210 and the aggregator 220, and enter the Released state 1010. If a replacement helper is found, the source 210 may send a Source Helper Join Request message 1138 to the found source helper 215, seeking to set up the path between the source 210 and the aggregator 220 utilizing the found source helper 215. The source 210 may then start the Replacement Helper Join timer 1140, and enter the Wait for Source Helper to Replace state 1050. Further, in the Joined state 1040, the source 210 may receive a Source Release Command message 1142 from the aggregator 220 indicating to release a path between the source 210 and the aggregator 220. Here, the source 210 may send a Helper Release Command message 1144 to a joined helper to release a path between the source 210 and the aggregator 220 utilizing the corresponding helper, and set the helper_active variable to false 1146, before entering the Released state 1010. Further, in the Joined state 1040, the source 210 may receive an Indication to Release message 1148, in response to which the source 210 may send a Helper Release Command message 1150 to the corresponding helper to release a path between the source 210 and the aggregator 220 utilizing that helper node. The source 210 may then set the helper_active variable to false 1152, send a Source Release Notification message 1154 to the aggregator 220, and enter the Released state 1010.

Figure 11D:
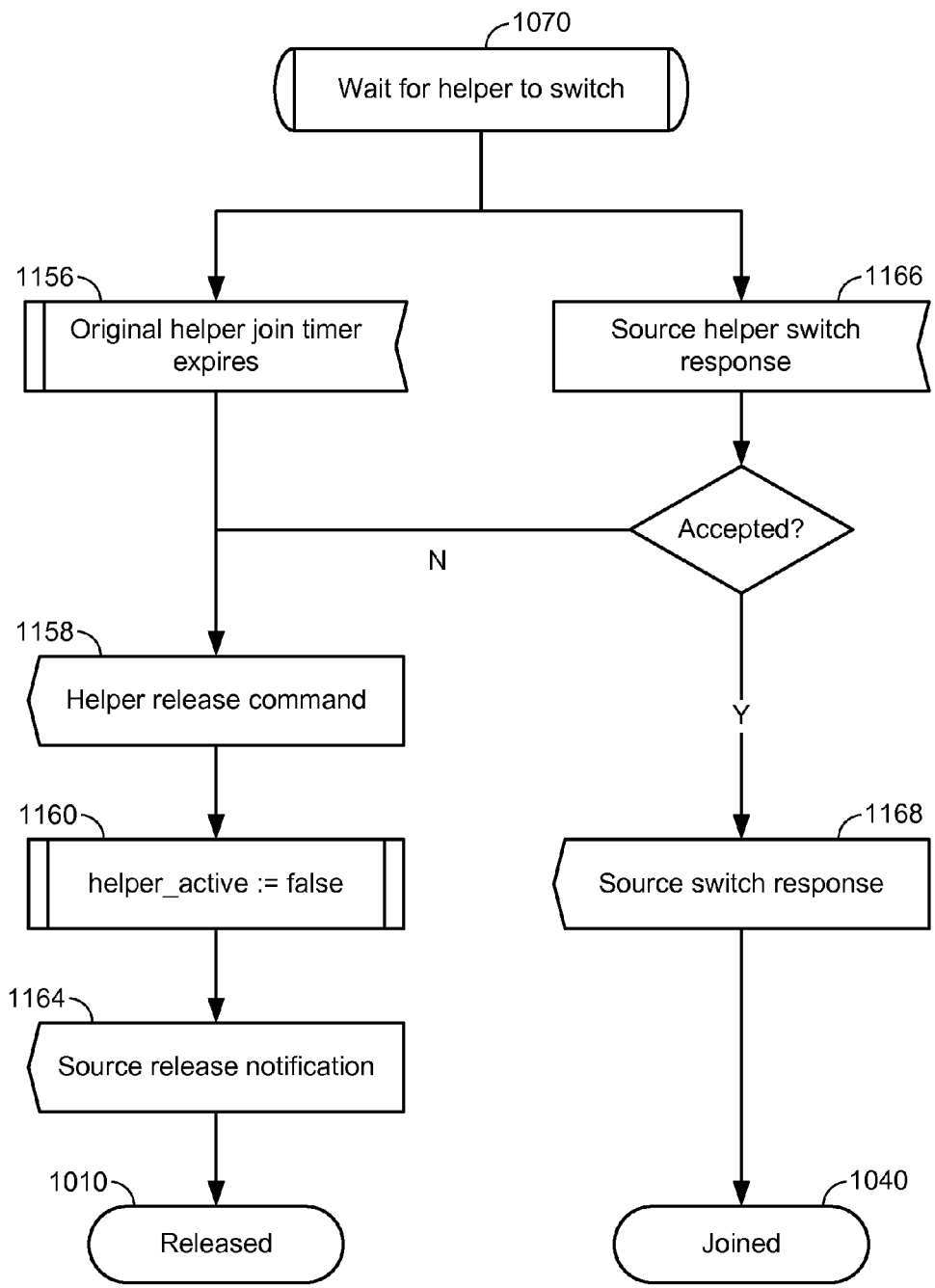

As illustrated in FIG. 11D, at the Wait for Helper to Switch state 1070, the source 210 has sent a Source Helper Switch Request message, and is awaiting, for the duration of the Original Helper Join timer, a Source Helper Switch Response message. Here, if the Original Helper Join timer expires 1156, the source 210 may send a Helper Release command 1158 to the respective helper, to release the corresponding path between the source 210 and the aggregator 220 utilizing that helper node. The source 210 may then set the helper_active variable to false 1160, and enter the Released state 1010. However, prior to the expiration of the Original Helper Join timer, the source 210 may receive a Source Helper Switch Response message 1166 from the source helper 215 in response to a Source Helper Switch Request message. If the source 210 does not accept the Source Helper Switch Response message, the source 210 may follow the process outlined just above to enter into the Released state 1010. If the source 210 accepts the Source Helper Switch Response message 766, then the source 210 may send a Source Switch Response message 1168 to the aggregator to respond to the Source Switch Request message, and may enter the Joined state 1040.

Figure 11E:
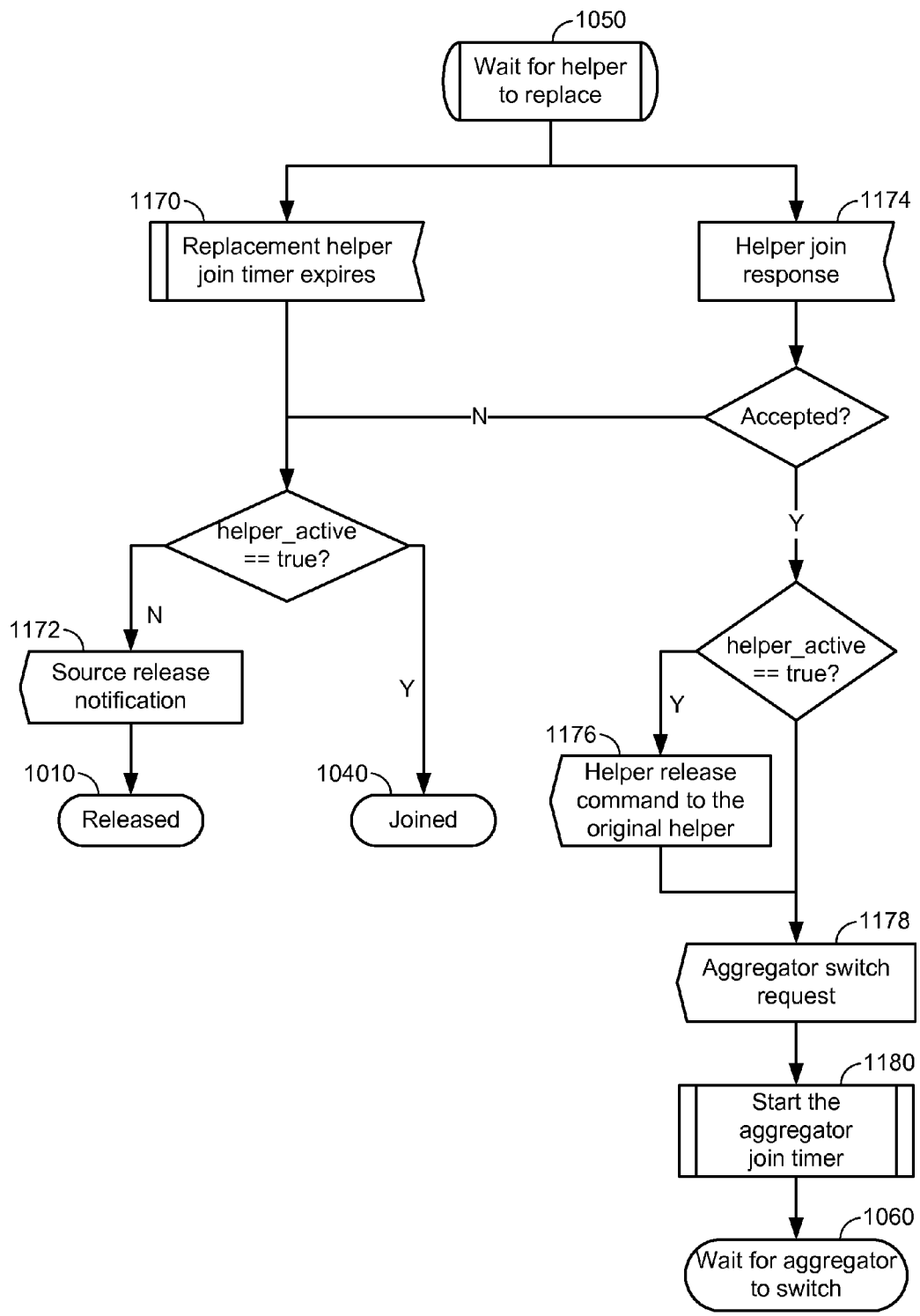

As illustrated in FIG. 11E, at the Wait for Source Helper to Replace state 1150, the source 210 has sent a Source Helper Join Request message to a found replacement source helper 215, and is awaiting, for the duration of the Replacement Helper Join timer, a Source Helper Join Response message from the found replacement source helper 215. Here, if the Replacement Helper Join timer expires 1170, but if the helper_active variable is false (indicating that the source 210 is not joined to a helper node), the source 210 sends a Source Release Notification message 1172 to the aggregator 220 to release the path between the source 210 and the aggregator 220, and enters the Released state 1010. However, if the Replacement Helper Join timer expires 1170, and the helper_active variable is true, then the source 210 enters the Joined state 1040, retaining the path between the source 210 and the aggregator 220 that includes the helper corresponding to this particular atomic state machine. Further, prior to the expiration of the Replacement Helper Join timer, the source 210 may receive a Source Helper Join Response message 1174 from a corresponding source helper 215 in response to a Source Helper Join Request message. If the source 210 does not accept the Source Helper Join Response message, then the source 210 follows the process outlined above to enter into either the Released state 1010 or the Joined state 1040. If the source 210 accepts the Source Helper Join Response message from the source helper 215, and if the helper_active variable is true, the source 210 may send a Helper Release Command message 1176 to the original helper to release the corresponding path between the source 210 and the aggregator 220 utilizing that helper node. If the helper_active variable is false, the source 210 may skip the sending of the Helper Release Command message 1176. Next, the source 210 may send an Aggregator Switch Request message 1178 to the aggregator 220 to request the aggregator 220 to switch a path between the source 210 and the aggregator 220, start the Aggregator Join timer 1180, and enter the Wait for Aggregator to Switch state 1060.

Figure 11F:
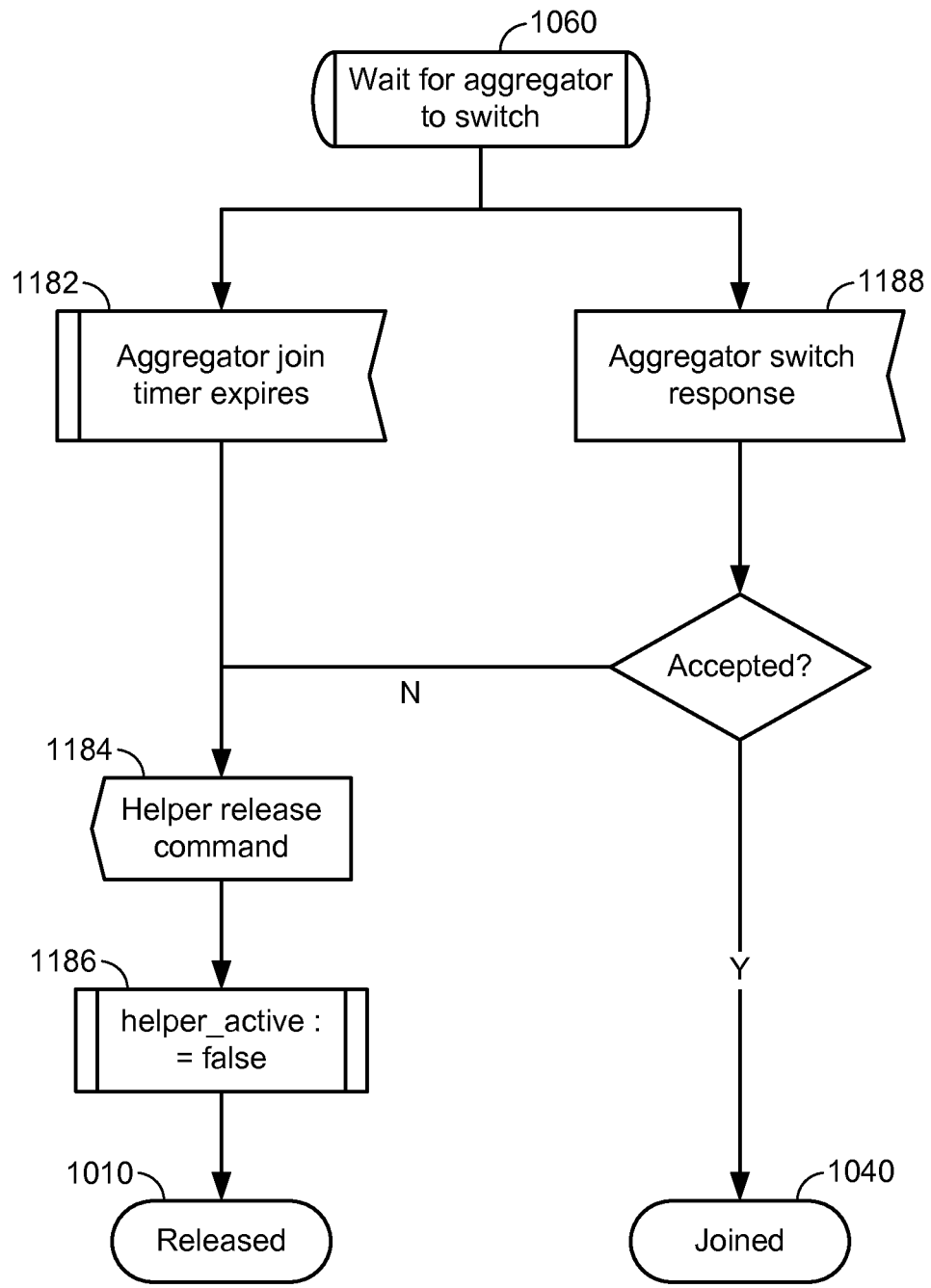

As illustrated in FIG. 11F, at the Wait for Aggregator to Switch state 1060, the source 210 has sent an Aggregator Switch Request message, and is awaiting, for the duration of the Aggregator Join timer, an Aggregator Switch Response message. Here, if the Aggregator Join timer expires 1182, the source 210 may send a Helper Release command 1184 to the respective helper, to release the corresponding path between the source 210 and the aggregator 220 utilizing that helper node. The source 210 may then set the helper_active variable to false 1186, and enter the Released state 1010. However, prior to the expiration of the Aggregator Join timer, the source 210 may receive an Aggregator Switch Response message 1188 from the aggregator 220 in response to the Aggregator Switch Request message. If the source 210 does not accept the Aggregator Switch Response message, the source 210 may follow the process outlined just above to enter into the Released state 1010. If the source 210 accepts the Aggregator Switch Response message 1188, then the source 210 enters the Joined state 1040.

State and SDL Diagrams of a Source Helper

Figure 12:
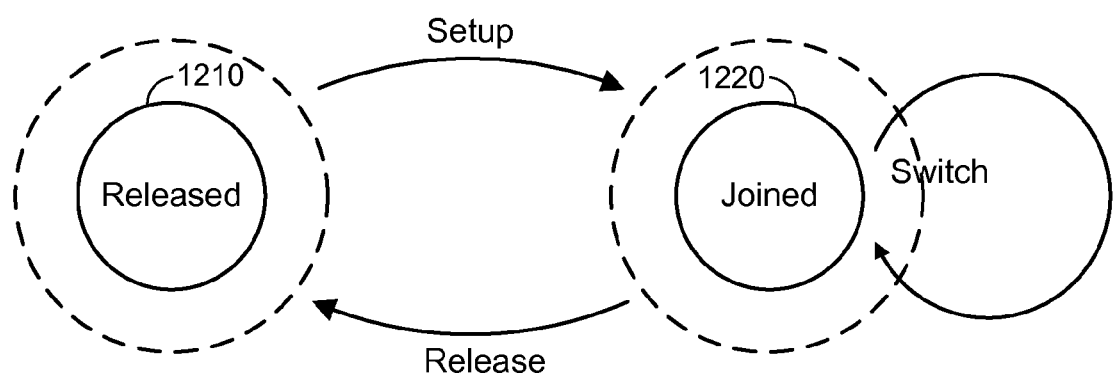
FIG. 12 illustrates a state transition diagram for a source helper.

FIG. 12 is an illustration of a state machine 1200 corresponding to a source helper 215, illustrated in FIG. 2. A source helper 215 may include a Released state 1210 and a Joined state 1220. That is, the source helper 215 may be joined to take part in forming a path, or may be released as a cooperative node.

Figure 13A:
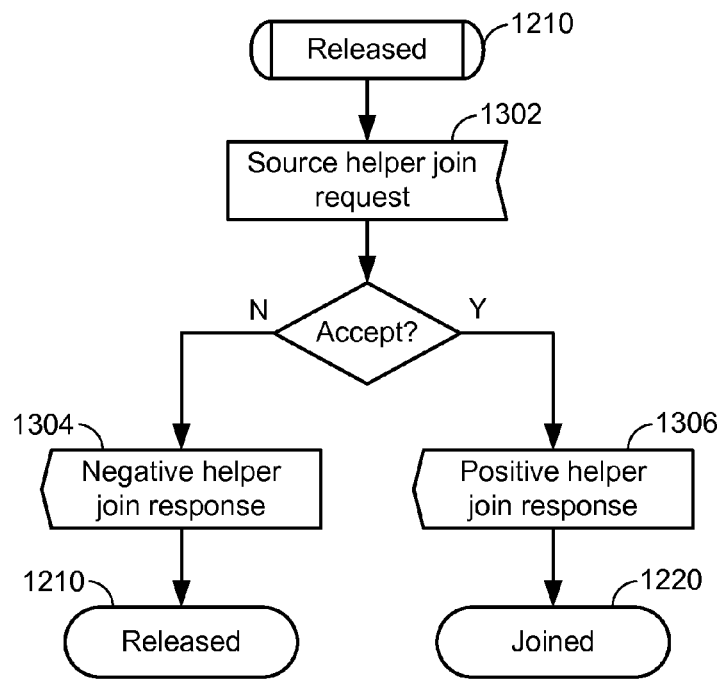
FIGS. 13A-13B illustrate an SDL diagram for a source helper.
Figure 13B:
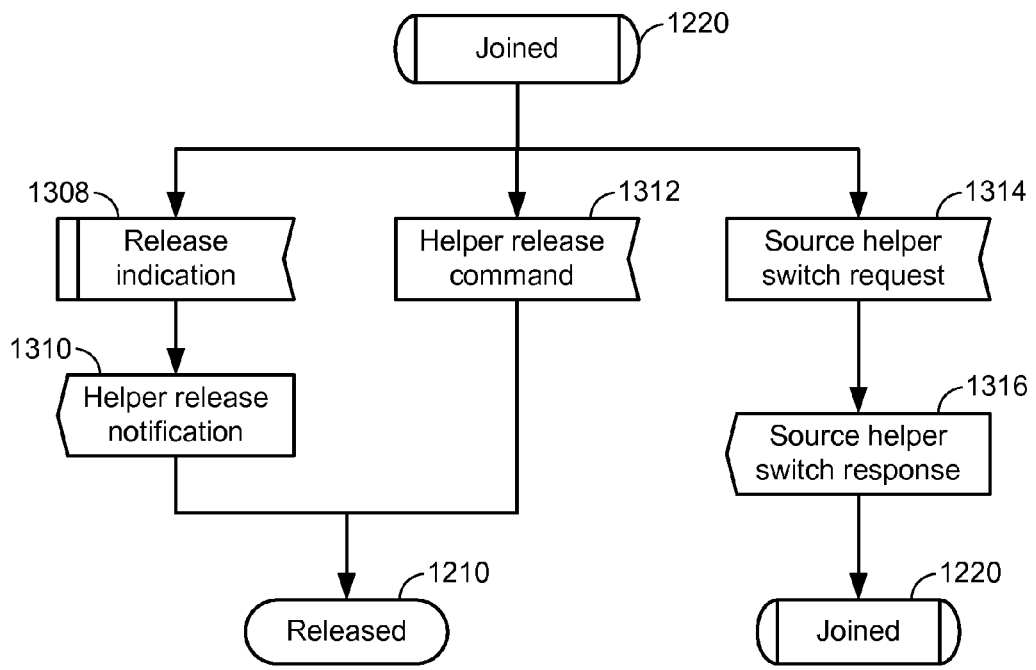

FIGS. 13A-13B are SDL flow charts illustrating state transitions in the state transition diagram 1200 illustrated in FIG. 12. As illustrated in FIG. 13A, at the Released state 1210, the source helper 215 does not act as a cooperative node for a path between a source 210 and an aggregator 220. Here, the source helper 215 may receive a Source Helper Join Request message 1302 from a source 210 to request the source helper 215 set up a path between the source 210 and an aggregator 220. If the source helper 215 does not accept the Source Helper Join Request message, the source helper 215 may send a Negative Source Helper Join Response message 1304 to the source 210, and return to the Released state 1210. If the source helper 215 accepts the Source Helper Join Request message, the source helper 215 may send a Positive Source Helper Join Response message 1306 to the source 210, and enter the Joined state 1220, in which the source helper 215 acts as a cooperative node in a path between the source 210 and an aggregator 220.

As illustrated in FIG. 13B, at the Joined state 1220, the source helper 215 acts as a cooperative node in a path between a source 210 and an aggregator 220. Here, the source helper 215 may receive a Release Indication 1308, and in response, the source helper 215 may send a Helper Release Notification message 1310 to the source 210 to release the path between the source 210 and an aggregator 220 utilizing the source helper 215. Further, the source helper 215 may receive a Helper Release Command message 1312 from a source 210 to release a path between the source 210 and an aggregator 220. Here, the source helper 215 may enter the Released state 1210, wherein the source helper 215 does not act as a cooperative node for a path between a source 210 and an aggregator 220. Still further, the source helper 215 may receive a Source Helper Switch Request message 1314 from the source 210 to request the source helper 215 to switch a path between the source 210 and an aggregator 220. Here, the source helper 215 may respond by sending a Source Helper Switch Response message 1316 and enter the Joined state 1220.

Multipath Overlay Network Packet Header

An example of a data packet header that may be utilized in multipath overlay network data packets are shown in FIG. 14. The message type field in the packet header of data packets may be set to "data," and the data payload of the data packets may start immediately after the packet header.

An example of a signaling packet header that may be utilized in multipath overlay network signaling messages is shown in FIG. 15. The payload of the corresponding signaling messages may start immediately after the packet header.

The meanings of the packet header fields for a particular implementation in accordance with some aspects of the disclosure are given in Table 2.

TABLE 2

Packet Header Fields

| Field | Description |
| --- | --- |
| Version | Version of the overlay network protocol |
| Ext | When set to 1, indicates that there is an extension header after the standard header |
| Message type | Overlay network message type |
| Packet length | Number of bytes in the payload |
| TTL | Time to live, or number of hops this message can live in the overlay network |
| Label ID | Label ID on a one hop link between two overlay network nodes |
| Payload type | Format of the payload; determines its interpretation by the application |

In the "message type" field of the packet header, an information element for characterizing the overlay network message type may be carried. The message types utilized in an exemplary implementation in accordance with some aspects of the present disclosure are listed in Table 3.

TABLE 3

Message Types

| Message Type Value | Message Type Name | Data or Signaling |
| --- | --- | --- |
| 0 | Data | Data |
| 1 | Aggregator Helper Join Request | Signaling |
| 2 | Aggregator Helper Join Response | Signaling |
| 3 | Source Join Request | Signaling |
| 4 | Source Join Response | Signaling |
| 5 | Aggregator Switch Request | Signaling |
| 6 | Aggregator Switch Response | Signaling |
| 7 | Source Switch Request | Signaling |
| 8 | Source Switch Response | Signaling |
| 9 | Source Helper Join Request | Signaling |
| 10 | Source Helper Join Response | Signaling |
| 11 | Source Helper Switch Request | Signaling |
| 12 | Source Helper Switch Response | Signaling |
| 13 | Source Release Command | Signaling |
| 14 | Source Release Notification | Signaling |
| 15 | Helper Release Command | Signaling |
| 16 | Helper Release Notification | Signaling |
| 17-256 | Reserved | N/A |

Multipath Overlay Network Signaling Messages

Referring now to FIG. 2 and Table 3, in accordance with some aspects of the disclosure, an Aggregator Helper Join Request message may be sent from the aggregator 220 to corresponding aggregator helper 225, in order to request the aggregator helper 225 to set up a path between the source 210 and the aggregator 220. An Aggregator Helper Join Request message for a particular implementation in accordance with some aspects of the disclosure is listed in Table 4.

TABLE 4

Aggregator Helper Join Request Message

| Field | Description | Length |
|---|---|---|
| Aggregator address | Overlay network address of the aggregator: used by the receiver of the Join Request to identify the its sender | 32 bits |
| Aggregator helper address | Overlay network address of the aggregator helper: used by the receiver of the Join Request to check whether this message should be processed | 32 bits |
| Transaction ID | Unique ID of this transaction | 8 bits |
| Label ID | Used for the packet sent from the aggregator helper to the aggregator over this data path | 8 bits |
| Transport layer type | Transport layer type to be used for the data delivered over this path, such as TCP, UDP, etc. | 4 bits |
| Payload Type | Payload type of the data delivered over this path | 4 bits |
| Reserved | | 8 bits |

An Aggregator Helper Join Response message for a particular implementation in accordance with some aspects of the disclosure is listed in Table 5. Here, the Aggregator Helper Join Response message may be sent from the aggregator helper 225 to the aggregator 220, in order to respond to a corresponding Aggregator Helper Join Request message.

TABLE 5

Aggregator Helper Join Response Message

| Field | Description | Length |
|---|---|---|
| Aggregator helper address | Overlay network address of the aggregator helper: used by the receiver of the Join Response to identify its sender | 32 bits |
| Aggregator address | Overlay network address of the aggregator: used by the receiver of the Join Response to check whether this message should be processed | 32 bits |
| Transaction ID | May be equal to the transaction ID in the corresponding Aggregator Helper Join Request | 8 bits |
| Response code | 0x00 = accept; otherwise, reject with various reasons | 8 bits |
| Label ID | Identifies the label ID that should be used for the packet sent from the source or source helper to the aggregator helper over this data path | 8 bits |
| Reserved | | 8 bits |

A Source Join Request message for a particular implementation in accordance with some aspects of the disclosure is listed in Table 6. Here, the Source Join Request message may be sent from the aggregator 220 to the source 210 to request the source 210, in order to setup a path between the source 210 and the aggregator 220.

TABLE 6

Source Join Request Message

| Field | Description | Length |
|---|---|---|
| Aggregator address | Overlay network address of the aggregator: used by the receiver of the Join Request to identify its sender | 32 bits |
| Source address | Overlay network address of the source: used by the receiver of the Join Request to check whether this message should be processed | 32 bits |
| Transaction ID | Unique ID of this transaction | 8 bits |
| Session ID | Uniquely identifies the traffic session to be delivered over multiple paths between the source and the aggregator | 32 bits |
| Path index | Index of the path for this traffic session between the source and the aggregator | 4 bits |
| Aggregator or aggregator helper address | Overlay network address of the aggregator helper: may be used by either the source or the source helper | 32 bits |
| Label ID | Used for the packet sent from the source or source helper to the aggregator or aggregator helper over this data path | 8 bits |
| Transport layer type | Transport layer type to be used for the data delivered over this path, such as TCP, UDP, etc. | 4 bits |
| Payload Type | Payload type of the data delivered over this path | 4 bits |
| Reserved | | 4 bits |

A Source Join Response message for a particular implementation in accordance with some aspects of the disclosure is listed in Table 7. Here, the Source Join Response message may be sent from the source 210 to the aggregator 220, in order to respond to a Source Join Request message.

TABLE 7

Source Join Response Message

| Field | Description | Length |
|---|---|---|
| Source address | Overlay network address of the source: used by the receiver of the Join Response to identify its sender | 32 bits |
| Aggregator address | Overlay network address of the aggregator: used by the receiver of the Join Response to check whether this message should be processed | 32 bits |
| Transaction ID | May be equal to the transaction ID in the corresponding Source Join Request message | 8 bits |
| Response code | 0x00 = accept; otherwise, reject with various reasons | 8 bits |
| Source or source helper address | Overlay network address of the source or the source helper | 32 bits |

An Aggregator Switch Request message for a particular implementation in accordance with some aspects of the disclosure is listed in Table 8. Here, the Aggregator Switch Request message may be sent from the source 210 to the aggregator 220, in order to request the aggregator 220 to switch a path between the source 210 and the aggregator 220.

TABLE 8

Aggregator Switch Request Message

| Field | Description | Length |
|---|---|---|
| Source address | Overlay network address of the source: used by the receiver of the Switch Request to identify its sender | 32 bits |
| Aggregator address | Overlay network address of the aggregator: used by the receiver of the Switch Request to check whether this message should be processed | 32 bits |
| Transaction ID | Unique ID of this transaction | 8 bits |

TABLE 8-continued

Aggregator Switch Request Message

| Session ID | Uniquely identifies the traffic session to be delivered over multiple paths between the source and the aggregator | 32 bits |
| --- | --- | --- |
| Path index | Index of the path for this traffic session between the source and the aggregator | 4 bits |
| Source or source helper address | Overlay network address of the source or the source helper | 32 bits |
| Label ID | Used for the packet sent from the source or source helper to the aggregator helper over this data path | 8 bits |
| Reserved | | 12 bits |

An Aggregator Switch Response message for a particular implementation in accordance with some aspects of the disclosure is listed in Table 9. Here, the Aggregator Switch Response message may be sent from the aggregator 220 to the source 210, in order to respond to an Aggregator Switch Request message.

TABLE 9

Aggregator Switch Response Message

| Field | Description | Length |
| --- | --- | --- |
| Aggregator address | Overlay network address of the aggregator: used by the receiver of the Switch Request to identify its sender | 32 bits |
| Source address | Overlay network address of the source: used by the receiver of the Switch Request to check whether this message should be processed | 32 bits |
| Transaction ID | Equal to the transaction ID in the corresponding Aggregator Switch Request message | 8 bits |
| Response code | 0x00 = accept; otherwise, reject with various reasons | 8 bits |

A Source Switch Request message for a particular implementation in accordance with some aspects of the disclosure is listed in Table 10. Here, the Source Switch Request message may be sent from the aggregator 220 to the source 210, in order to request the source 210 to switch a path between the source 210 and the aggregator 220.

TABLE 10

Source Switch Request Message

| Field | Description | Length |
| --- | --- | --- |
| Aggregator address | Overlay network address of the aggregator: used by the receiver of the Switch Request to identify its sender | 32 bits |
| Source address | Overlay network address of the source: used by the receiver of the Switch Request to check whether this message should be processed | 32 bits |
| Transaction ID | Unique ID of this transaction | 8 bits |
| Session ID | Uniquely identifies the traffic session to be delivered over multiple paths between the source and the aggregator | 32 bits |
| Path index | Index of the path for this traffic session between the source and the aggregator | 4 bits |
| Aggregator or old aggregator helper address | Overlay network address of the aggregator or the old aggregator helper | 32 bits |
| Old Label ID | Old label ID used on the packet sent from the source or source helper to the aggregator or the aggregator helper over this data path | 8 bits |
| Aggregator or new aggregator helper address | Overlay network address of the aggregator or the new aggregator helper | 32 bits |

TABLE 10-continued

Source Switch Request Message

| Field | Description | Length |
| --- | --- | --- |
| New Label ID | New label ID to be used on the packet sent from the source or source helper to the aggregator or the aggregator helper over this data path | 8 bits |
| Reserved | | 4 bits |

A Source Switch Response message for a particular implementation in accordance with some aspects of the disclosure is listed in Table 11. Here, the Source Switch Response message may be sent from the source 210 to the aggregator 220, in order to respond to a Source Switch Request message.

TABLE 11

Source Switch Response Message

| Field | Description | Length |
| --- | --- | --- |
| Source address | Overlay network address of the source: used by the receiver of the Switch Response to identify its sender | 32 bits |
| Aggregator address | Overlay network address of the aggregator: used by the receiver of the Switch Response to check whether this message should be processed | 32 bits |
| Transaction ID | Equal to the transaction ID in the corresponding Source Switch Request message | 8 bits |
| Response code | 0x00 = accept; otherwise, reject with various reasons | 8 bits |

A Source Helper Join Request message for a particular implementation in accordance with some aspects of the disclosure is listed in Table 12. Here, the Source Helper Join Request message may be sent from the source 210 to the source helper 215, in order to request the source helper 215 to set up a path between the source 210 and the aggregator 220.

TABLE 12

Source Helper Join Request Message

| Field | Description | Length |
| --- | --- | --- |
| Source address | Overlay network address of the source: used by the receiver of the Join Request to identify its sender | 32 bits |
| Source helper address | Overlay network address of the source helper: used by the receiver of the Join Request to check whether this message should be processed | 32 bits |
| Transaction ID | Unique ID of this transaction | 8 bits |
| Aggregator or aggregator helper address | Overlay network address of the aggregator or aggregator helper: used by the source helper as the next hop overlay network address for this path | 32 bits |
| Label ID | Used by the source helper for the packet sent from the source helper to the aggregator or the aggregator helper over this data path | 8 bits |
| Transport layer type | Transport layer type to be used for the data delivered over this path, such as TCP, UDP, etc. | 4 bits |
| Payload Type | Payload type of the data delivered over this path | 4 bits |
| Reserved | | 8 bits |

A Source Helper Join Response message for a particular implementation in accordance with some aspects of the disclosure is listed in Table 13. Here, the Source Helper Join Response message may be sent from the source helper 215 to the source 210, in order to respond to a Source Helper Join Request message.

TABLE 13

Source Helper Join Response Message

| Field | Description | Length |
|---|---|---|
| Source helper address | Overlay network address of the source helper: used by the receiver of the Join Response to identify its sender | 32 bits |
| Source address | Overlay network address of the source: used by the receiver of the Join Response to check whether this message should be processed | 32 bits |
| Transaction ID | Equal to the transaction ID in the corresponding Source Helper Join Request message | 8 bits |
| Response code | 0x00 = accept; otherwise, reject with various reasons | 8 bits |
| Label ID | Used for the packet sent from the source to the source helper over this data path | 8 bits |
| Reserved | | 8 bits |

A Source Helper Switch Request message for a particular implementation in accordance with some aspects of the disclosure is listed in Table 14. Here, the Source Helper Switch Request message may be sent from the source 210 to the source helper 215, in order to request a source helper 215 to switch a path between the source and the aggregator.

TABLE 14

Source Helper Switch Request Message

| Field | Description | Length |
|---|---|---|
| Source helper address | Overlay network address of the source helper: used by the receiver of the Switch Request to identify its sender | 32 bits |
| Source address | Overlay network address of the source: used by the receiver of the Switch Request to check whether this message should be processed | 32 bits |
| Transaction ID | Equal to the transaction ID in the corresponding Source Helper Switch Request message | 8 bits |
| Response code | 0x00 = accept; otherwise, reject with various reasons | 8 bits |

A Source Helper Switch Response message for a particular implementation in accordance with some aspects of the disclosure is listed in Table 15. Here, the Source Helper Switch Response message may be sent from the source helper 215 to the source 210, in order to respond to the Source Helper Switch Request message.

TABLE 15

Source Helper Switch Response Message

| Field | Description | Length |
|---|---|---|
| Source helper address | Overlay network address of the source helper: used by the receiver of the Switch Response to identify its sender | 32 bits |
| Source address | Overlay network address of the source: used by the receiver of the Switch Response to check whether this message should be processed | 32 bits |
| Transaction ID | Equal to the transaction ID in the corresponding Source Helper Switch Request message | 8 bits |
| Response code | 0x00 = accept; otherwise, reject with various reasons | 8 bits |

A Source Release Command message for a particular implementation in accordance with some aspects of the disclosure is listed in Table 16. Here, the Source Release Command message may be sent from the aggregator 220 to the source 210, in order to release a path between the source 210 and the aggregator 220.

TABLE 16

Source Release Command Message

| Field | Description | Length |
|---|---|---|
| Aggregator address | Overlay network address of the aggregator: used by the receiver of the Release Command to identify its sender | 32 bits |
| Source address | Overlay network address of the source: used by the receiver of the Release Command to check whether this message should be processed | 32 bits |
| Session ID | Uniquely identify the traffic session to be delivered over multiple paths between the source and the aggregator | 32 bits |
| Path index | Index of the path for this traffic session between the source and the aggregator | 4 bits |
| Aggregator or aggregator helper address | Overlay network address of the aggregator or the aggregator helper | 32 bits |
| Label ID | Label ID used for the packet sent from the source or source helper to the aggregator or the aggregator helper over this data path | 8 bits |
| Reserved | | 4 bits |

A Source Release Notification message for a particular implementation in accordance with some aspects of the disclosure is listed in Table 17. Here, the Source Release Notification message may be sent from the source 210 to the aggregator 220, in order to release a path between the source 210 and the aggregator 220.

TABLE 17

Source Release Notification Message

| Field | Description | Length |
|---|---|---|
| Source address | Overlay network address of the source: used by the receiver of the Release Notification to identify its sender | 32 bits |
| Aggregator address | Overlay network address of the aggregator: used by the receiver of the Release Notification to check whether this message should be processed | 32 bits |
| Session ID | Uniquely identify the traffic session to be delivered over multiple paths | 32 bits |
| Path index | Index of the path for this traffic session | 4 bits |
| Source or source helper address | Overlay network address of the source or the source helper | 32 bits |
| Label ID | Label ID used for the packet sent from the source or source helper to the aggregator or the aggregator helper over this data path | 8 bits |
| Reserved | | 8 bits |

A Helper Release Command message for a particular implementation in accordance with some aspects of the disclosure is listed in Table 18. Here, the Helper Release Command message may be sent from the aggregator 220 or the source 210 to its respective helper 225 or 215, in order to release a path between the aggregator 220 and the source 210.

TABLE 18

Helper Release Command Message

| Field | Description | Length |
|---|---|---|
| Aggregator or source address | Overlay network address of the aggregator or source: used by the receiver of the Release Command to identify its sender | 32 bits |
| Aggregator helper or source helper address | Overlay network address of the aggregator helper or source helper: used by the receiver of the Release Command to check whether this message should be processed | 32 bits |

TABLE 18-continued

Helper Release Command Message

| Field | Description | Length |
|---|---|---|
| Label ID | Label ID used for the packet sent from the source or source helper to the aggregator or the aggregator helper over this data path | 8 bits |
| Reserved | | 8 bits |

A Helper Release Notification message for a particular implementation in accordance with some aspects of the disclosure is listed in Table 19. Here, the Helper Release Notification message may be sent from a respective helper 225, 215 to its aggregator 220 or source 210, in order to release a path between the source 210 and the aggregator 220.

TABLE 19

Helper Release Notification Message

| Field | Description | Length |
|---|---|---|
| Aggregator helper or source helper address | Overlay network address of the aggregator helper or source helper: used by the receiver of the Release Notification to identify its sender | 32 bits |
| Aggregator or source address | Overlay network address of the aggregator or source: used by the receiver of the Release Notification to check whether this message should be processed | 32 bits |
| Label ID | Label ID used for the packet sent from the source or source helper to the aggregator or the aggregator helper over this data path. | 8 bits |
| Reserved | | 8 bits |

Nodes, such as aggregators, sources, their respective helpers, processors contained therein, computer program products, etc., may "support" data transport and communication, as disclosed in the specification, by providing or originating data, as provided, for example, by a source (in one or more substreams containing distinct descriptions of the data), relaying a description of the data in a substream, as provided, for example by a source helper and aggregator helper, and by receiving and aggregating one or more descriptions of the data in respective substreams, as provided, for example, by an aggregator.

In the methods provided supra, the protocol execution relies on distinguishing between aggregator helpers and source helpers, as messages between a node and the node's helper differ depending on whether the node's helper is an aggregator helper or a source helper. In exemplary methods, provided infra with respect to FIGS. 16-28, the protocol execution does not rely on distinguishing between aggregator helpers and source helpers. In the exemplary methods, the message types may be as provided in Table 20.

TABLE 20

Messages Types

| Message Type Value | Message Type Name | Data or Signaling |
|---|---|---|
| 0 | Data | Data |
| 1 | Helper Join Request for Incoming Path | MMP Signaling |
| 2 | Helper Join Response for Incoming Path | MMP Signaling |
| 3 | Setup Request | MMP Signaling |
| 4 | Setup Response | MMP Signaling |
| 5 | Helper Join Request for Outgoing Path | MMP Signaling |
| 6 | Helper Join Response for Outgoing Path | MMP Signaling |
| 7 | Switch Request for Local Helper | MMP Signaling |

TABLE 20-continued

Messages Types

| Message Type Value | Message Type Name | Data or Signaling |
|---|---|---|
| 8 | Switch Response for Local Helper | MMP Signaling |
| 9 | Helper Change Notification | MMP Signaling |
| 10 | Helper Change Response | MMP Signaling |
| 11 | Switch Request for Remote Helper | MMP Signaling |
| 12 | Switch Response for Remote Helper | MMP Signaling |
| 13 | Helper Release Notification | MMP Signaling |
| 14 | Release Notification | MMP Signaling |
| 15 | Helper Release Command | MMP Signaling |
| 16 | Outgoing Path Setup Indication | MMP Signaling |
| 17-255 | Reserved | N/A |

Figure 16:
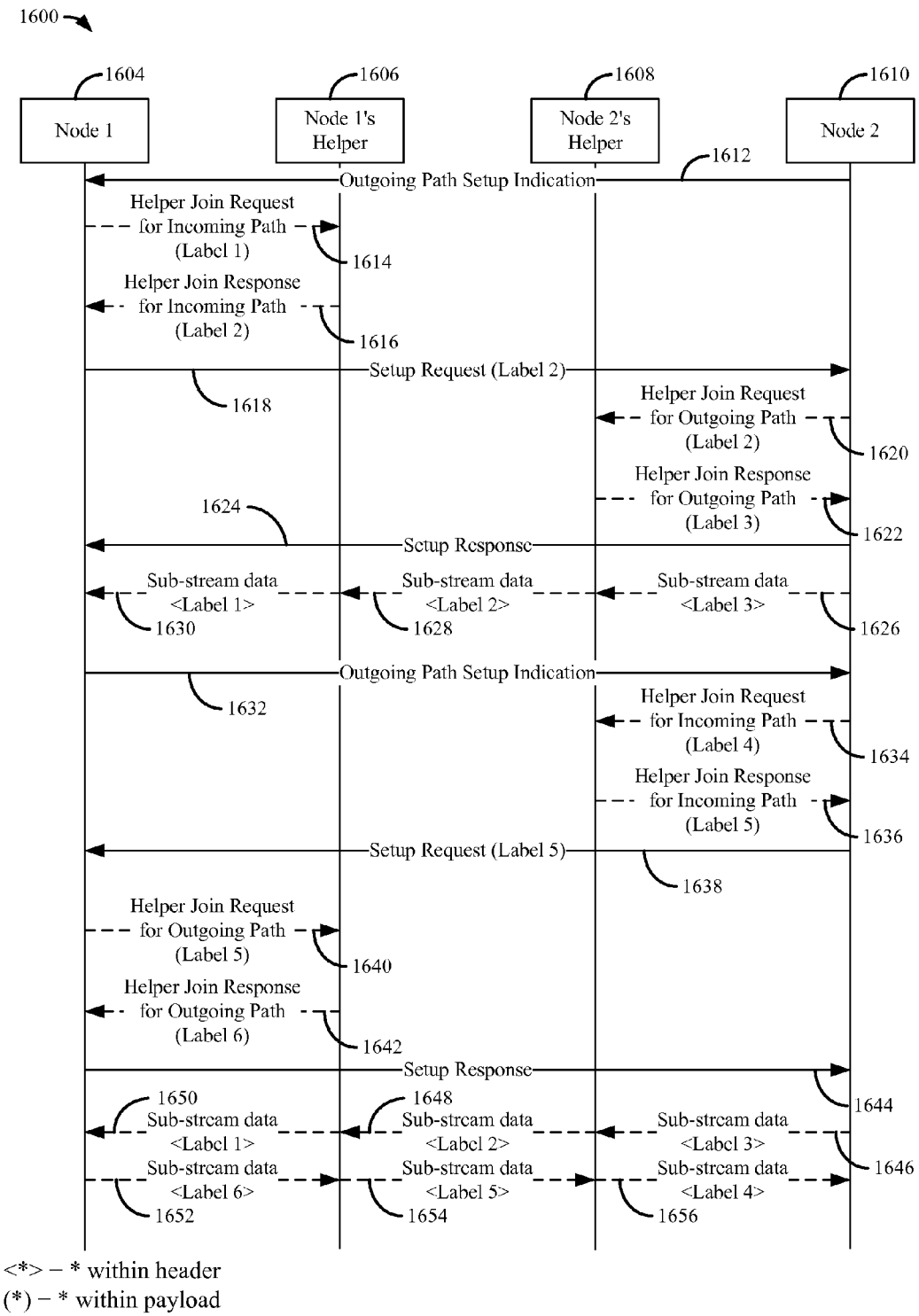
FIG. 16 is a first diagram illustrating exemplary methods in which a protocol execution does not rely on distinguishing between aggregator helpers and source helpers.

FIG. 16 is a first diagram 1600 illustrating exemplary methods in which a protocol execution does not rely on distinguishing between aggregator helpers and source helpers. In FIG. 16, label IDs in parenthesis are within the payload of the message and label IDs in the angled brackets are within a header of the packet. As shown in FIG. 16, in step 1612, the node 2 1610 may send the node 1 1604 an outgoing path setup indication. The node 2 1610 sends the node 1 1604 an outgoing path setup indication because the node 2 1610, which has data to send/transmit to the node 1 1604, is initiating the communication link with the node 1 1604. Step 1612 is not performed if node 1 1604 initiates the communication link with the node 2 1610. As shown in Table 21, the outgoing path setup indication may include one or more of a sender address, a receiver address, and quality of service (QoS) information.

TABLE 21

Outgoing Path Setup Indication

| Field | Description | Length |
|---|---|---|
| Sender address | The overlay network address of the source of the path. This field should be used by the receiver to check whether this message should be processed. | 32 bits |
| Receiver address | The overlay network address of the destination of the path. This field should be used by the receiver to identify the identity of the sender. | 32 bits |
| QoS IE | QoS that could be supported in the outgoing stream. This is to help the node at the receiving end consider the use of helper in fulfilling the bandwidth requirements. | |
| Padding | | |

The QoS information may be based on the amount of data the node 2 1610 will send, the rate at which the node 2 1610 will send the data packets, and/or other quality related information. The node 1 1604 receives the outgoing path setup indication. Based on the outgoing path setup indication, the node 1 1604 may determine whether to enlist/request a helper node to help receive the packets from the node 2 1610. For example, if the rate at which the node 2 1610 will send the packets is greater than the rate at which the node 1 1604 can receive the packets, the node 1 1604 may determine to request a helper node to receive some of the packets and relay the received packets to the node 1 1604. In step 1614, the node 1 1604 sends a helper join request for incoming path to the node 1's helper 1606. As shown in Table 22, the helper join request for incoming path may include one or more of a sender address, a receiver address, a transaction ID, a label ID, a transport layer type, a payload type, and QoS information.

TABLE 22

Helper Join Request for Incoming Path

| Field | Description | Length |
| --- | --- | --- |
| Sender address | The overlay network address of the primary node. This field should be used by the receiver to identify the identity of the sender. | 32 bits |
| Receiver address | The overlay network address of the helper node. This field should be used by the receiver to check whether this message should be processed. | 32 bits |
| Transaction ID | Unique ID of this request. | 8 bits |
| Label ID | This Label ID should be used for the packet sent from the helper node to the primary node over this data path. | 8 bits |
| Transport layer type | This indicates the transport layer type to be used for the data delivered over this path, such as TCP, UDP, etc. | 4 bits |
| Payload Type | This indicates the payload type of the data delivered over this path. | 4 bits |
| QoS IE | Expected QoS treatment for the packets on this path of this session. | |
| Padding | | |

In step 1614, the helper join request for incoming path includes the label ID "Label 1." The label ID "Label 1" identifies the label ID that node 1's helper 1606 may use to send incoming packets to the node 1 1604. In step 1616, the node 1's helper 1606 responds with a helper join response for incoming path. As shown in Table 23, the helper join response for incoming path may include one or more of a sender address, a receiver address, a transaction ID, a response code, a label ID, and QoS information.

TABLE 23

Helper Join Response for Incoming Path

| Field | Description | Length |
| --- | --- | --- |
| Sender address | The overlay network address of the helper node. This field should be used by the receiver to identify the identity of the sender. | 32 bits |
| Receiver address | The overlay network address of the primary node. This field should be used by the receiver to check whether this message should be processed. | 32 bits |
| Transaction ID | Identical to that in the original request | 8 bits |
| Response code | 0x00 = Accept. Otherwise, reject for various reasons. | 8 bits |
| Label ID | This Label ID should be used for the packet sent from the remote helper node or the remote primary node to the local helper over this data path. | 8 bits |
| QoS IE | Expected QoS treatment for the packets on this path of this session. | |
| Padding | | |

In step 1616, the helper join response for incoming path includes the label ID "Label 2." The label ID "Label 2" identifies the label ID that may be used for sending incoming packets to the node 1's helper 1606. The node 1's helper 1606 links "Label 2" to "Label 1" such that packets received and directed to "Label 2" are routed to "Label 1." The node 1's helper 1606 may help other nodes and therefore may have other label IDs for which the node 1's helper 1606 receives incoming packets. In step 1618, the node 1 1604 sends a setup request to the node 2 1610. As shown in Table 24, the setup request may include one or more of a sender address, a receiver address, a transaction ID, a helper address, a label ID, a transport layer type, a payload type, and QoS information.

TABLE 24

Setup Request

| Field | Description | Length |
| --- | --- | --- |
| Sender address | The overlay network address of the destination of the path. This field should be used by the receiver to identify the identity of the sender. | 32 bits |
| Receiver address | The overlay network address of the source of the path. This field should be used by the receiver to check whether this message should be processed. | 32 bits |
| Transaction ID | Unique ID of this request. | 8 bits |
| Helper address | The overlay network address of the local helper. If there is no helper, this should be the overlay network address of the primary node. | 32 bits |
| Label ID | This Label ID should be used for the packet sent from the remote helper or remote primary node to the local helper or local primary node over this data path. | 8 bits |
| Transport layer type | This indicates the transport layer type to be used for the data delivered over this path, such as TCP, UDP, etc. | 4 bits |
| Payload Type | This indicates the payload type of the data delivered over this path. | 4 bits |
| QoS IE | Expected QoS treatment for the packets on this path of this session. | |
| Padding | | |

In step 1618, the setup request includes the label ID "Label 2." The label ID "Label 2" identifies the label ID that node 2 1610 may use for sending packets that ultimately ends up at the node 1 1604. The node 2 1610 may or may not know that "Label 2" is associated with a helper node rather than the node 1 1604. When sending packets to the node 1 1604, the node 2 1610 may route all or a portion of the packets to the node 1's helper 1606 via the "Label 2" and a remaining portion to the packets directly to the node 1 1604. When sending packets to the node 1's helper 1606, the node 2 1610 will conform to the QoS information provided in the setup request. The node 2 1610 may also enlist/request a helper node, such as the node 2's helper 1608. In step 1620, the node 2 1610 sends a helper join request for outgoing path to the node 2's helper 1608. As shown in Table 25, the helper join request for outgoing path may include one or more of a sender address, a receiver address, a transaction ID, a remote helper address, a label ID, a transport layer type, a payload type, and QoS information.

TABLE 25

Helper Join Request for Outgoing Path

| Field | Description | Length |
| --- | --- | --- |
| Sender address | The overlay network address of the primary node. This field should be used by the receiver to identify the identity of the sender. | 32 bits |
| Receiver address | The overlay network address of the helper node. This field should be used by the receiver to check whether this message should be processed. | 32 bits |
| Transaction ID | Unique ID of this request. | 8 bits |
| Remote Helper Address | The overlay network address of the remote helper. If there is no helper, this should be the overlay network address of the remote primary node. | 32 bits |
| Label ID | This Label ID should be used for the packet sent from the local helper to the remote helper or the remote primary node over this data path. | 8 bits |

TABLE 25-continued

Helper Join Request for Outgoing Path

| Field | Description | Length |
|---|---|---|
| Transport layer type | This indicates the transport layer type to be used for the data delivered over this path, such as TCP, UDP, etc. | 4 bits |
| Payload Type | This indicates the payload type of the data delivered over this path. | 4 bits |
| QoS IE | Expected QoS treatment for the packets on this path of this session. | |
| Padding | | |

The node 2's helper 1608 receives the helper join request for outgoing path from the node 2 1610. The node 2's helper 1608 receives the label ID "Label 2" in the helper join request for outgoing path and generates a corresponding label ID "Label 3." The node 2's helper 1608 links the two label IDs such that packets received at "Label 3" are routed to "Label 2." In step 1622, the node 2's helper 1608 sends a helper join response for outgoing path to the node 2 1610. The helper join response for outgoing path includes the label ID "Label 3" so that the node 2 1610 will know how to route packets to the node 2's helper 1608 that the node 2 1610 would ultimately like routed to the node 1 1604. As shown in Table 26, the helper join response for outgoing path may include one or more of a sender address, a receiver address, a transaction ID, a response code, a label ID, and QoS information.

TABLE 26

Helper Join Response for Outgoing Path

| Field | Description | Length |
|---|---|---|
| Sender address | The overlay network address of the helper node. This field should be used by the receiver to identify the identity of the sender. | 32 bits |
| Receiver address | The overlay network address of the primary node. This field should be used by the receiver to check whether this message should be processed. | 32 bits |
| Transaction ID | Identical to that in the original request | 8 bits |
| Response code | 0x00 = Accept. Otherwise, reject for various reasons. | 8 bits |
| Label ID | This Label ID should be used for the packet sent from the local helper owner to the local helper over this data path. | 8 bits |
| QoS IE | Expected QoS treatment for the packets on this path of this session. | |
| Padding | | |

In step 1624, the node 2 1610 sends a setup response to the node 1 1604. The setup response is a response to the setup request received in step 1618. As shown in Table 27, the setup response may include one or more of a sender address, a receiver address, a transaction ID, a response code, and QoS information.

TABLE 27

Setup Response

| Field | Description | Length |
|---|---|---|
| Sender address | The overlay network address of the source of the path. This field should be used by the receiver to check whether this message should be processed. | 32 bits |

TABLE 27-continued

Setup Response

| Field | Description | Length |
|---|---|---|
| Receiver address | The overlay network address of the destination of the path. This field should be used by the receiver to identify the identity of the sender. | 32 bits |
| Transaction ID | Identical to that in the original request | 8 bits |
| Response code | 0x00 = Accept. Otherwise, reject for various reasons. | 8 bits |
| QoS IE | Expected QoS treatment for the packets on this path of this session. | |
| Padding | | |

In step 1626, the node 2 1610 sends a packet including a header and data to the node 2's helper 1608. The header includes the label ID "Label 3." The node 2's helper 1608 receives the packet, determines that the packet includes "Label 3" and is therefore associated with "Label 2," inserts the "Label 2" into the header, and in step 1628, forwards the packet to node 1's helper 1606. The node 1's helper 1606 receives the packet, determines that the packet includes "Label 2" and is therefore associated with "Label 1," inserts the "Label 1" into the header, and in step 1630, forwards the packet to node 1 1604.

The node 1 1604 may also setup an outgoing path to the node 2 1610. In step 1632, the node 1 1604 sends an outgoing path setup indication to the node 2 1610. The node 2 1610 receives the outgoing path setup indication. The node 2 1610 may determine whether to enlist/request a helper node to receive the packets from the node 1 1604 based on QoS information in the outgoing path setup indication. As shown in FIG. 16, the node 2 1610 determines to utilize a helper node in receiving packets from the node 1 1604. In step 1634, the node 2 1610 sends a helper join request for incoming path including the label ID "Label 4." The node 2's helper 1608 receives the helper join request for incoming path with the label ID "Label 4," generates an associated label ID "Label 5," and in step 1636, sends a helper join response for incoming path including the label ID "Label 5." In step 1638, the node 2 1610 sends a setup request including the label ID "Label 5" to the node 1 1604. In step 1640, the node 1 1604 provides the label ID "Label 5" to the node 1's helper 1606 in a helper join request for outgoing path. The node 1's helper 1606 receives the helper join request for outgoing path with the label ID "Label 5," generates an associated label ID "Label 6," and in step 1642, sends a helper join response for outgoing path including the label ID "Label 6." In step 1644, the node 1 1604 sends a setup response to the node 2 1610.

With two-way communication enabled, the node 1 1604 and the node 2 1610 may both send communication to and receive communication from each other. In step 1646, the node 2 1610 sends a packet including a header and data to the node 2's helper 1608. The header includes the label ID "Label 3." The node 2's helper 1608 receives the packet, determines that the packet includes "Label 3" and is therefore associated with "Label 2," inserts the "Label 2" into the header, and in step 1648, forwards the packet to node 1's helper 1606. The node 1's helper 1606 receives the packet, determines that the packet includes "Label 2" and is therefore associated with "Label 1," inserts the "Label 1" into the header, and in step 1650, forwards the packet to node 1 1604. In step 1652, the node 1 1604 sends a packet including a header and data to the node 1's helper 1606. The header includes the label ID "Label 6." The node 1's helper 1606 receives the packet, determines that the packet includes "Label 6" and is therefore associated with "Label 5," inserts the "Label 5" into the header, and in step 1654, forwards the packet to node 2's helper 1608. The node 2's helper 1608 receives the packet, determines that the packet includes "Label 5" and is therefore associated with "Label 4," inserts the "Label 4" into the header, and in step 1656, forwards the packet to node 2 1610.

Figure 17:
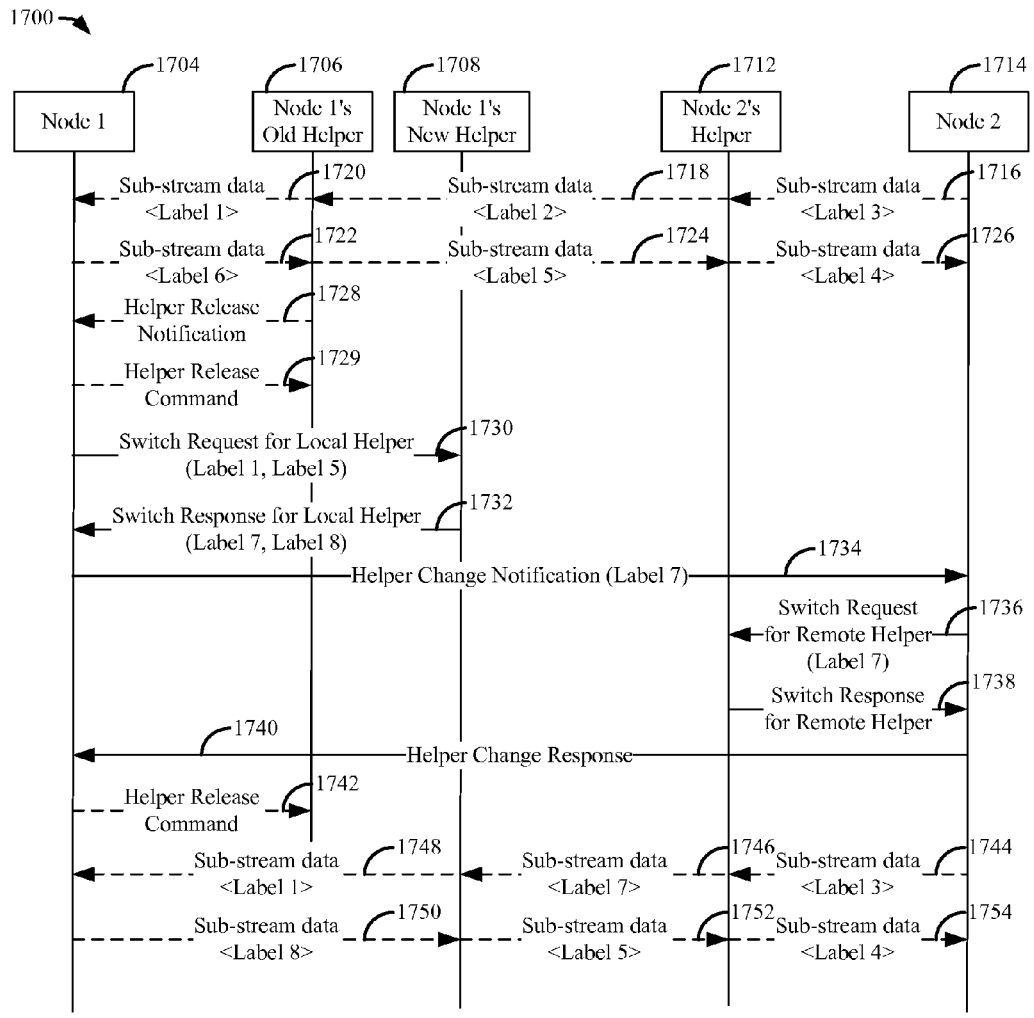
FIG. 17 is a second diagram illustrating exemplary methods.

FIG. 17 is a second diagram 1700 illustrating exemplary methods. In FIG. 17, label IDs in parenthesis are within the payload of the message and label IDs in the angled brackets are within a header of the packet. The diagram 1700 illustrates how helper nodes may be switched after helper nodes are setup. With two-way communication enabled, the node 1 1704 and the node 2 1714 may both send communication to and receive communication from each other. In step 1716, the node 2 1714 sends a packet including a header and data to the node 2's helper 1712. The header includes the label ID "Label 3." The node 2's helper 1712 receives the packet, determines that the packet includes "Label 3" and is therefore associated with "Label 2," inserts the "Label 2" into the header, and in step 1718, forwards the packet to node 1's old helper 1706. The node 1's old helper 1706 receives the packet, determines that the packet includes "Label 2" and is therefore associated with "Label 1," inserts the "Label 1" into the header, and in step 1720, forwards the packet to node 1 1704. In step 1722, the node 1 1704 sends a packet including a header and data to the node 1's old helper 1706. The header includes the label ID "Label 6." The node 1's old helper 1706 receives the packet, determines that the packet includes "Label 6" and is therefore associated with "Label 5," inserts the "Label 5" into the header, and in step 1724, forwards the packet to node 2's helper 1712. The node 2's helper 1712 receives the packet, determines that the packet includes "Label 5" and is therefore associated with "Label 4," inserts the "Label 4" into the header, and in step 1726, forwards the packet to node 2 1714.

In a first configuration, in step 1728, the node 1's old helper 1706 sends a helper release notification to the node 1 1704 in order to notify the node 1 1704 that the node 1's old helper 1706 is going to stop helping the node 1 1704. As shown in Table 28, the helper release notification may include one or more of a sender address and a receiver address.

TABLE 28

Helper Release Notification

| Field | Description | Length |
| --- | --- | --- |
| Sender address | The overlay network address of the helper node. This field should be used by the receiver to check whether this message should be processed. | 32 bits |
| Receiver address | The overlay network address of the primary node. This field should be used by the receiver to identify the identity of the sender. | 32 bits |
| Padding | | |

In a second configuration, step 1728 does not occur, and in step 1729, the node 1 1704 sends a helper release command to node 1's old helper 1706. Both the first configuration in step 1728 and the second configuration in step 1729 are break-before-make procedures in which the existing helper relationship is broken before a new helper relationship is established. In a third configuration, steps 1728, 1729 are not performed, and step 1742 is performed in a make-before-break procedure in which the new helper relationship is established before the existing helper relationship is broken. As shown in Table 29, the helper release command may include one or more of a sender address and a receiver address.

TABLE 29

Helper Release Command

| Field | Description | Length |
| --- | --- | --- |
| Sender address | The overlay network address of the primary node. This field should be used by the receiver to check whether this message should be processed. | 32 bits |
| Receiver address | The overlay network address of the helper node. This field should be used by the receiver to identify the identity of the sender. | 32 bits |
| Padding | | |

When the node 1 1704 determines to break the helper relationship (in the second and third configurations), the node 1 1704 may determine to break the helper relationship based on expiration of a timer. When the node 1's old helper 1706 determines to break the helper relationship (in the first configuration), the node 1's old helper 1706 may determine to break the helper relationship based on expiration of a timer. The node 1's old helper 1706 and/or and the node 1 1704 may determine to break the helper relationship based on other factors, such as an inability to maintain a link between the node 1 1704 and the node 1's old helper 1706, a decreased performance (e.g., poor path quality) of the link between the node 1 1704 and the node 1's old helper 1706, a lack of response (e.g., multiple time outs) by either of the node 1 1704 or the node 1's old helper 1706, or other factors associated or unassociated with the link itself.

In step 1730, the node 1 1704 sends a switch request for local helper to the node 1's new helper 1708. The switch request for local helper may include a label ID "Label 1" to which the node 1's new helper 1708 may send incoming packets and a label ID "Label 5" to which the node's 1 new helper 1708 may send outgoing packets. As shown in Table 30, the switch request for local helper may include one or more of a sender address, a receiver address, a transaction ID, a first label ID, a remote helper address, a second label ID, and QoS information.

TABLE 30

Switch Request for Local Helper

| Field | Description | Length |
| --- | --- | --- |
| Sender address | The overlay network address of the primary node. This field should be used by the receiver to identify the identity of the sender. | 32 bits |
| Receiver address | The overlay network address of the helper node. This field should be used by the receiver to check whether this message should be processed. | 32 bits |
| Transaction ID | Unique ID of this request. | 8 bits |
| Label ID 1 | This Label ID should be used for the packet sent from the local helper to the primary node over this data path. If there is no incoming path, use 0xFF. | 8 bits |
| Remote Helper Address | The overlay network address of the remote helper or remote primary node for the outgoing path. If there is no outgoing path, use 0xFFFFFFFF. | 32 bits |

TABLE 30-continued

Switch Request for Local Helper

| Field | Description | Length |
|---|---|---|
| Label ID 2 | This Label ID should be used for the packet sent from the local helper to the remote helper or the remote primary node over this data path. If there is no outgoing path, use 0xFF. | 8 bits |
| QoS IE | Expected QoS treatment for the packets on this path of this session. | |
| Padding | | |

In step 1732, in response to the switch request for local helper, the node 1's new helper 1708 sends a switch response for local helper to the node 1 1704. The node 1's new helper 1708 generates a label ID "Label 7" associated with "Label 1" for incoming packets and a label ID "Label 8" associated with "Label 5" for outgoing packets. The switch response for local helper includes the label ID "Label 7" and the label ID "Label 8." As shown in Table 31, the switch response for local helper may include one or more of a sender address, a receiver address, a transaction ID, a response code, a first label ID, and a second label ID.

TABLE 31

Switch Response for Local Helper

| Field | Description | Length |
|---|---|---|
| Sender address | The overlay network address of the helper node. This field should be used by the receiver to identify the identity of the sender. | 32 bits |
| Receiver address | The overlay network address of the primary node. This field should be used by the receiver to check whether this message should be processed. | 32 bits |
| Transaction ID | Identical to that in the original request | 8 bits |
| Response code | 0x00 = Accept. Otherwise, reject for various reasons. | 8 bits |
| Label ID 1 | This Label ID should be used for the packet sent from the primary node to the local helper over this data path. If there is no outgoing path, use 0xFF. | 8 bits |
| Label ID 2 | This Label ID should be used for the packet sent from the remote helper or remote primary node to local helper over this data path. If there is no incoming path, use 0xFF. | 8 bits |
| Padding | | |

In step 1734, the node 1 1704 sends a helper change notification to the node 2 1714. The helper change notification includes the label ID "Label 7" to which the node 2 1714 should now send packets. As shown in Table 32, the help change notification may include one or more of a sender address, a receiver address, a transaction ID, a helper address, a label ID, and QoS information.

TABLE 32

Helper Change Notification

| Field | Description | Length |
|---|---|---|
| Sender address | The overlay network address of the node that has a helper change. This field should be used by the receiver to identify the identity of the sender. | 32 bits |
| Receiver address | The overlay network address of the receiver. This field should be used by the receiver to check whether this message should be processed. | 32 bits |

TABLE 32-continued

Helper Change Notification

| Field | Description | Length |
|---|---|---|
| Transaction ID | Unique ID of this request. | 8 bits |
| Helper Address | The overlay network address of the new helper node. | 32 bits |
| Label ID | This Label ID should be used for the packet sent from the remote helper or remote primary node to local helper or the local primary node over this data path. | 8 bits |
| QoS IE | QoS supported by new helper when different from the helper that was released. This is to notify the node at the receiving end of change in overlay link quality at the sender. | |
| Padding | | |

In step 1736, the node 2 1714 sends a switch request for remote helper to the node 2's helper 1712. The switch request for remote helper includes the label ID "Label 7" to which the node 2's helper should now send outgoing data. As shown in Table 33, the switch request for remote helper may include one or more of a sender address, a receiver address, a transaction ID, a remote helper address, and a label ID.

TABLE 33

Switch Request for Remote Helper

| Field | Description | Length |
|---|---|---|
| Sender address | The overlay network address of the primary node. This field should be used by the receiver to identify the identity of the sender. | 32 bits |
| Receiver address | The overlay network address of the helper node. This field should be used by the receiver to check whether this message should be processed. | 32 bits |
| Transaction ID | Unique ID of this request. | 8 bits |
| Remote Helper Address | The overlay network address of the new remote helper node. | 32 bits |
| Label ID | This Label ID should be used for the packet sent from the local helper to the remote helper or the remote primary node over this data path. | 8 bits |
| Padding | | |

In step 1738, the node 2's helper 1712 responds by sending a switch response for remote helper to the node 2 1714. As shown in Table 34, the switch response for remote helper may include one or more of a sender address, a receiver address, a transaction ID, and a response code.

TABLE 34

Switch Response for Remote Helper

| Field | Description | Length |
|---|---|---|
| Sender address | The overlay network address of the helper node. This field should be used by the receiver to identify the identity of the sender. | 32 bits |
| Receiver address | The overlay network address of the primary nope. This field should be used by the receiver to check whether this message should be processed. | 32 bits |
| Transaction ID | Identical to that in the original request | 8 bits |
| Response code | 0x00 = Accept. Otherwise, reject for various reasons. | 8 bits |
| Padding | | |

In step 1740, the node 2 1714 responds to the helper change notification by sending a helper change response to the node 1 1704. As shown in Table 35, the helper change response may include one or more of a sender address, a receiver address, a transaction ID, and a response code.

TABLE 35

Helper Change Response

| Field | Description | Length |
|---|---|---|
| Sender address | The overlay network address of the receiver node. This field should be used by the receiver to check whether this message should be processed. | 32 bits |
| Receiver address | The overlay network address of the node that has a helper change. This field should be used by the receiver to identify the identity of the sender. | 32 bits |
| Transaction ID | Identical to that in the original request | 8 bits |
| Response code | 0x00 = Accept. Otherwise, reject for various reasons. | 8 bits |
| Padding | | |

In step 1744, the node 2 1714 sends a packet including a header and data to the node 2's helper 1712. The header includes the label ID "Label 3." The node 2's helper 1712 receives the packet, determines that the packet includes "Label 3" and is therefore associated with "Label 7," inserts the "Label 7" into the header, and in step 1746, forwards the packet to node 1's new helper 1708. The node 1's new helper 1708 receives the packet, determines that the packet includes "Label 7" and is therefore associated with "Label 1," inserts the "Label 1" into the header, and in step 1748, forwards the packet to node 1 1704. In step 1750, the node 1 1704 sends a packet including a header and data to the node 1's new helper 1708. The header includes the label ID "Label 8." The node 1's new helper 1708 receives the packet, determines that the packet includes "Label 8" and is therefore associated with "Label 5," inserts the "Label 5" into the header, and in step 1752, forwards the packet to node 2's helper 1712. The node 2's helper 1712 receives the packet, determines that the packet includes "Label 5" and is therefore associated with "Label 4," inserts the "Label 4" into the header, and in step 1754, forwards the packet to node 2 1714.

Figure 18:
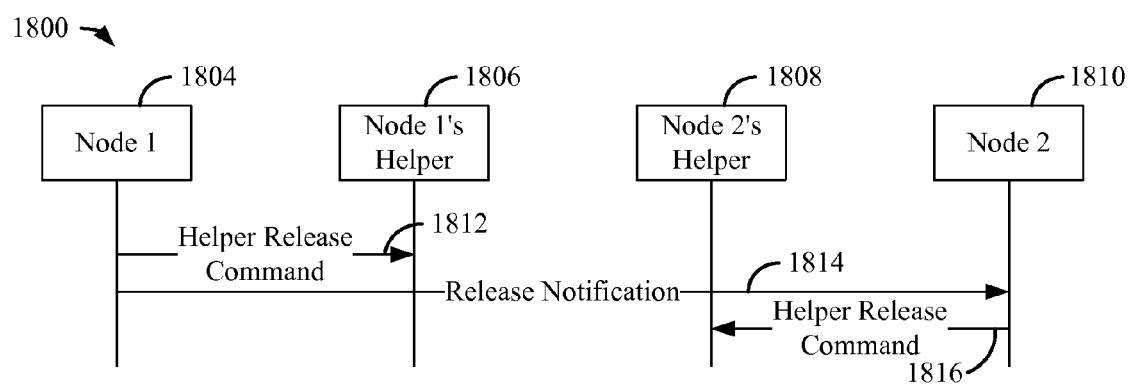
FIG. 18 is a third diagram illustrating exemplary methods.

FIG. 18 is a third diagram 1800 illustrating exemplary methods. The diagram 1800 illustrates the release commands and notifications. As shown in FIG. 18, in step 1812, the node 1 1804 sends a helper release command to the node 1's helper 1806 to release the node 1's helper 1806 from the helper relationship with the node 1 1804. In step 1814, the node 1 1804 sends a release notification 1814 to the node 2 1810. The release notification informs the node 2 1810 to cease the communication with the node 1 1804. In step 1816, the node 2 1810 sends a helper release command to the node 2's helper 1808 to release the node 2's helper 1808 from the helper relationship with the node 2 1810. As shown in table 36, the release notification may include one or more of a sender address and a receiver address.

TABLE 36

Release Notification

| Field | Description | Length |
|---|---|---|
| Sender address | The overlay network address of the sender. This field should be used by the receiver to identify the identity of the sender. | 32 bits |

TABLE 36-continued

Release Notification

| Field | Description | Length |
|---|---|---|
| Receiver address | The overlay network address of the receiver. This field should be used by the receiver to check whether this message should be processed. | 32 bits |
| Padding | | |

Figure 19:
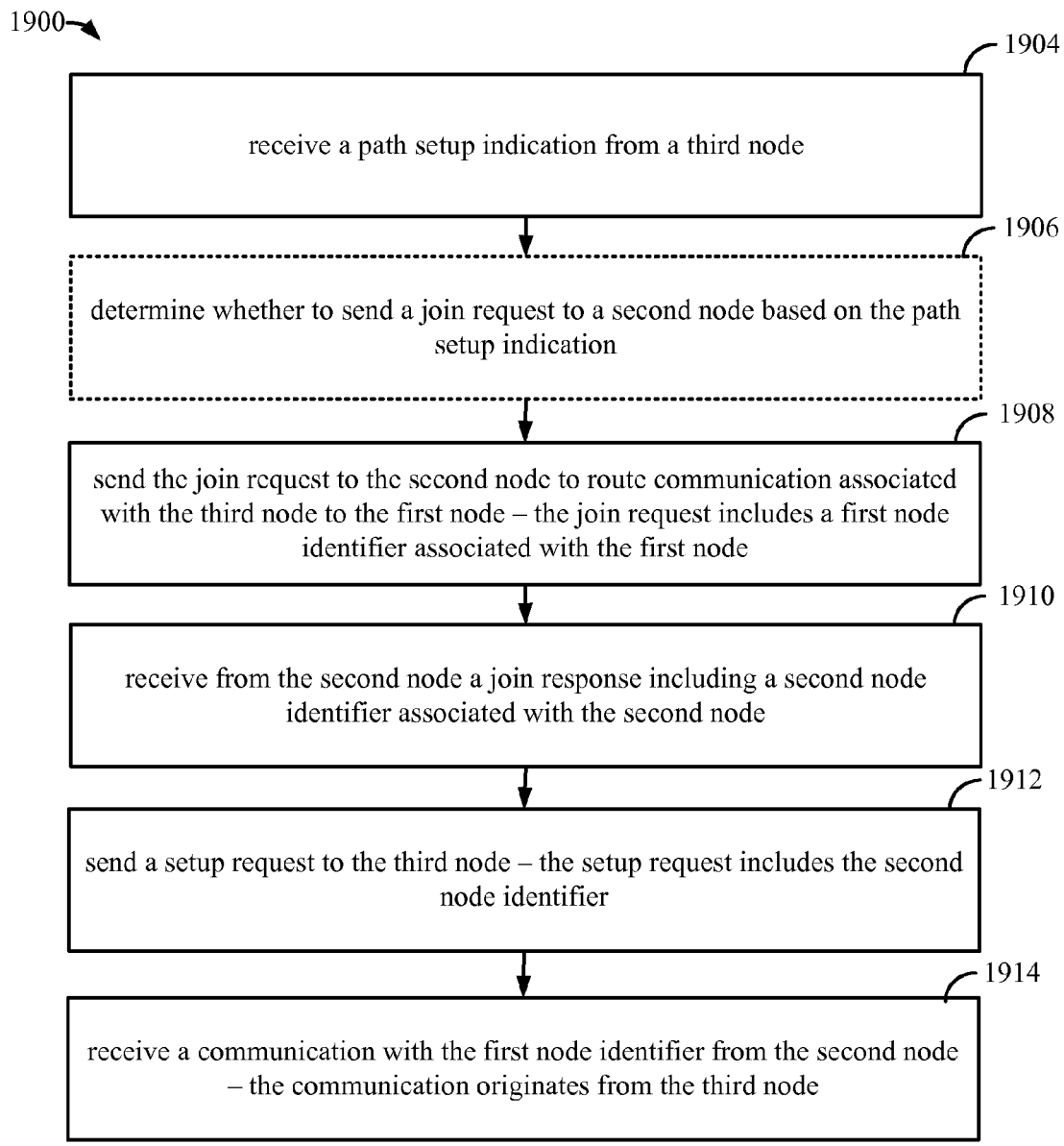
FIG. 19 is a flow chart of a first method of wireless communication.

FIG. 19 is a flow chart of a first method of communication. The method of communication may be wireless. The method may be performed by a communications device, such as a user equipment (UE). The communications device is referred to as a first node. In step 1904, the first node may receive a path setup indication from a third node. For example, referring to FIG. 16, step 1612, the node 1 1604 may receive an outgoing path setup indication from the node 2 1610. In step 1906, the first node may determine whether to send a join request to a second node based on the path setup indication. As discussed supra in relation to FIG. 16, the path setup indication may include QoS information and the node 1 1604 may determine to send a helper join request for incoming path (step 1614) to the node 1's helper 1606 based on the QoS information. In step 1908, the first node sends a join request to the second node to route communication associated with the third node to the first node. The join request includes a first node identifier associated with the first node. For example, referring to FIG. 16, step 1614, the first node 1 1604 sends a helper join request for incoming path to the node 1's helper 1606. The helper join request for incoming path includes the label ID "Label 1" associated with the node 1 1604. In step 1910, the first node receives from the second node a join response including a second node identifier associated with the second node. For example, referring to FIG. 16, step 1616, the node 1 1604 receives a helper join response for incoming path from the node 1's helper 1606 that includes the label ID "Label 2" associated with node 1's helper 1606. In step 1912, the first node sends a setup request to the third node. The setup request includes the second node identifier. For example, referring to FIG. 16, step 1618, the node 1 1604 sends a setup request to the node 2 1610. The setup request includes the label ID "Label 2." In step 1914, the first node receives a communication with the first node identifier from the second node. The communication originates from the third node. For example, referring to FIG. 16, step 1630, the node 1 1604 receives a packet with the label ID "Label 1" from the node 1's helper 1606. The packet originated from the node 2 1610.

Figure 20:
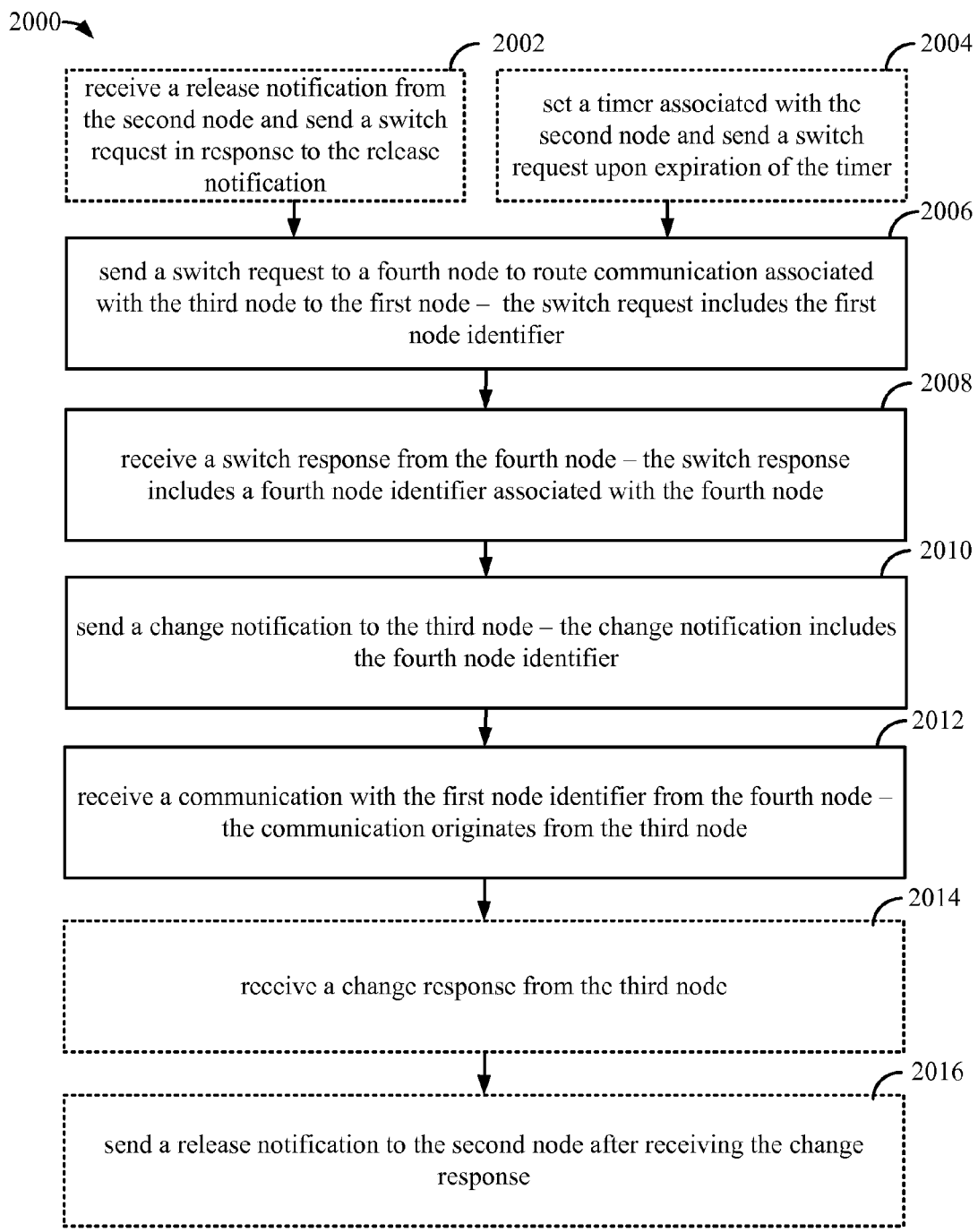
FIG. 20 is a flow chart of a second method of wireless communication.

FIG. 20 is a flow chart of a second method of communication. The method of communication may be wireless. The method may be performed by a communications device, such as a UE. The communications device is referred to as a first node. In step 2006, the first node sends a switch request to a fourth node to route communication associated with the third node to the first node. The switch request includes the first node identifier. For example, referring to FIG. 17, step 1730, the node 1 1704 sends a switch request for local helper to the node 1's new helper 1708 to route communication associated with node 2 1714 to the node 1 1704. The switch request for local helper includes the label ID "Label 1." In step 2008, the first node receives a switch response from the fourth node. The switch response includes a fourth node identifier associated with the fourth node. For example, referring to FIG. 17, step 1732, the node 1 1704 receives a switch response for local helper from the node 1's new helper 1708. The switch response for local helper includes the label ID "Label 7"

associated with the node 1's new helper 1708. In step 2010, the first node sends a change notification to the third node. The change notification includes the fourth node identifier. For example, referring to FIG. 17, step 1734, the node 1 1704 sends a helper change notification to the node 2 1714. The helper change notification includes the label ID "Label 7." In step 2012, the first node receives a communication with the first node identifier from the fourth node. The communication originates from the third node. For example, referring to FIG. 17, step 1748, the node 1 1704 receives a packet with the label ID "Label 1" from the node 1's new helper 1708. The packet originated from the node 2 1714.

In a first configuration, in step 2002, the first node may receive a release notification from the second node and send the switch request in response to the release notification. For example, referring to FIG. 17, in step 1728, the node 1 1704 may receive the helper release notification from the node 1's old helper 1706 and, in step 1730, send the switch request for local helper in response to the helper release notification. In a second configuration, in step 2004, the first node may set a timer associated with the second node and send the switch request upon expiration of the timer. Referring to FIG. 17, when the node 1 1704 utilizes a timer to trigger sending the switch request for local helper, the node 1 1704 may perform a break-before-make procedure by sending the helper release command in step 1729 or a make-before-break procedure by sending the helper release command in step 1742. In the second configuration or in a third configuration, in step 2014, the first node receives a change response from the third node, and in step 2016, the first node sends a release notification to the second node after receiving the change response. For example, referring to FIG. 17, in step 1740, the node 1 1704 receives a helper change response from the node 2 1714, and in step 1742, the node 1 1704 sends a helper release command to the node 1's old helper 1706.

Figure 21:
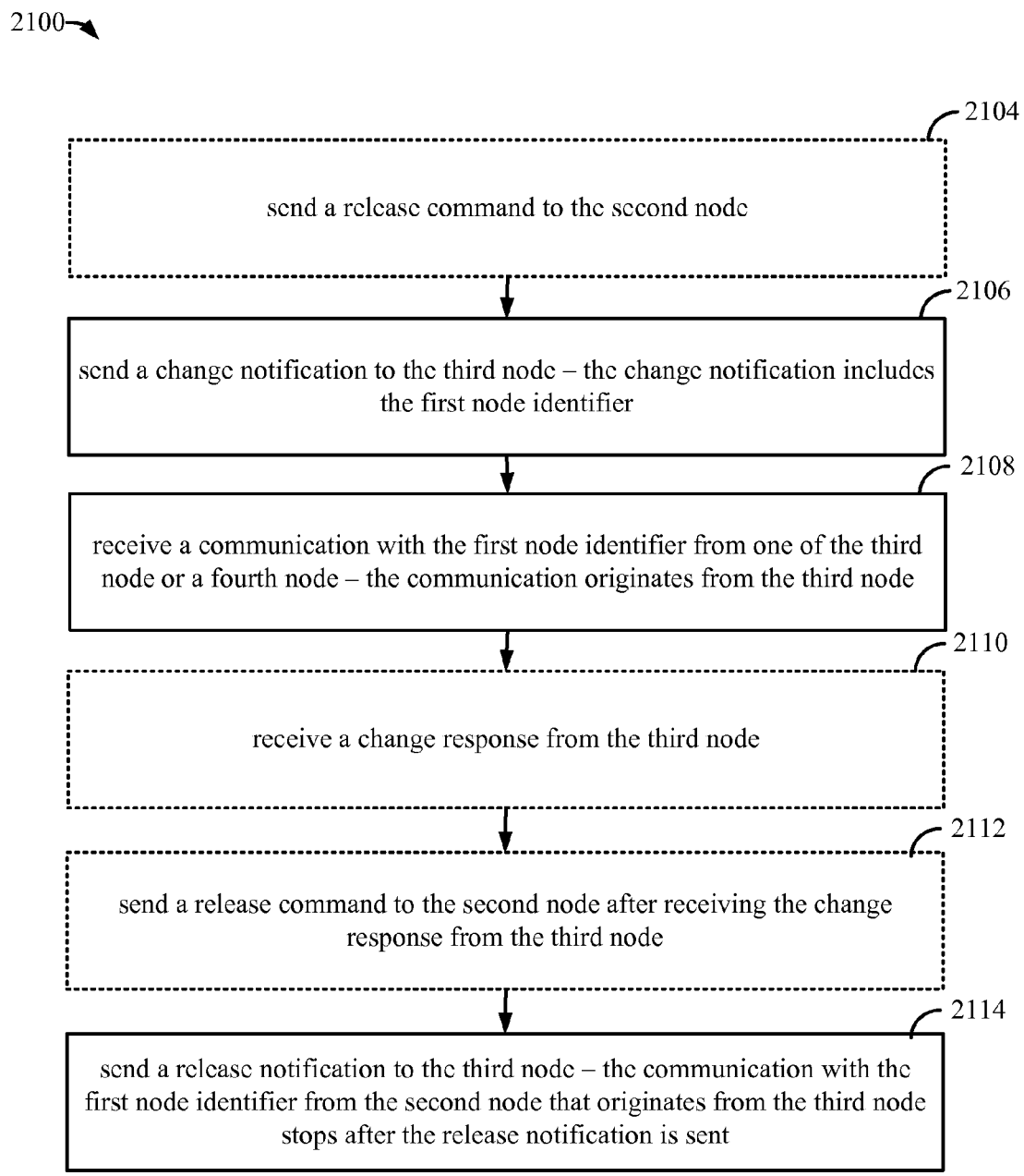
FIG. 21 is a flow chart of a third method of wireless communication.

FIG. 21 is a flow chart of a third method of communication. The method of communication may be wireless. The method may be performed by a communications device, such as a UE. The communications device is referred to as a first node. In step 2104, the first node may send a release command to the second node before sending a change notification to the third node. For example, referring to FIG. 17, step 1729, the node 1 1704 may send a helper release command to the node 1's old helper 1706. In step 2106, the first node may send a change notification to the third node that includes the first node identifier. For example, referring to FIG. 17, step 1734, the node 1 1704 may send a helper change notification to the node 2 1714. However, instead of sending the label ID "Label 7" in the helper change notification, the node 1 1704 may send label ID "Label 1" in the helper change notification so that packets are sent directly to the node 1 1704. In step 2108, the first node may receive a communication with the first node identifier from one of the third node or a fourth node. The communication originates from the third node. For example, referring to FIG. 17, the node 1 1704 may receive a packet with the label ID "Label 1" from the node 2 1714 (step 1744, but directly to the node 1 1704) or from the node 2's helper 1712 (step 1746, but directly to the node 1 1704). In step 2110, the first node may receive a change response from the third node. In step 2112, the first node may send a release command to the second node after receiving the change response from the third node. For example, referring to FIG. 17, steps 1740 and 1742, the node 1 1704 may receive a helper change response from the node 2 1714 and send a helper release command to the node 1's old helper 1706. In step 2114, the first node may send a release notification to the third node. The communication with the first node identifier from the second node that originates from the third node may stop after the release notification is sent. For example, referring to FIG. 18, step 1814, the node 1 1804 may send a release notification to the node 2 1810 and the communication from the node 1's helper 1806 that originates from the node 2 1810 may stop after sending the release notification.

Figure 22:
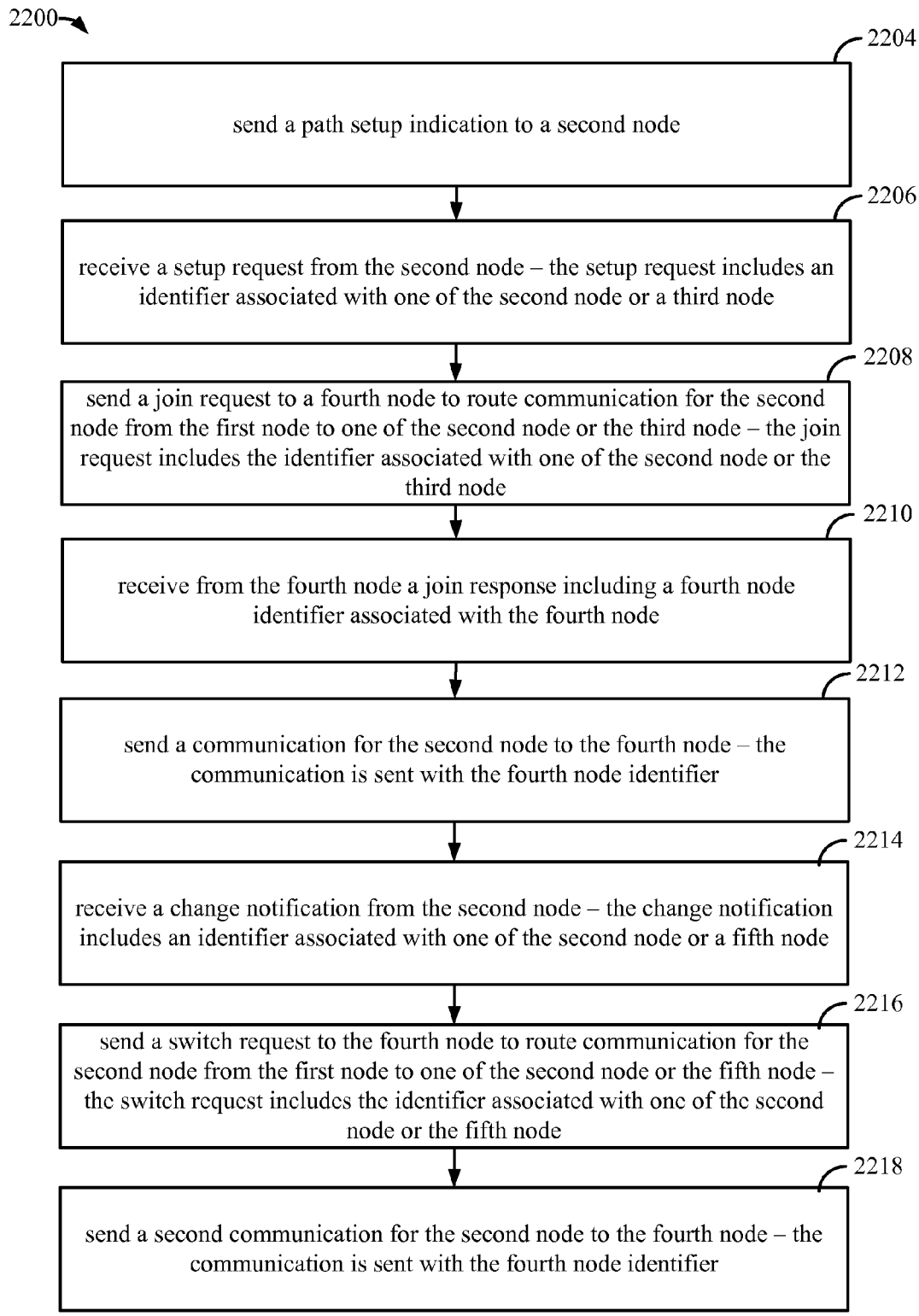
FIG. 22 is a flow chart of a fourth method of wireless communication.

FIG. 22 is a flow chart of a fourth method of communication. The method of communication may be wireless. The method may be performed by a communications device, such as a UE. The communications device is referred to as a first node. In step 2204, the first node may send a path setup indication to a second node. For example, referring to FIG. 16, step 1612, node 2 1610 may send an outgoing path setup indication to the node 1 1604. In step 2206, the first node receives a setup request from the second node. The setup request includes an identifier associated with one of the second node or a third node. For example, referring to FIG. 16, step 1618, the node 2 1610 receives a setup request from the node 1 1604. The setup request may include the label ID "Label 1" associated with the node 1 1604 or the label ID "Label 2" associated with the node 1's helper 1606. If the setup request includes the label ID "Label 1," communication from the node 2 1610 is routed directly from the node 2 1610 or the node 2's helper 1608 to the node 1 1604 (i.e., the node 1 1604 has no helper). If the setup request includes the label ID "Label 2," communication from the node 2 1610 is routed through the node 1's helper 1606 to the node 1 1604. In step 2208, the first node sends a join request to a fourth node to route communication for the second node from the first node to one of the second node or the third node. The join request includes the identifier associated with one of the second node or the third node. For example, referring to FIG. 16, step 1620, the node 2 1610 sends a helper join request for outgoing path to the node 2's helper 1608 to route communication for the node 1 1604 from the node 2 1610 to the node 1 1604 or the node 1's helper 1606. If the helper join request for outgoing path includes the label ID "Label 2," the node 2's helper 1608 routes packets to the node 1's helper 1606. If the helper join request for outgoing path includes the label ID "Label 1," the node 2's helper 1608 routes packets directly to the node 1 1604. In step 2210, the first node receives from the fourth node a join response including a fourth node identifier associated with the fourth node. For example, referring to FIG. 16, step 1622, the node 2 1610 receives a helper join response for outgoing path that includes the label ID "Label 3" associated with the node 2's helper 1608. In step 2212, the first node sends a communication for the second node to the fourth node. The communication is sent with the fourth node identifier. For example, referring to FIG. 16, step 1626, the node 2 1610 sends a packet for the node 1 1604 to the node 2's helper 1608. The packet is sent with the label ID "Label 3."

In step 2214, the first node may receive a change notification from the second node. The change notification includes an identifier associated with one of the second node or a fifth node. For example, referring to FIG. 17, in step 1734, the node 2 1714 receives a helper change notification from the node 1 1704. The helper change notification may include the label ID "Label 1" associated with the node 1 1704 or the label ID "Label 7" associated with the node 1's new helper 1708. In step 2216, the first node may send a switch request to the fourth node to route communication for the second node from the first node to one of the second node or the fifth node. The switch request includes the identifier associated with one of the second node or the fifth node. For example, referring to FIG. 17, in step 1736, the node 2 1714 sends a switch request for remote helper to the node 2's helper 1712 to route communication for the node 1 1704 from the node 2 1714. The switch request for remote helper includes the label ID received in the helper change notification. If the label ID is "Label 7," as shown in step 1736, the node 2's helper 1712 routes packets from the node 2 1714 to the node 1's new helper 1708. If the label ID is "Label 1," the node 2's helper 1712 routes packets from the node 2 1714 to the node 1 1704. In step 2218, the first node sends a second communication for the second node to the fourth node. The communication is sent with the fourth node identifier. For example, referring to FIG. 17, in step 1744, the node 2 1714 sends a packet for the node 1 1704 to the node 2's helper 1712. The packet is sent with the label ID "Label 3" associated with the node 2's helper 1712.

Figure 23:
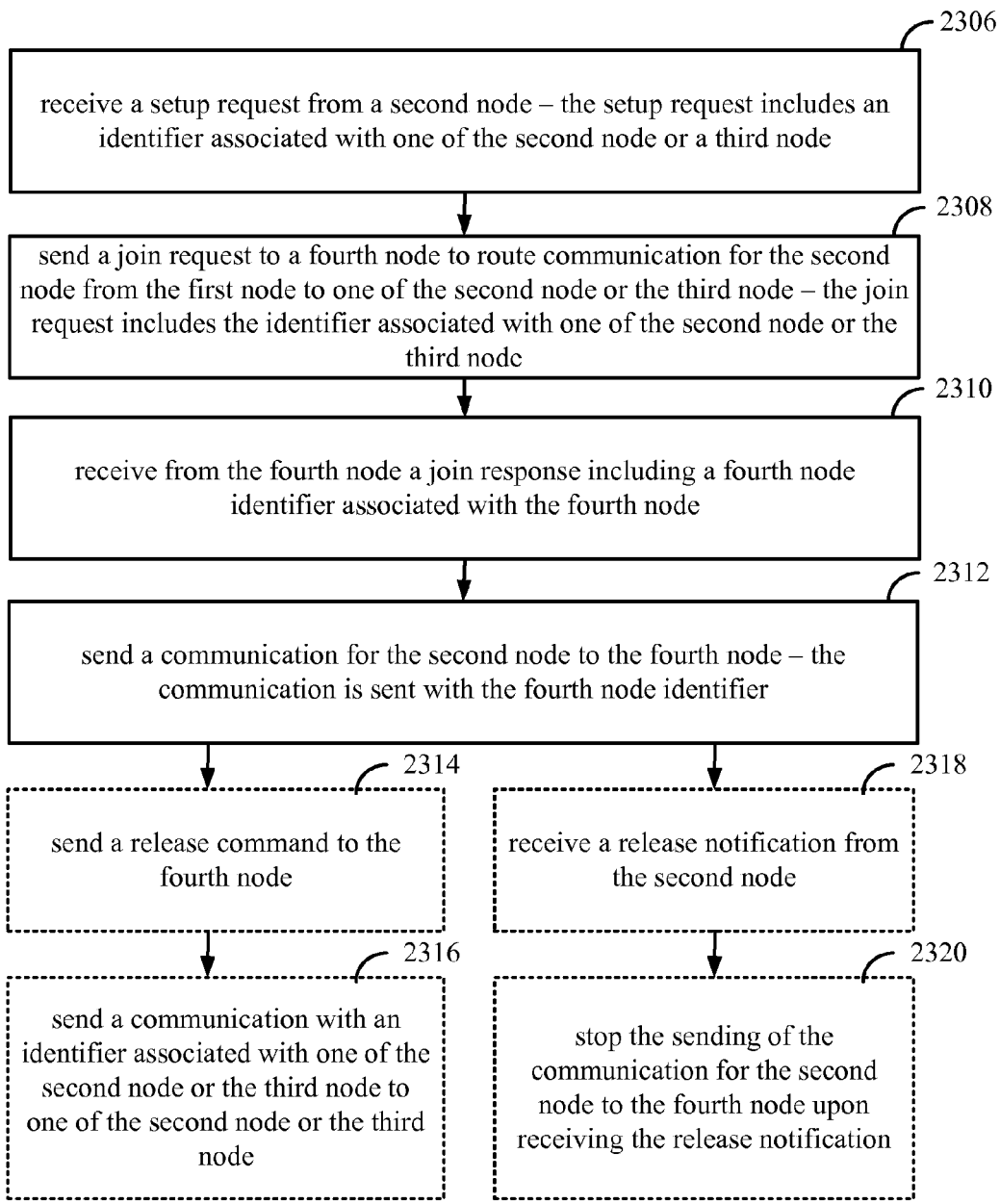
FIG. 23 is a flow chart of a fifth method of wireless communication.

FIG. 23 is a flow chart of a fifth method of communication. The method of communication may be wireless. The method may be performed by a communications device, such as a UE. The communications device is referred to as a first node. In step 2306, the first node receives a setup request from a second node. The setup request includes an identifier associated with one of the second node or a third node. In step 2308, the first node sends a join request to a fourth node to route communication for the second node from the first node to one of the second node or the third node. The join request includes the identifier associated with one of the second node or the third node. In step 2310, the first node receives from the fourth node a join response including a fourth node identifier associated with the fourth node. In step 2312, the first node sends a communication for the second node to the fourth node. The communication is sent with the fourth node identifier. For example, referring to FIG. 16, the steps 2306, 2308, 2310, and 2312 correspond to steps 1618, 1620, 1622, and 1626, respectively.

In step 2314, the first node may send a release command to the fourth node, and in step 2316, send a communication with an identifier associated with one of the second node or the third node to one of the second node or the third node. For example, referring to FIG. 16, the node 2 1610 may release the node 2's helper 1608 from the helper relationship and then send a packet directly to the node 1 1604 if the node 1 1604 has no helper (the node 2 1610 already has a communication link with the node 1 1604) or to the node 1's helper 1606 (with the label ID "Label 2"). In step 2318, the first node may receive a release notification from the second node, and stop sending the communication for the second node to the fourth node upon receiving the release notification. For example, referring to FIG. 18, step 1814, the node 2 1810 may receive a release notification from the node 1 1804, and upon receiving the release notification, stop sending packets for the node 1 1804 to the node 2's helper 1808.

Figure 24:
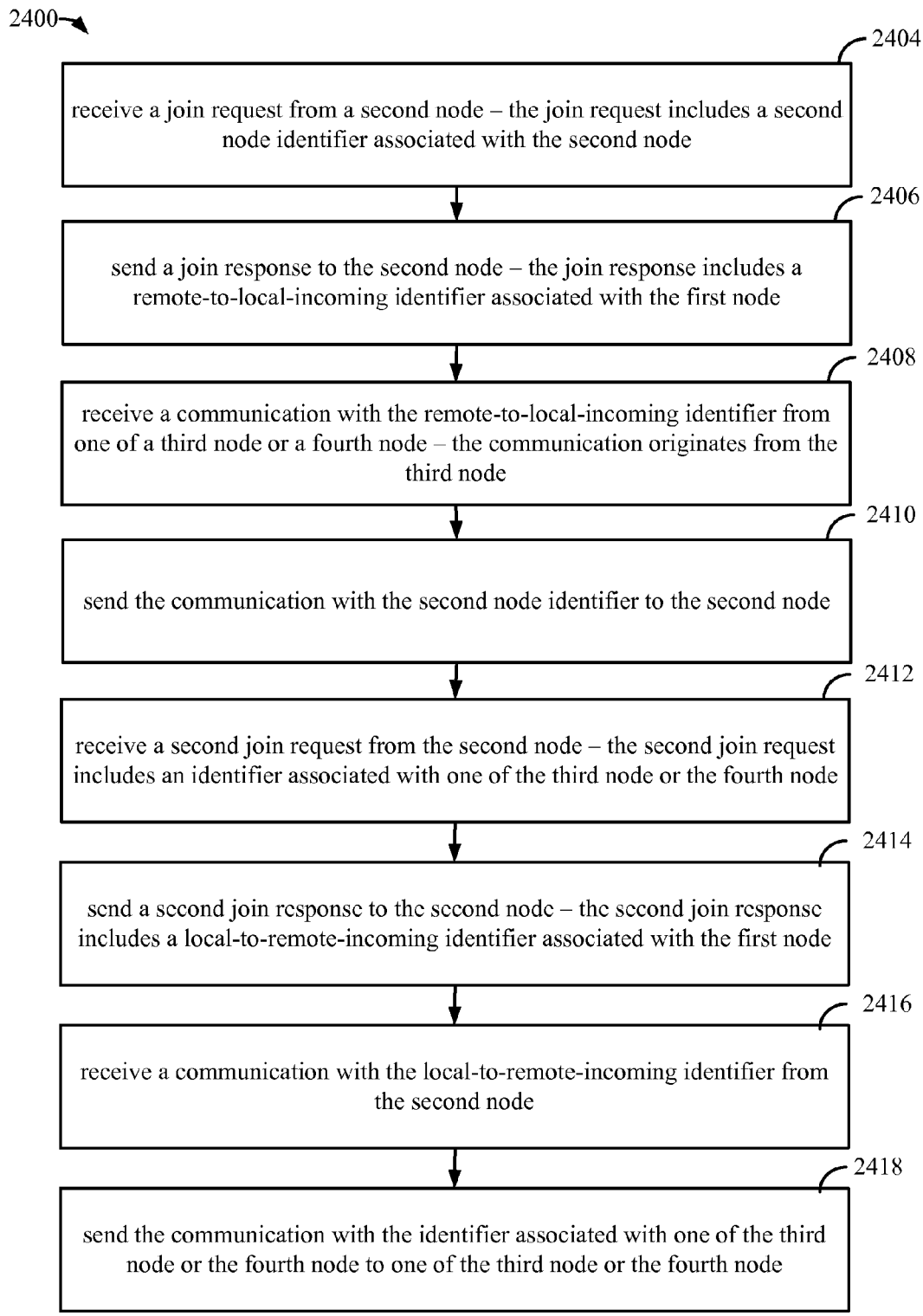
FIG. 24 is a flow chart of a sixth method of wireless communication.

FIG. 24 is a flow chart of a sixth method of communication. The method of communication may be wireless. The method may be performed by a communications device, such as a UE. The communications device is referred to as a first node. In step 2404, the first node receives a join request from a second node. The join request includes a second node identifier associated with the second node. For example, referring to FIG. 16, step 1614, the node 1's helper 1606 receives a helper join request for incoming path from the node 1 1604. In step 2406, the first node sends a join response to the second node. The join response includes a remote-to-local-incoming identifier associated with the first node. For example, referring to FIG. 16, step 1616, the node 1's helper 1606 sends a helper join response for incoming path to the node 1 1604. The helper join response for incoming path includes the label ID "Label 2" associated with the node 1's helper 1606. In step 2408, the first node receives a communication with the remote-to-local-incoming identifier from one of a third node or a fourth node. The communication originates from the third node. For example, referring to FIG. 16, step 1628, the node 1's helper 1606 receives a packet from the node 2's helper 1608 that originates from the node 2 1610. If the node 2 1610 does not have a helper, then the node 1's helper 1606 would receive the packet directly from the node 2 1610 that originates from the node 2 1610. In step 2410, the first node sends the communication with the second node identifier to the second node. For example, referring to FIG. 16, step 1630, the node 1's helper 1606 sends a packet with the label ID "Label 1" to the node 1 1604.

In step 2412, the first node may receive a second join request from the second node. The second join request includes an identifier associated with one of the third node or the fourth node. For example, referring to FIG. 16, step 1640, the node 1's helper 1606 receives a helper join request for outgoing path from the node 1 1604. In step 1640, the helper join request for outgoing path includes label ID "Label 5" associated with the node 2's helper 1608. However, if the node 2 1610 does not have a helper, then the helper join request for outgoing path would include the label ID "Label 4" associated with the node 2 1610. In step 2414, the first node may send a second join response to the second node. The second join response includes a local-to-remote-incoming identifier associated with the first node. For example, referring to FIG. 16, step 1642, the node 1's helper 1606 sends a helper join response for outgoing path to the node 1 1604. The helper join response for outgoing path includes the label ID "Label 6" associated with the node 1's helper 1606. In step 2416, the first node may receive a communication with the local-to-remote-incoming identifier from the second node. For example, referring to FIG. 16, step 1652, the node 1's helper 1606 receives a packet with the label ID "Label 6" from the node 1 1604. In step 2418, the first node may send the communication with the identifier associated with one of the third node or the fourth node to one of the third node or the fourth node. For example, referring to FIG. 16, step 1654, the node 1's helper 1606 sends the packet with the label "Label 5" to the node 2's helper 1608. If the node 2 1610 does not have a helper, then the node 1's helper 1606 would send the packet with the label "Label 4" to the node 2 1610.

Figure 25:
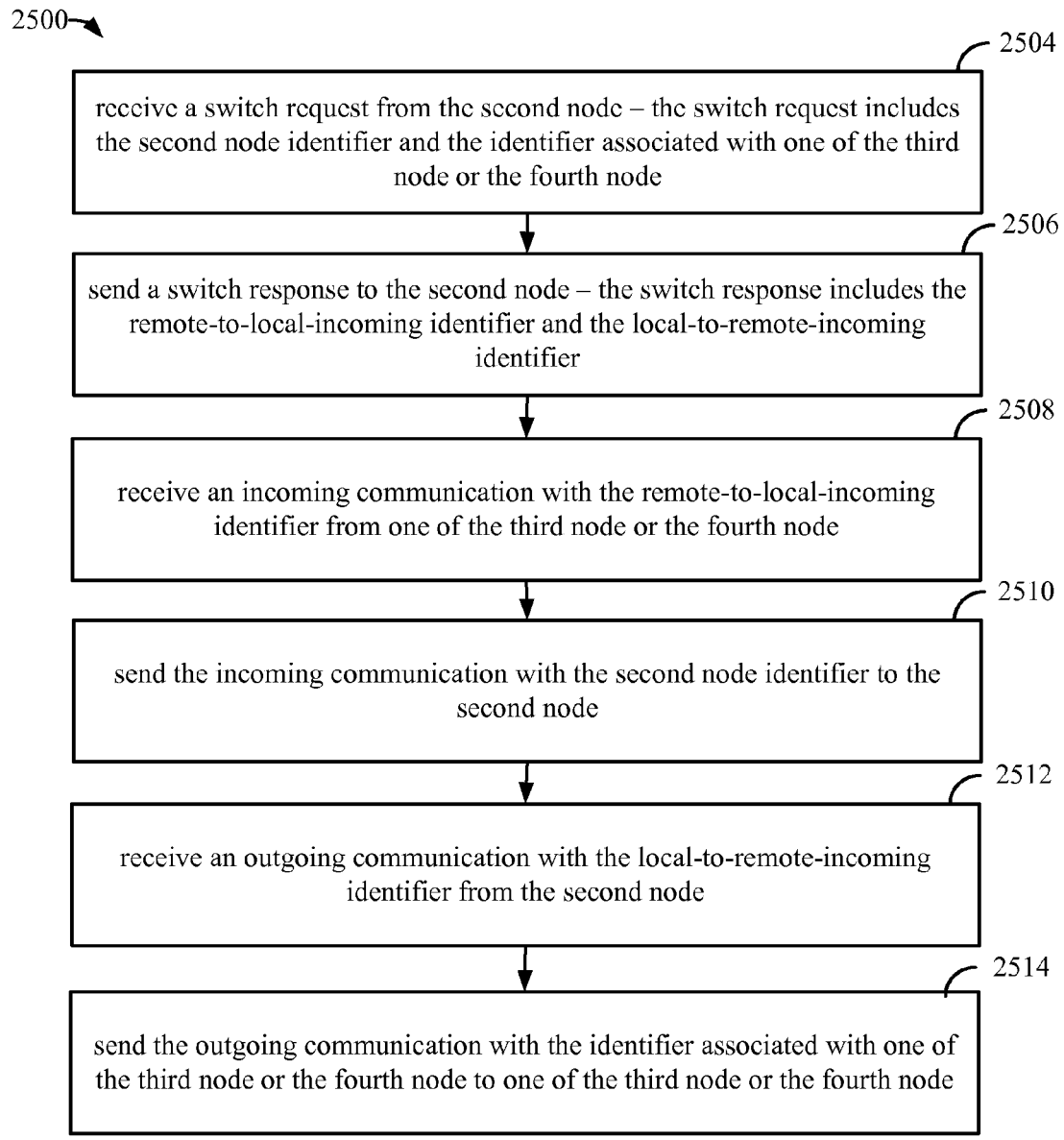
FIG. 25 is a flow chart of a seventh method of wireless communication.

FIG. 25 is a flow chart of a seventh method of communication. The method of communication may be wireless. The method may be performed by a communications device, such as a UE. The communications device is referred to as a first node. In step 2504, the first node may receive a switch request from the second node. The switch request includes the second node identifier and the identifier associated with one of the third node or the fourth node. For example, referring to FIG. 17, step 1730, the node 1's new helper 1708 may receive a switch request for local helper from the node 1 1704. The switch request for local helper includes label ID "Label 1" associated with the node 1 1704. The switch request for local helper may further include the label ID "Label 5" associated with the node 2's helper 1712 (as shown in step 1730 of FIG. 17) or the label ID "Label 4" associated with the node 2 1714 (if the node 2 1714 has no helper). In step 2506, the first node may send a switch response to the second node. The switch response includes the remote-to-local-incoming identifier and the local-to-remote-incoming identifier. For example, referring to FIG. 17, step 1732, the node 1's new helper sends a switch request for local helper to the node 1 1704. The switch request for local helper includes the label ID "Label 7" and the label ID "Label 8." In step 2508, the first node may receive an incoming communication with the remote-to-local-incoming identifier from one of the third node or the fourth node. For example, referring to FIG. 17, step 1746, the node 1's new helper 1708 may receive a packet with the label ID "Label 7" from the node 2's helper 1712. If the node 2 1714 doesn't have a helper, then the packet in step 1746 would be received directly from the node 2 1714. In step 2510, the first node may send the incoming communication with the second node identifier to the second node. For example, referring to FIG. 17, step 1748, the node 1's new helper 1708 sends the received packet with the label ID "Label 1" to the node 1 1704. In step 2512, the first node may receive an outgoing communication with the local-to-remote-incoming identifier from the second node. For example, referring to FIG. 17, step 1750, the node 1's new helper 1708 receives a packet with the label ID "Label 8" from the node 1 1704. In step 2514, the first node may send the outgoing communication with the identifier associated with one of the third node or the fourth node to one of the third node or the fourth node. For example, referring to FIG. 17, step 1752, the node 1's new helper 1708 sends the received packet to the node 2's helper 1712. If the node 2 1714 does not have a helper, in step 1752, the node 1's new helper 1708 would send the received packet directly to the node 2 1714.

Figure 26:
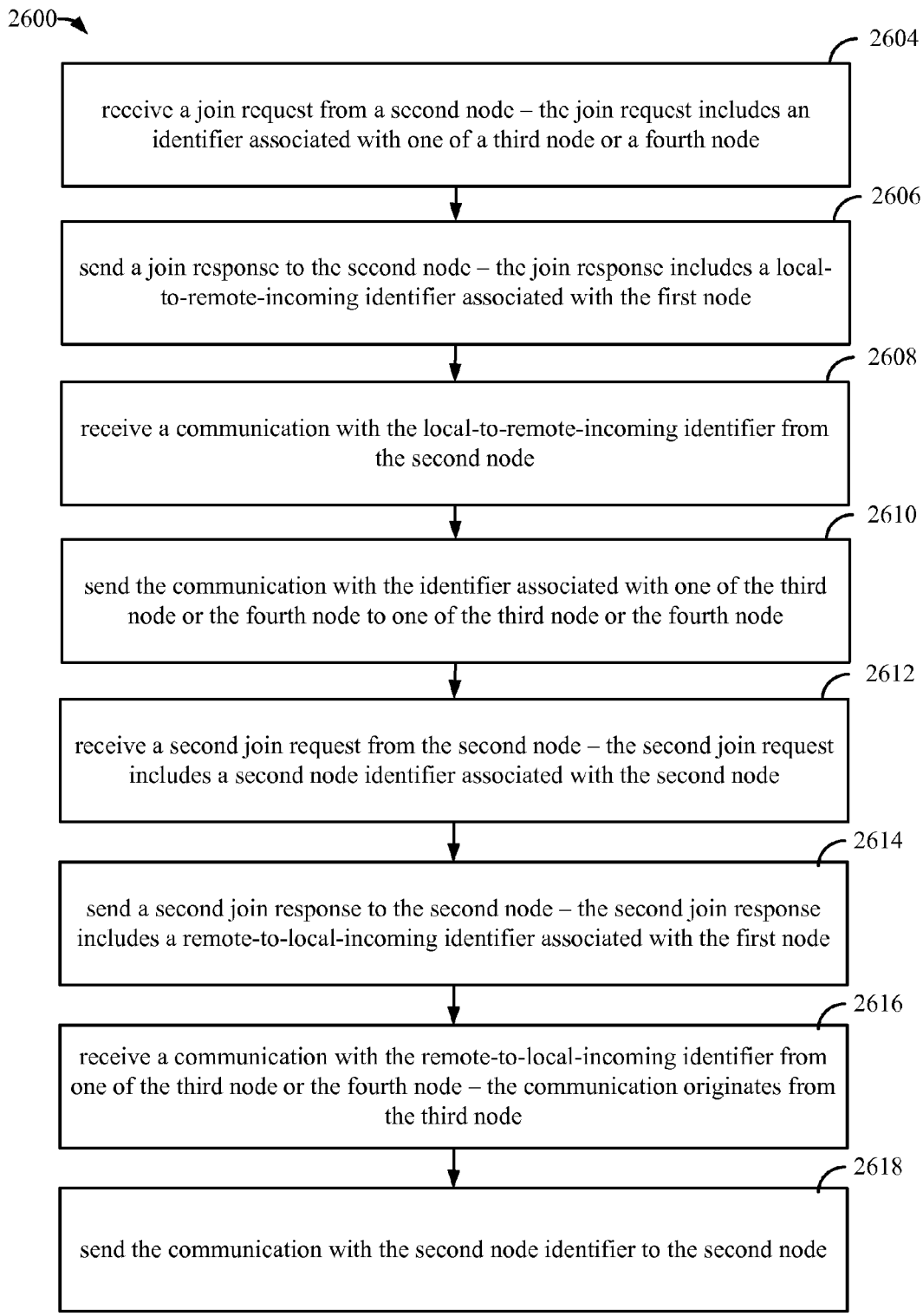
FIG. 26 is a flow chart of an eighth method of wireless communication.

FIG. 26 is a flow chart of an eighth method of communication. The method of communication may be wireless. The method may be performed by a communications device, such as a UE. The communications device is referred to as a first node. In step 2604, the first node receives a join request from a second node. The join request includes an identifier associated with one of a third node or a fourth node. For example, referring to FIG. 16, step 1620, the node 2's helper 1608 receives a helper join request for outgoing path from the node 2 1610. The helper join request for outgoing path includes the label ID "Label 2" associated with the node 1's helper 1606. However, if the node 1 1604 does not have a helper, then the helper join request for outgoing path would include the label ID "Label 1" associated with the node 1 1604. In step 2606, the first node sends a join response to the second node. The join response includes a local-to-remote-incoming identifier associated with the first node. For example, referring to FIG. 16, step 1622, the node 2's helper 1608 sends a helper join response for outgoing path to the node 2 1610. The helper join response for outgoing path includes the label ID "Label 3" associated with the node 2's helper 1608. In step 2608, the first node receives a communication with the local-to-remote-incoming identifier from the second node. For example, referring to FIG. 16, step 1626, the node 2's helper receives a packet with the label ID "label 3" from the node 2 1610. In step 2610, the first node sends the communication with the identifier associated with one of the third node or the fourth node to one of the third node or the fourth node. For example, referring to FIG. 16, step 1628, the node 2's helper 1608 sends the packet with the label ID "Label 2" to the node 1's helper 1606. However, if the node 1 1604 does not have a helper, then the node 2's helper 1608 would send the packet with the label ID "Label 1" directly to the node 1 1604. In step 2612, the first node may receive a second join request from the second node. The second join request includes a second node identifier associated with the second node. For example, referring to FIG. 16, step 1634, the node 2's helper 1608 receives a helper join request for incoming path from the node 2 1610. The helper join request for incoming path includes the label ID "Label 4" associated with the node 2 1610. In step 2614, the first node may send a second join response to the second node. The second join response includes a remote-to-local-incoming identifier associated with the first node. For example, referring to FIG. 16, step 1636, the node 2's helper 1608 sends a helper join response for incoming path to the node 2 1610. The helper join response for incoming path includes the label ID "Label 5" associated with the node 2's helper 1608. In step 2616, the first node may receive a communication with the remote-to-local-incoming identifier from one of the third node or the fourth node. The communication originates from the third node. For example, referring to FIG. 16, step 1654, the node 2's helper 1608 receives a packet with the label ID "Label 5" from the node 1's helper 1606 that originates from the node 1 1604. However, if the node 1 1604 does not have a helper, then the node 2's helper 1608 would receive the packet with the label ID "Label 5" from the node 1 1604 that originates from the node 1 1604. In step 2618, the first node may send the communication with the second node identifier to the second node. For example, referring to FIG. 16, step 1656, the node 2's helper 1608 sends the packet with the label ID "Label 4" to the node 2 1610.

Figure 27:
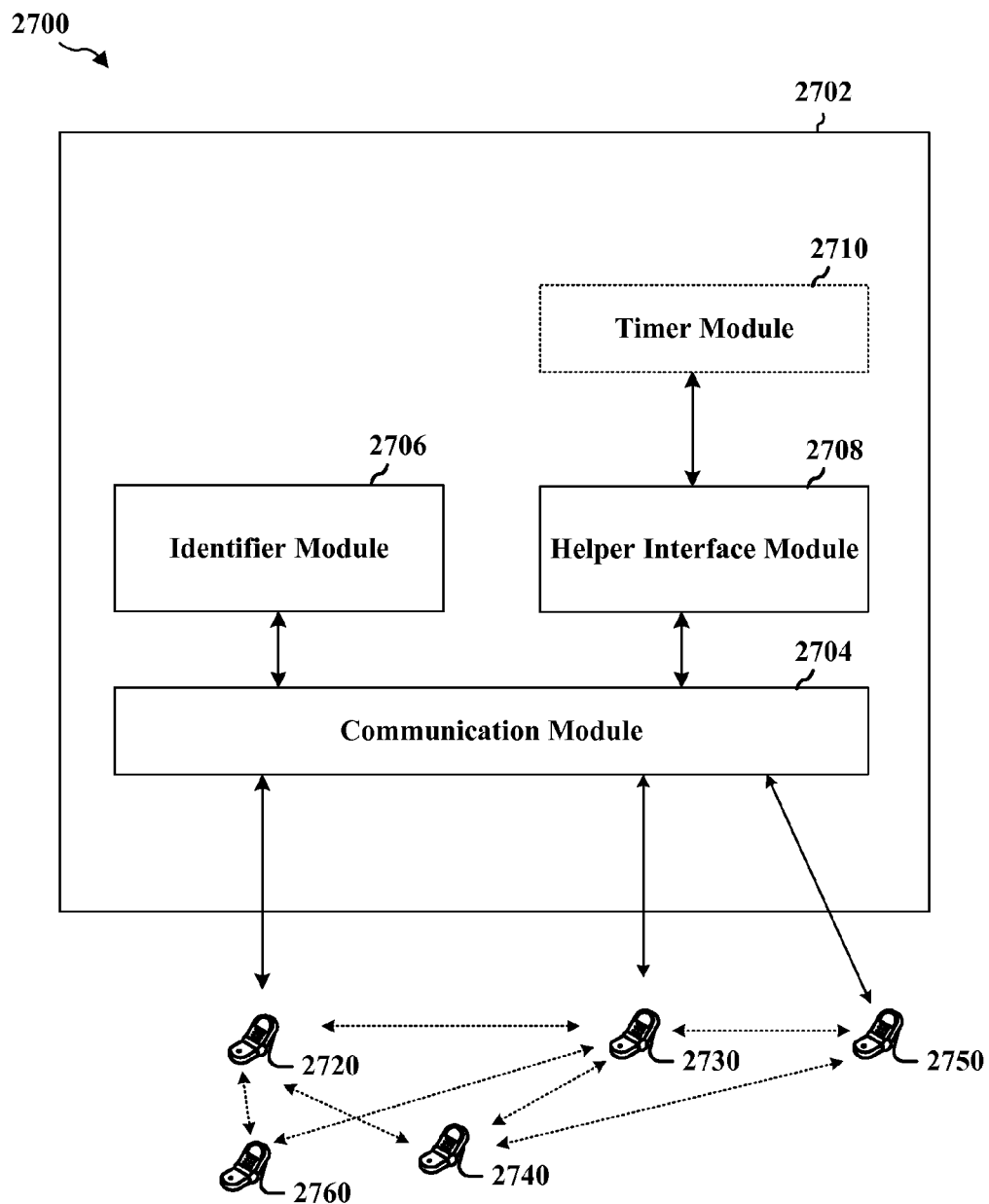
FIG. 27 is a conceptual data flow diagram illustrating the data flow between different modules/means/components in an exemplary apparatus.

FIG. 27 is a conceptual data flow diagram 2700 illustrating the data flow between different modules/means/components in an exemplary apparatus 2702. The apparatus may a communications device, such as a wireless communications device. For example, the apparatus may be a UE. The apparatus may be referred to as a first node. In a first configuration, the first node 2702 (e.g., node 1 1704) includes a communication module that is configured to send a join request to a second node 2720 (e.g., node 1's old helper 1706) to route communication associated with a third node 2730 (e.g., node 2 1714) to the first node 2702. The join request may include a first node identifier associated with the first node 2702. The communication module 2704 is configured to receive from the second node 2720 a join response including a second node identifier associated with the second node 2720. The communication module 2704 is configured to send a setup request to the third node 2730. The setup request includes the second node identifier. The communication module is configured to receive a communication with the first node identifier from the second node 2720. The communication originates from the third node 2730. The first node 2702 further includes an identifier module 2706 that is configured to generate identifiers and to store received identifiers. The identifier module 2706 communicates identifier information with the communication module 2704.

The communication module 2704 may be further configured to receive a path setup indication from the third node 2730. The first node may further include a helper interface module 2708 that is configured to determine whether to send the join request to the second node based on the path setup indication. As discussed supra, the path setup indication may include QoS information. The helper interface module 2708 may determine whether to send a join request to establish a helper relationship with the second node based on the QoS information. The helper interface module 2708 may be further configured to determine when to switch helper nodes. The helper interface module 2708 may determine to switch helper nodes based on information from a timer module 2710, which is configured to inform the helper interface module 2708 upon expiration of a timer. The helper interface module 2708 may determine to switch helper nodes based on other information, such as a release notification from a current helper node. The helper interface module 2708 is configured to communicate with the communication module 2704 to switch helper nodes.

The communication module 2704 may be configured to send a switch request to a fourth node 2750 (e.g., node 1's new helper 1708) to route communication associated with the third node 2730 to the first node 2702. The switch request includes the first node identifier. The communication module 2704 may be configured to receive a switch response from the fourth node 2750. The switch response includes a fourth node identifier associated with the fourth node 2750. The communication module 2704 may be configured to send a change notification to the third node 2730. The change notification includes the fourth node identifier. The communication module 2704 may be configured to receive a communication with the first node identifier from the fourth node 2750. The communication originates from the third node 2730. The communication module 2704 may be configured to receive a release notification from the second node 2720. The switch request may be sent in response to the release notification. The communication module may be configured to receive a change response from the third node 2730 and to send a release notification to the second node 2720 after receiving the change response. The timer module 2710 may be configured to set a timer associated with the second node 2720. The communication module 2704 may be configured to send the switch request upon expiration of the timer.

The communication module 2704 may be configured to send a change notification to the third node 2730. The change notification may include the first node identifier. The communication module 2704 may be configured to receive a communication with the first node identifier from one of the third node 2730 or a fourth node 2740 (e.g., node 2's helper 1712). The communication originates from the third node 2730. The communication module 2704 may be configured to send a release command to the second node 2720 before sending the change notification to the third node 2730. The communication module 2704 may be configured to receive a change response from the third node 2730, and to send a release command to the second node 2720 after receiving the change response from the third node 2730. The communication module 2704 may be configured to send a release notification to the third node 2730. The communication with the first node identifier from the second node 2720 that originates from the third node 2730 stops after the release notification is sent.

In a second configuration, the communication module 2704 is configured to receive a setup request from a second node 2730 (e.g., node 1 1704). The setup request includes an identifier associated with one of the second node 2730 or a third node 2740 (e.g., node 1's old helper 1706). The communication module 2704 is configured to send a join request to a fourth node 2720 (e.g., node 2's helper 1712) to route communication for the second node 2730 from the first node 2702 (e.g., node 2 1714) to one of the second node 2730 or the third node 2740. The join request includes the identifier associated with one of the second node 2730 or the third node 2740. The communication module 2704 is configured to receive from the fourth node 2720 a join response including a fourth node identifier associated with the fourth node 2720. The communication module 2704 is configured to send a communication for the second node 2730 to the fourth node 2720. The communication is sent with the fourth node identifier.

The communication module 2704 may be further configured to send a path setup indication to the second node 2730. The communication module 2704 may be further configured to receive a change notification from the second node 2730. The change notification includes an identifier associated with one of the second node 2730 or a fifth node 2760 (e.g., node 1's new helper 1708). The communication module 2704 may be further configured to send a switch request to the fourth node 2720 to route communication for the second node 2730 from the first node 2704 to one of the second node 2730 or the fifth node 2760. The switch request includes the identifier associated with one of the second node 2730 or the fifth node 2760. The communication module 2704 may be further configured to send a second communication for the second node 2730 to the fourth node 2720. The communication is sent with the fourth node identifier.

The communication module 2704 may be further configured to send a release command to the fourth node 2720, and to send a communication with an identifier associated with one of the second node 2730 or the third node 2740 to one of the second node 2730 or the third node 2740. The communication module 2704 may be further configured to receive a release notification from the second node, and to stop sending the communication for the second node to the fourth node upon receiving the release notification.

In a third configuration, the communication module 2704 is configured to receive a join request from a second node. The join request includes a second node identifier associated with the second node. The communication module 2704 is further configured to send a join response to the second node. The join response includes a remote-to-local-incoming identifier associated with the first node. The communication module 2704 is further configured to receive a communication with the remote-to-local-incoming identifier from one of a third node or a fourth node. The communication originates from the third node. The communication module 2704 is further configured to send the communication with the second node identifier to the second node.

The communication module 2704 may be further configured to receive a second join request from the second node. The second join request includes an identifier associated with one of the third node or the fourth node. The communication module 2704 may be further configured to send a second join response to the second node. The second join response includes a local-to-remote-incoming identifier associated with the first node. The communication module 2704 may be further configured to receive a communication with the local-to-remote-incoming identifier from the second node. The communication module 2704 may be further configured to send the communication with the identifier associated with one of the third node or the fourth node to one of the third node or the fourth node.

The communication module 2704 may be further configured to receive a switch request from the second node. The switch request includes the second node identifier and the identifier associated with one of the third node or the fourth node. The communication module 2704 may be further configured to send a switch response to the second node. The switch response includes the remote-to-local-incoming identifier and the local-to-remote-incoming identifier. The communication module 2704 may be further configured to receive an incoming communication with the remote-to-local-incoming identifier from one of the third node or the fourth node. The communication module 2704 may be further configured to send the incoming communication with the second node identifier to the second node. The communication module 2704 may be further configured to receive an outgoing communication with the local-to-remote-incoming identifier from the second node. The communication module 2704 may be further configured to send the outgoing communication with the identifier associated with one of the third node or the fourth node to one of the third node or the fourth node.

In a fourth configuration, the communication module 2704 is configured to receive a join request from a second node. The join request includes an identifier associated with one of a third node or a fourth node. The communication module 2704 is configured to send a join response to the second node. The join response includes a local-to-remote-incoming identifier associated with the first node. The communication module 2704 is configured to receive a communication with the localto-remote-incoming identifier from the second node. The communication module 2704 is configured to send the communication with the identifier associated with one of the third node or the fourth node to one of the third node or the fourth node.

The apparatus may include additional modules that perform each of the steps of the algorithm in the aforementioned flow charts of FIGS. 19-26. As such, each step in the aforementioned flow charts of FIGS. 19-26 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 28:
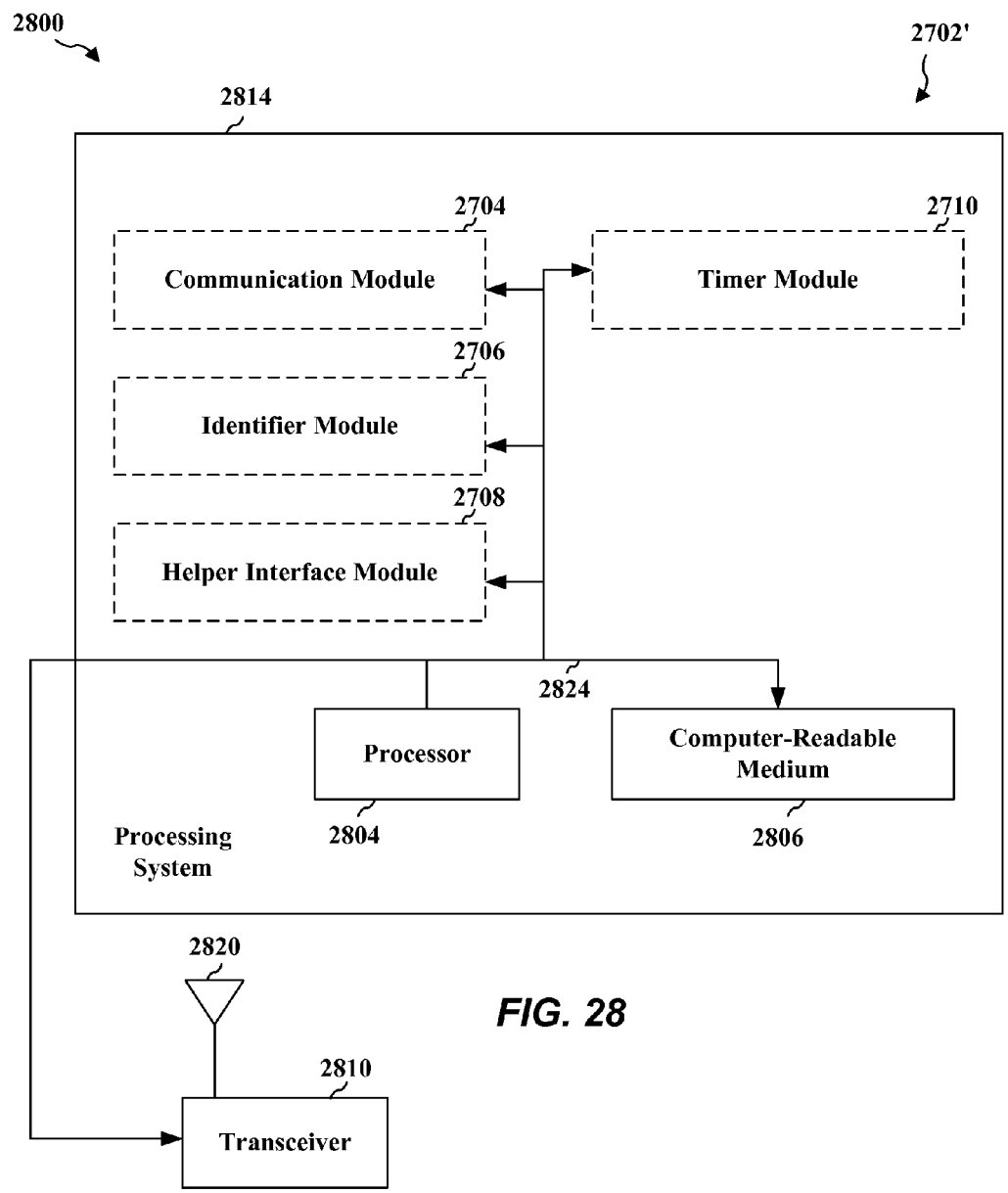
FIG. 28 is a diagram illustrating an example of a hardware implementation for an apparatus employing a processing system.

FIG. 28 is a diagram 2800 illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware modules, represented by the processor 2804, the modules 2704, 2706, 2708, 2710, and the computer-readable medium 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The processing system 2814 includes a processor 2804 coupled to a computer-readable medium 2806. The processor 2804 is responsible for general processing, including the execution of software stored on the computer-readable medium 2806. The software, when executed by the processor 2804, causes the processing system 2814 to perform the various functions described supra for any particular apparatus. The computer-readable medium 2806 may also be used for storing data that is manipulated by the processor 2804 when executing software. The processing system further includes at least one of the modules 2704, 2706, 2708, 2710. The modules may be software modules running in the processor 2804, resident/stored in the computer readable medium 2806, one or more hardware modules coupled to the processor 2804, or some combination thereof.

In one configuration, the first node apparatus 2702/2702' for communication includes means for sending a join request to a second node to route communication associated with a third node to the first node. The join request includes a first node identifier associated with the first node. The apparatus further includes means for receiving from the second node a join response including a second node identifier associated with the second node. The apparatus further includes means for sending a setup request to the third node. The setup request includes the second node identifier. The apparatus further includes means for receiving a communication with the first node identifier from the second node. The communication originates from the third node.

The apparatus may further include means for receiving a path setup indication from the third node. The apparatus may further include means for determining whether to send the join request to the second node based on the path setup indication. The apparatus may further include means for sending a switch request to a fourth node to route communication associated with the third node to the first node. The switch request includes the first node identifier. The apparatus may further include means for receiving a switch response from the fourth node. The switch response includes a fourth node identifier associated with the fourth node. The apparatus may further include means for sending a change notification to the third node. The change notification includes the fourth node identifier. The apparatus may further include means for receiving a communication with the first node identifier from the fourth node. The communication originates from the third node. The apparatus may further include means for receiving a release notification from the second node. The switch request is sent in response to the release notification. The apparatus may further include means for receiving a change response from the third node, and means for sending a release notification to the second node after receiving the change response. The apparatus may further include means for setting a timer associated with the second node. The switch request is sent upon expiration of the timer. The apparatus may further include means for sending a change notification to the third node. The change notification includes the first node identifier. The apparatus may further include means for receiving a communication with the first node identifier from one of the third node or a fourth node. The communication originates from the third node. The apparatus may further include means for sending a release command to the second node before sending the change notification to the third node. The apparatus may further include means for receiving a change response from the third node, and means for sending a release command to the second node after receiving the change response from the third node. The apparatus may further include means for sending a release notification to the third node. The communication with the first node identifier from the second node that originates from the third node stops after the release notification is sent.

The aforementioned means may be one or more of the aforementioned modules of the apparatus 2702 and/or the processing system 2814 of the apparatus 2702' configured to perform the functions recited by the aforementioned means.

In one configuration, the first node apparatus 2702/2702' for communication includes means for receiving a setup request from a second node. The setup request includes an identifier associated with one of the second node or a third node. The apparatus further includes means for sending a join request to a fourth node to route communication for the second node from the first node to one of the second node or the third node. The join request includes the identifier associated with one of the second node or the third node. The apparatus further includes means for receiving from the fourth node a join response including a fourth node identifier associated with the fourth node. The apparatus further includes means for sending a communication for the second node to the fourth node. The communication is sent with the fourth node identifier.

The apparatus may further include means for sending a path setup indication to the second node. The apparatus may further include means for receiving a change notification from the second node. The change notification includes an identifier associated with one of the second node or a fifth node. The apparatus may further include means for sending a switch request to the fourth node to route communication for the second node from the first node to one of the second node or the fifth node. The switch request includes the identifier associated with one of the second node or the fifth node. The apparatus may further include means for sending a second communication for the second node to the fourth node. The communication is sent with the fourth node identifier. The apparatus may further include means for sending a release command to the fourth node, and means for sending a communication with an identifier associated with one of the second node or the third node to one of the second node or the third node. The apparatus may further include means for receiving a release notification from the second node, means for stopping the sending of the communication for the second node to the fourth node upon receiving the release notification.

The aforementioned means may be one or more of the aforementioned modules of the apparatus 2702 and/or the processing system 2814 of the apparatus 2702' configured to perform the functions recited by the aforementioned means.

In one configuration, the first node apparatus 2702/2702' for communication includes means for receiving a join request from a second node. The join request includes a second node identifier associated with the second node. The apparatus further includes means for sending a join response to the second node. The join response includes a remote-to-local-incoming identifier associated with the first node. The apparatus further includes means for receiving a communication with the remote-to-local-incoming identifier from one of a third node or a fourth node. The communication originates from the third node. The apparatus further includes means for sending the communication with the second node identifier to the second node.

The apparatus may further include means for receiving a second join request from the second node. The second join request includes an identifier associated with one of the third node or the fourth node. The apparatus may further include means for sending a second join response to the second node. The second join response includes a local-to-remote-incoming identifier associated with the first node. The apparatus may further include means for receiving a communication with the local-to-remote-incoming identifier from the second node. The apparatus may further include means for sending the communication with the identifier associated with one of the third node or the fourth node to one of the third node or the fourth node. The apparatus may further include means for receiving a switch request from the second node. The switch request includes the second node identifier and the identifier associated with one of the third node or the fourth node. The apparatus may further include means for sending a switch response to the second node. The switch response includes the remote-to-local-incoming identifier and the local-to-remote-incoming identifier. The apparatus may further include means for receiving an incoming communication with the remote-to-local-incoming identifier from one of the third node or the fourth node, means for sending the incoming communication with the second node identifier to the second node, means for receiving an outgoing communication with the local-to-remote-incoming identifier from the second node, and means for sending the outgoing communication with the identifier associated with one of the third node or the fourth node to one of the third node or the fourth node.

The aforementioned means may be one or more of the aforementioned modules of the apparatus 2702 and/or the processing system 2814 of the apparatus 2702' configured to perform the functions recited by the aforementioned means.

In one configuration, the first node apparatus 2702/2702' for communication includes means for receiving a join request from a second node. The join request includes an identifier associated with one of a third node or a fourth node. The apparatus further includes means for sending a join response to the second node. The join response includes a local-to-remote-incoming identifier associated with the first node. The apparatus further includes means for receiving a communication with the local-to-remote-incoming identifier from the second node, and means for sending the communication with the identifier associated with one of the third node or the fourth node to one of the third node or the fourth node.

The apparatus may further include means for receiving a second join request from the second node. The second join request includes a second node identifier associated with the second node. The apparatus may further include means for sending a second join response to the second node. The second join response includes a remote-to-local-incoming identifier associated with the first node. The apparatus may further include means for receiving a communication with the remote-to-local-incoming identifier from one of the third node or the fourth node. The communication originates from the third node. The apparatus may further include means for sending the communication with the second node identifier to the second node. The apparatus may further include means for receiving a switch request from the second node. The switch request includes the second node identifier and the identifier associated with one of the third node or the fourth node. The apparatus may further include means for sending a switch response to the second node. The switch response includes the remote-to-local-incoming identifier and the local-to-remote-incoming identifier. The apparatus may further include means for receiving an incoming communication with the remote-to-local-incoming identifier from one of the third node or the fourth node, means for sending the incoming communication with the second node identifier to the second node, means for receiving an outgoing communication with the local-to-remote-incoming identifier from the second node, and means for sending the outgoing communication with the identifier associated with one of the third node or the fourth node to one of the third node or the fourth node.

The aforementioned means may be one or more of the aforementioned modules of the apparatus 2702 and/or the processing system 2814 of the apparatus 2702' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of communication in a first node, comprising:
   sending a join request to a second node to route communication associated with a third node to the first node, the join request comprising a first node identifier associated with the first node, wherein the join request is sent based on a path setup indication received from the third node;
   receiving from the second node a join response comprising a second node identifier associated with the second node, wherein the second node identifier and the first node identifier are linked to direct communication associated with the second node identifier to the first node identifier;
   sending a setup request to the third node, the setup request comprising the second node identifier; and
   receiving a communication with the first node identifier from the second node, the communication originating from the third node.

2. The method of claim 1, further comprising determining whether to send the join request to the second node based on the path setup indication.

3. The method of claim 2, wherein the path setup indication includes quality of service (QoS) information, and the join request is determined to be sent to the second node based on the QoS information.

4. The method of claim 1, further comprising:
   sending a switch request to a fourth node to route communication associated with the third node to the first node, the switch request comprising the first node identifier;
   receiving a switch response from the fourth node, the switch response comprising a fourth node identifier associated with the fourth node;
   sending a change notification to the third node, the change notification comprising the fourth node identifier; and
   receiving a communication with the first node identifier from the fourth node, the communication originating from the third node.

5. The method of claim 4, further comprising receiving a release notification from the second node, wherein the switch request is sent in response to the release notification.

6. The method of claim 4, further comprising:
   receiving a change response from the third node; and
   sending a release notification to the second node after receiving the change response.

7. The method of claim 6, further comprising setting a timer associated with the second node, wherein the switch request is sent upon expiration of the timer.

8. The method of claim 1, further comprising:
   sending a change notification to the third node, the change notification comprising the first node identifier; and
   receiving a communication with the first node identifier from one of the third node or a fourth node, the communication originating from the third node.

9. The method of claim 8, further comprising sending a release command to the second node before sending the change notification to the third node.

10. The method of claim 8, further comprising:
    receiving a change response from the third node; and
    sending a release command to the second node after receiving the change response from the third node.

11. The method of claim 1, further comprising sending a release notification to the third node, wherein the communication with the first node identifier from the second node that originates from the third node stops after the release notification is sent.

12. The method of claim 1, wherein the method of communication is a method of wireless communication.

13. A method of wireless communication of a first node, comprising:
    sending a path setup indication to a second node;
    receiving a setup request from the second node after sending the path setup indication to the second node, the setup request comprising a node identifier associated with one of the second node or a third node;
    sending a join request to a fourth node to route communication for the second node from the first node to one of the second node or the third node, the join request comprising the node identifier associated with one of the second node or the third node;
    receiving from the fourth node a join response comprising a fourth node identifier associated with the fourth node, wherein the fourth node identifier and the node identifier associated with one of the second node or the third node are linked to direct communication associated with the fourth node identifier to the node identifier associated with one of the second node or the third node; and
    sending a communication for the second node to the fourth node, the communication being sent with the fourth node identifier.

14. The method of claim 13, further comprising:
    receiving a change notification from the second node, the change notification comprising a node identifier associated with one of the second node or a fifth node;
    sending a switch request to the fourth node to route communication for the second node from the first node to one of the second node or the fifth node, the switch request comprising the node identifier associated with one of the second node or the fifth node; and
    sending a second communication for the second node to the fourth node, the communication being sent with the fourth node identifier.

15. The method of claim 13, further comprising:
    sending a release command to the fourth node; and
    sending a communication with a node identifier associated with one of the second node or the third node to one of the second node or the third node.

16. The method of claim 13, further comprising:
    receiving a release notification from the second node; and
    stopping the sending of the communication for the second node to the fourth node upon receiving the release notification.

17. The method of claim 13, wherein the method of communication is a method of wireless communication.

18. A first node apparatus for communication, comprising:
    means for sending a join request to a second node to route communication associated with a third node to the first node, the join request comprising a first node identifier associated with the first node, wherein the join request is sent based on a path setup indication received from the third node;
    means for receiving from the second node a join response comprising a second node identifier associated with the second node, wherein the second node identifier and the first node identifier are linked to direct communication associated with the second node identifier to the first node identifier;
    means for sending a setup request to the third node, the setup request comprising the second node identifier; and
    means for receiving a communication with the first node identifier from the second node, the communication originating from the third node.

19. The apparatus of claim 18, further comprising means for determining whether to send the join request to the second node based on the path setup indication.

20. The apparatus of claim 19, wherein the path setup indication includes quality of service (QoS) information, and the join request is determined to be sent to the second node based on the QoS information.

21. The apparatus of claim 18, further comprising:
means for sending a switch request to a fourth node to route communication associated with the third node to the first node, the switch request comprising the first node identifier;
means for receiving a switch response from the fourth node, the switch response comprising a fourth node identifier associated with the fourth node;
means for sending a change notification to the third node, the change notification comprising the fourth node identifier; and
means for receiving a communication with the first node identifier from the fourth node, the communication originating from the third node.

22. The apparatus of claim 21, further comprising means for receiving a release notification from the second node, wherein the switch request is sent in response to the release notification.

23. The apparatus of claim 21, further comprising:
means for receiving a change response from the third node; and
means for sending a release notification to the second node after receiving the change response.

24. The apparatus of claim 23, further comprising means for setting a timer associated with the second node, wherein the switch request is sent upon expiration of the timer.

25. The apparatus of claim 18, further comprising:
means for sending a change notification to the third node, the change notification comprising the first node identifier; and
means for receiving a communication with the first node identifier from one of the third node or a fourth node, the communication originating from the third node.

26. The apparatus of claim 25, further comprising means for sending a release command to the second node before sending the change notification to the third node.

27. The apparatus of claim 25, further comprising:
means for receiving a change response from the third node; and
means for sending a release command to the second node after receiving the change response from the third node.

28. The apparatus of claim 18, further comprising means for sending a release notification to the third node, wherein the communication with the first node identifier from the second node that originates from the third node stops after the release notification is sent.

29. The apparatus of claim 18, wherein the communication is wireless communication.

30. A first node apparatus for communication, comprising:
means for sending a path setup indication to a second node;
means for receiving a setup request from the second node after sending the path setup indication to the second node, the setup request comprising a node identifier associated with one of the second node or a third node;
means for sending a join request to a fourth node to route communication for the second node from the first node to one of the second node or the third node, the join request comprising the node identifier associated with one of the second node or the third node;
means for receiving from the fourth node a join response comprising a fourth node identifier associated with the fourth node, wherein the fourth node identifier and the node identifier associated with one of the second node or the third node are linked to direct communication associated with the fourth node identifier to the node identifier associated with one of the second node or the third node; and
means for sending a communication for the second node to the fourth node, the communication being sent with the fourth node identifier.

31. The apparatus of claim 30, further comprising means for sending a path setup indication to the second node.

32. The apparatus of claim 30, further comprising:
means for receiving a change notification from the second node, the change notification comprising a node identifier associated with one of the second node or a fifth node;
means for sending a switch request to the fourth node to route communication for the second node from the first node to one of the second node or the fifth node, the switch request comprising the node identifier associated with one of the second node or the fifth node; and
means for sending a second communication for the second node to the fourth node, the communication being sent with the fourth node identifier.

33. The apparatus of claim 30, further comprising:
means for sending a release command to the fourth node; and
means for sending a communication with a node identifier associated with one of the second node or the third node to one of the second node or the third node.

34. The apparatus of claim 30, further comprising:
means for receiving a release notification from the second node; and
means for stopping the sending of the communication for the second node to the fourth node upon receiving the release notification.

35. The apparatus of claim 30, wherein the communication is wireless communication.

36. A first node apparatus for communication, comprising:
a processing system configured to:
send a join request to a second node to route communication with a third node to the first node, the join request comprising a first node identifier associated with the first node, wherein the join request is sent based on a path setup indication received from the third node;
receive from the second node a join response comprising a second node identifier associated with the second node, wherein the second node identifier and the first node identifier are linked to direct communication associated with the second node identifier to the first node identifier;
send a setup request to the third node, the setup request comprising the second node identifier; and
receive a communication with the first node identifier from the second node, the communication originating from the third node.

37. A first node apparatus for communication, comprising:
a processing system configured to:
send a path setup indication to a second node;
receive a setup request from the second node after sending the path setup indication to the second node, the setup request comprising a node identifier associated with one of the second node or a third node;
send a join request to a fourth node to route communication for the second node from the first node to one of the second node or the third node, the join request comprising the node identifier associated with one of the second node or the third node;

receive from the fourth node a join response comprising a fourth node identifier associated with the fourth node, wherein the fourth node identifier and the node identifier associated with one of the second node or the third node are linked to direct communication associated with the fourth node identifier to the node identifier associated with one of the second node or the third node; and send a communication for the second node to the fourth node, the communication being sent with the fourth node identifier.

38. A computer program product in a first node, comprising:

a non-transitory computer-readable medium comprising code for:

sending a join request to a second node to route communication associated with a third node to the first node, the join request comprising a first node identifier associated with the first node, wherein the join request is sent based on a path setup indication received from the third node;

receiving from the second node a join response comprising a second node identifier associated with the second node, wherein the second node identifier and the first node identifier are linked to direct communication associated with the second node identifier to the first node identifier;

sending a setup request to the third node, the setup request comprising the second node identifier; and receiving a communication with the first node identifier from the second node, the communication originating from the third node.

39. A computer program product in a first node, comprising:

a non-transitory computer-readable medium comprising code for:

sending a path setup indication to a second node;

receiving a setup request from the second node after sending the path setup indication to the second node, the setup request comprising a node identifier associated with one of the second node or a third node;

sending a join request to a fourth node to route communication for the second node from the first node to one of the second node or the third node, the join request comprising the node identifier associated with one of the second node or the third node;

receiving from the fourth node a join response comprising a fourth node identifier associated with the fourth, wherein the fourth node identifier and the node identifier associated with one of the second node or the third node are linked to direct communication associated with the fourth node identifier to the node identifier associated with one of the second node or the third node; and sending a communication for the second node to the fourth node, the communication being sent with the fourth node identifier.

\* \* \* \* \*